(12) United States Patent
Uematsu et al.

(10) Patent No.: US 7,827,195 B2
(45) Date of Patent: Nov. 2, 2010

(54) DOCUMENT MANAGEMENT DEVICE AND DOCUMENT MANAGEMENT METHOD

(75) Inventors: Naoya Uematsu, Tokushima (JP); Toshinobu Kano, Tokushima (JP); Norio Oshima, Tokushima (JP)

(73) Assignee: Justsystems Corporation, Tokushima (JP)

(*) Notice: Subject to any disclaimer, the term of this patent is extended or adjusted under 35 U.S.C. 154(b) by 0 days.

(21) Appl. No.: 11/576,225

(22) PCT Filed: Nov. 14, 2005

(86) PCT No.: PCT/JP2005/020893
§ 371 (c)(1),
(2), (4) Date: Feb. 4, 2008

(87) PCT Pub. No.: WO2006/051966
PCT Pub. Date: May 18, 2006

(65) Prior Publication Data
US 2008/0262993 A1   Oct. 23, 2008

(30) Foreign Application Priority Data
Nov. 12, 2004   (JP) .............................. 2004-328419

(51) Int. Cl.
*G06F 17/30* (2006.01)
*G06F 7/00* (2006.01)
(52) U.S. Cl. ...................................... 707/784; 707/803
(58) Field of Classification Search .................. 707/101, 707/205, 784, 803
See application file for complete search history.

(56) References Cited

U.S. PATENT DOCUMENTS 5,873,660 A * 2/1999 Walsh et al. .................. 400/63

(Continued)

FOREIGN PATENT DOCUMENTS

| JP | 7-295932 A | 11/1995 |
| JP | 2001-290804 A | 10/2001 |
| JP | 2002-182964 A | 6/2002 |
| JP | 2002-358257 A | 12/2002 |

OTHER PUBLICATIONS

Japanese Office Action corresponding to Japanese Patent Application No. 2006-545037, dated Sep. 7, 2010, Complete English language translation.

*Primary Examiner*—Kuen S Lu
(74) *Attorney, Agent, or Firm*—Sughrue Mion, PLLC

(57) ABSTRACT

A document management system includes a document processing apparatus which performs processing, such as editing of a document; and a document management server which manages division and combining of the document thus created. The document processing apparatus transmits an XML document thus created to the document management server, and requests to store the document. In this stage, in a case that the XML document includes proper nouns, the proper nouns are stored in the form of a separate file. Upon reception of a request from the document processing apparatus to acquire the XML document stored in the document management server, the document management server certifies the user of the requesting document processing apparatus. Then, the document management server combines the proper nouns with the XML document in an appropriate manner according to the certification level, and transmits the XML document thus combined to the document processing apparatus.

6 Claims, 48 Drawing Sheets

U.S. PATENT DOCUMENTS

| | | | |
|---|---|---|---|
| 5,905,980 A * | 5/1999 | Masuichi et al. | 707/1 |
| 6,137,911 A * | 10/2000 | Zhilyaev | 382/225 |
| 6,389,436 B1 * | 5/2002 | Chakrabarti et al. | 715/229 |
| 6,430,557 B1 * | 8/2002 | Gaussier et al. | 704/9 |
| 6,742,015 B1 * | 5/2004 | Bowman-Amuah | 718/101 |
| 2004/0220895 A1 * | 11/2004 | Carus et al. | 707/1 |

* cited by examiner

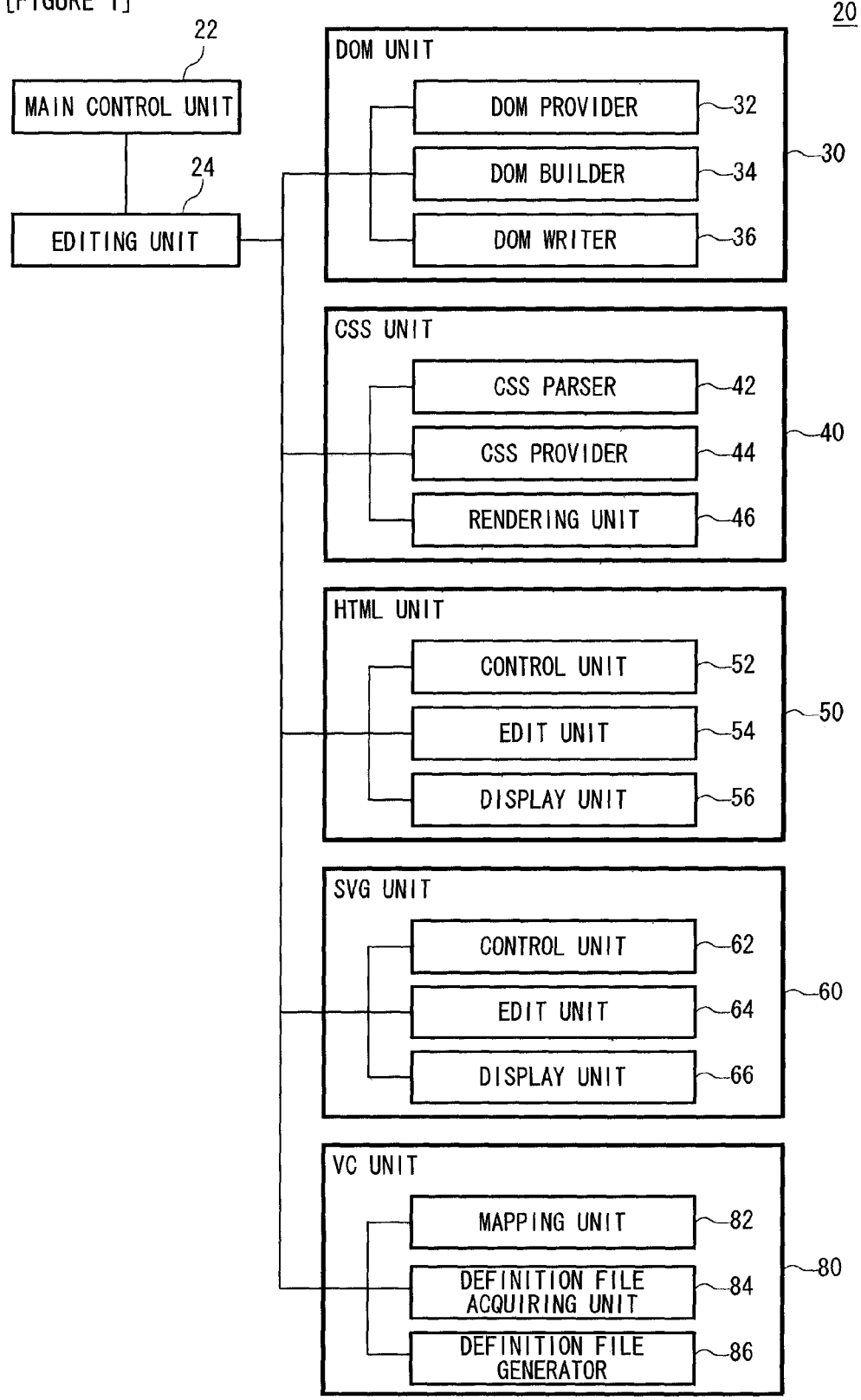
[FIGURE 1]

[FIGURE 2]

```
<?xml version="1.0" ?>

<?com.xfytec vocabulary-connection href="records.vcd" ?>
<marks xmlns="http://xmlns.xfytec.com/sample/records">
   <student name="A">
      <japanese>90</japanese>
      <mathematics>50</mathematics>
      <science>75</science>
      <social_studies>60</social_studies>
   </student>
   <student name="B">
      <japanese>45</japanese>
      <mathematics>60</mathematics>
      <science>55</science>
      <social_studies>50</social_studies>
   </student>
   <student name="C">
      <japanese>55</japanese>
      <mathematics>45</mathematics>
      <science>95</science>
      <social_studies>40</social_studies>
   </student>
   <student name="D">
      <japanese>25</japanese>
      <mathematics>35</mathematics>
      <science>40</science>
      <social_studies>15</social_studies>
   </student>
</marks>
```

[FIGURE 3]
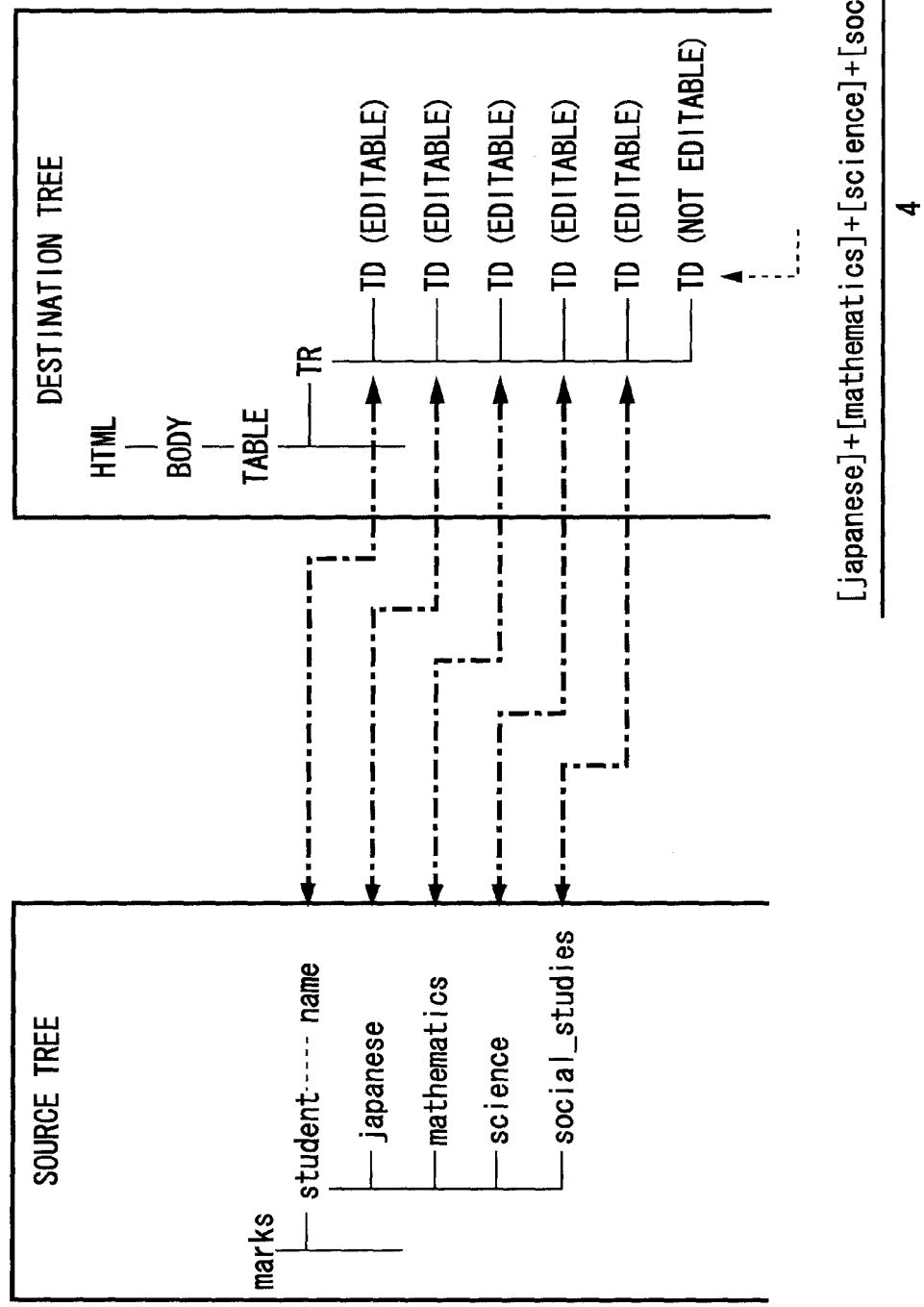

[FIGURE 4(a)]

```
<?xml version="1.0"?>

<vc:vcd xmlns:vc="http://xmlns.xfytec.com/vcd"
        xmlns:src="http://xmlns.xfytec.com/sample/records"
        xmlns="http://www.w3.org/1999/xhtml"
        version="1.0">

<!-- Commands -->
<vc:command name="add student">
   <vc:insert-fragment
       target="ancestor-or-self::src:student"
       position="after">
     <src:student/>
   </vc:insert-fragment>
</vc:command>
<vc:command name="delete student">
   <vc:delete-fragment target="ancestor-or-self::src:student" />
</vc:command>

<!-- Templates -->
<vc:vc-template match="src:marks" name="grade transcript" >

<vc:ui command="add student">
     <vc:mount-point>
       /MenuBar/GradeTranscript/AddStudent
     </vc:mount-point>
   </vc:ui>
   <vc:ui command="delete student">
     <vc:mount-point>
       /MenuBar/GradeTranscript/DeleteStudent
     </vc:mount-point>
   </vc:ui>

<html>
     <head>
       <title>Grade Transcript</title>
       <style>
         td,th {
           text-align:center;
           border-right:solid black 1px;
           border-bottom:solid black 1px;
           border-top:none 0px;
           border-left:none 0px;
         }
         table{
           border-top:solid black 2px;
           border-left:solid black 2px;
           border-right:solid black 1px;
           border-bottom:solid black 1px;
           border-spacing:0px;
         }
```

[FIGURE 4(b)]

```
            tr{
               border:none;
            }
            .data{
               padding:0.2em 0.5em;
            }
         </style>
      </head>
      <body>
         <h1>GRADE LIST</h1>
         <table>
            <tr><th><div class="data">NAME</div></th>
            <th></th>
            <th><div class="data">JAPN</div></th>
            <th><div class="data">MATH</div></th>
            <th><div class="data">SCI</div></th>
            <th><div class="data">SS</div></th>
            <th></th>
            <th><div class="data">AVE</div></th> </tr>
            <vc:apply-templates select="src:student" />
         </table>
      </body>
   </html>
</vc:vc-template>

<vc:template match="src:student">
   <tr>
      <td><div class="data">
         <vc:text-of select="@name" fallback="no name"/></div></td>
      <td></td>
      <td><div class="data">
         <vc:text-of select="src:japanese"
            fallback="0" type="vc:integer" /></div></td>
      <td><div class="data">
         <vc:text-of select="src:mathematics"
            fallback="0" type="vc:integer" /></div></td>
      <td><div class="data">
         <vc:text-of select="src:science"
            fallback="0" type="vc:integer" /></div></td>
      <td><div class="data">
         <vc:text-of select="src:social_studies"
            fallback="0" type="vc:integer" /></div></td>
      <td></td>
      <td><div class="data">
         <vc:value-of
            select="(src:japanese + src:mathematics + src:science
               + src:social_studies) div 4" />
      </div></td>
   </tr>
</vc:template>
</vc:vcd>
```

[FIGURE 5]

| sample.xml | | | | | |
|---|---|---|---|---|---|
| GRADE LIST | | | | | 90 |
| NAME | JAPN | MATH | SCI | SS | AVE |
| A | 90 | 50 | 75 | 60 | 68.8 |
| B | 45 | 60 | 55 | 50 | 52.5 |
| C | 55 | 45 | 95 | 40 | 58.8 |
| D | 25 | 35 | 40 | 15 | 28.8 |

[FIGURE 6]
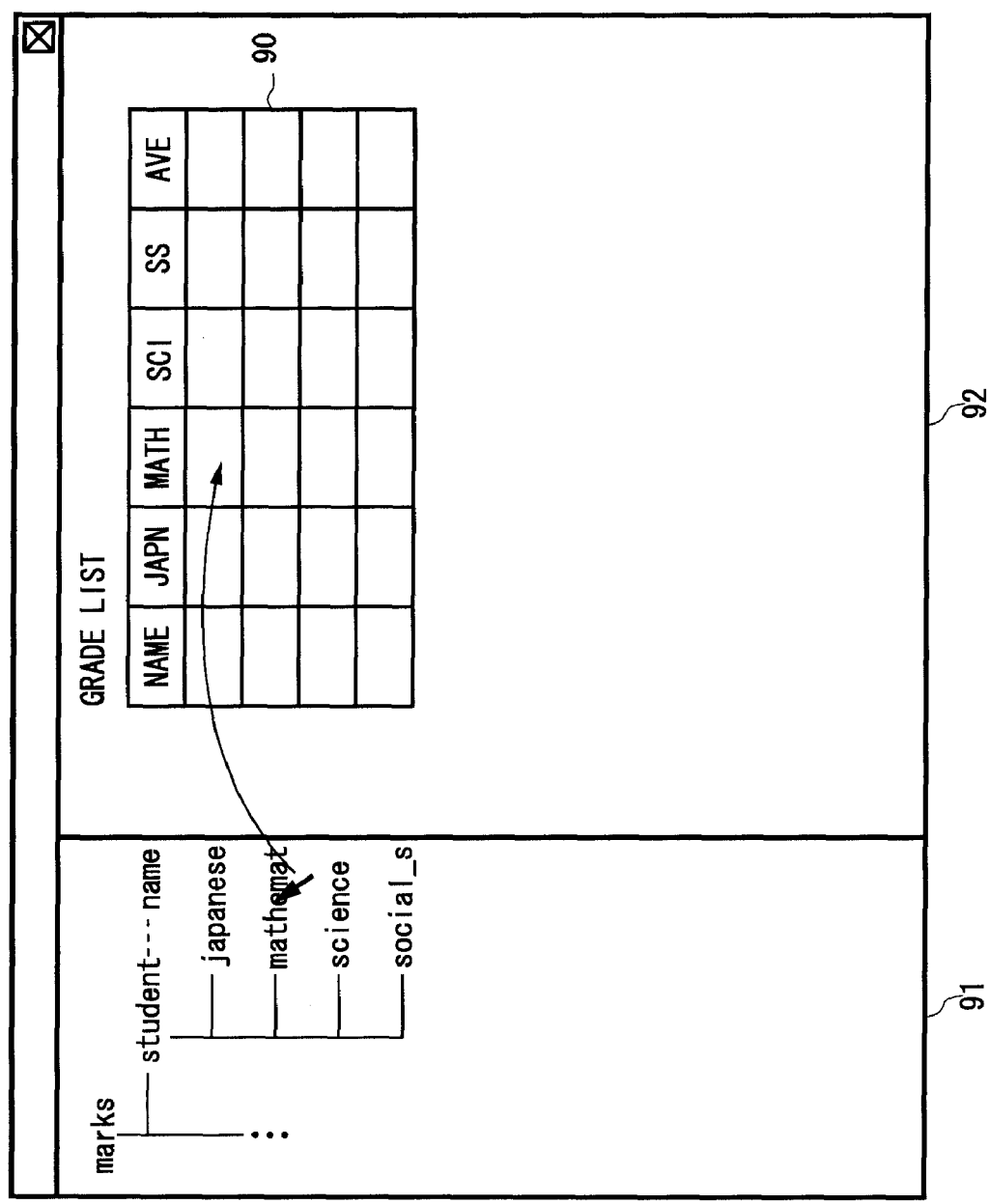

[FIGURE 7]
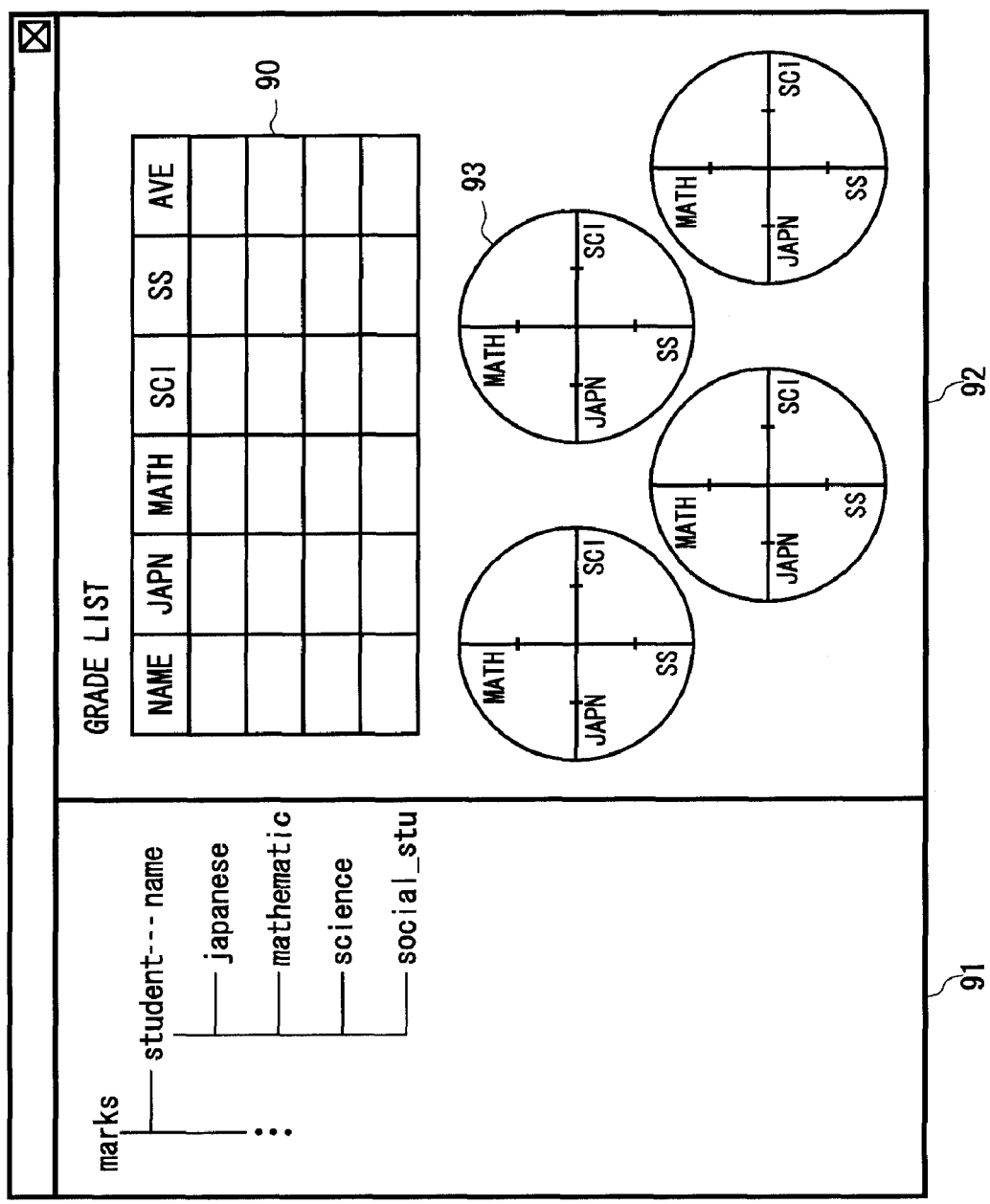

[FIGURE 8]

GRADE LIST

| NAME | JAPN | MATH | SCI | SS |
|---|---|---|---|---|
| A | 90 | 50 | 75 | 60 |
| B | 45 | 60 | 55 | 50 |
| C | 55 | 45 | 95 | 40 |
| D | 25 | 35 | 40 | 15 |

96 marks
— student --name [A]
  — japanese [90]
  — mathematics [50]
  ...
...

95

```
<?xml version="1.0" ?>
<marks xmlns="...">
<student name="A">
...
```

```
<?xml version="1.0" ?>

<svg xmlns="http://www.w3.org/2000/svg"
     width="400" height="200"
     viewBox="0 0 400 200"
>
  <rect x="-15" y="65" width="150" height="100" rx="20"
        transform="rotate(-20)"
        style="fill:none; stroke:purple; stroke-width:10"
  />
  <foreignObject x="190" y="10" width="200" height="200">
    <html xmlns="http://www.w3.org/1999/xhtml">
      <head><title /></head>
      <body bgcolor="#FFFFCC" text="darkgreen">
        <div style="font-size:12pt">
          Using <foreignObject>, XHTML document is
          embedded in SVG document.
          Mathmatical expression is also inserted:
          <div>
            <math xmlns="http://www.w3.org/1998/Math/MathML">
              <mi>x</mi>
              <mo>=</mo>
              <mfrac>
                <mrow>
                  <mo>-</mo>
                  <mi>b</mi>
                  <mo>±</mo>
                  <msqrt>
                    <mrow>
                      <msup>
                        <mi>b</mi>
                        <mn>2</mn>
                      </msup>
                      <mo>-</mo>
                      <mn>4</mn>
                      <mi>a</mi>
                      <mi>c</mi>
                    </mrow>
                  </msqrt>
                </mrow>
                <mrow>
                  <mn>2</mn>
                  <mi>a</mi>
                </mrow>
              </mfrac>
            </math>
          </div><!-- math -->
        </div>
      </body>
    </html>
  </foreignObject>
</svg>
```

[FIGURE 10]
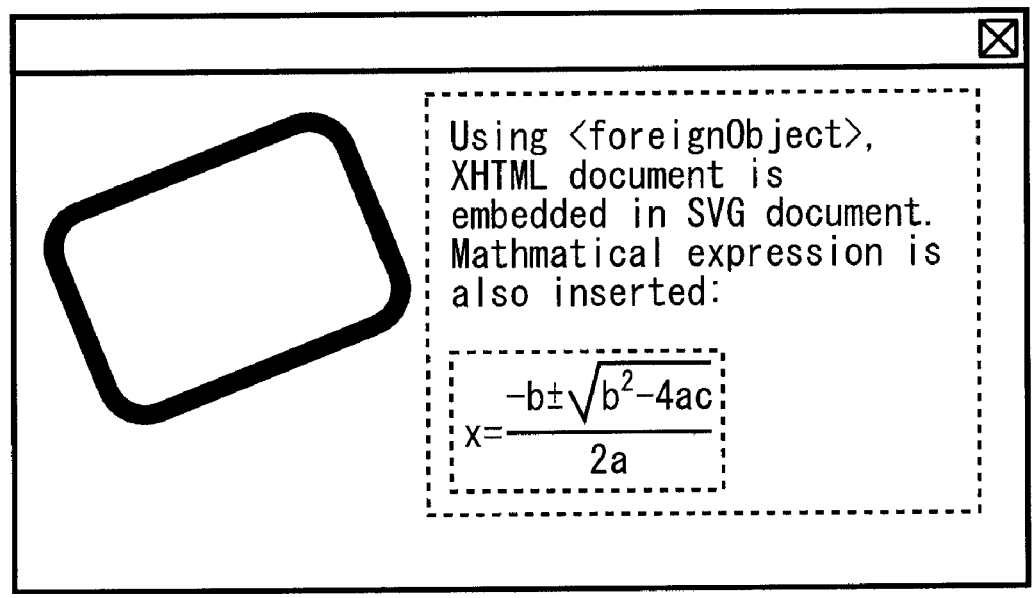

[FIGURE 11(a)]
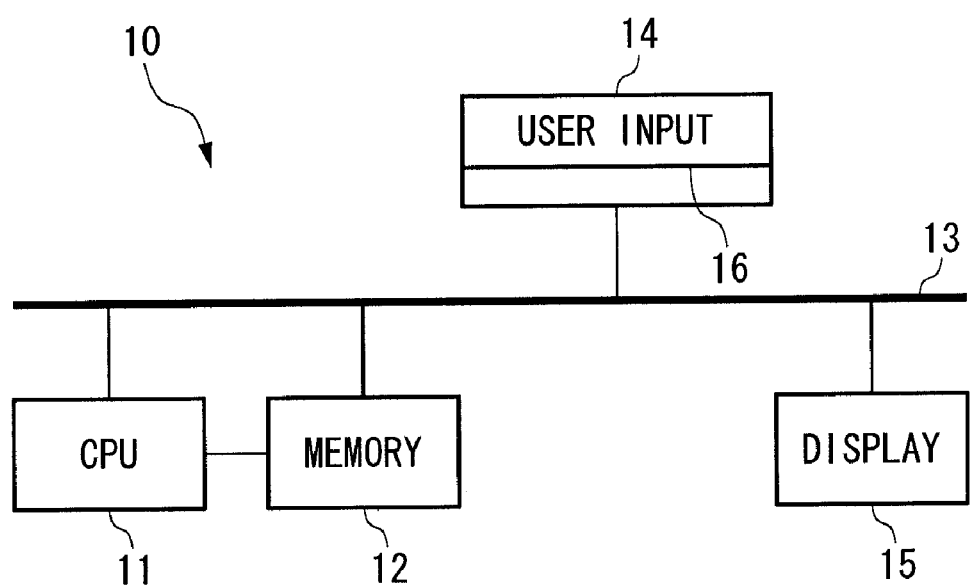

[FIGURE 11(b)]
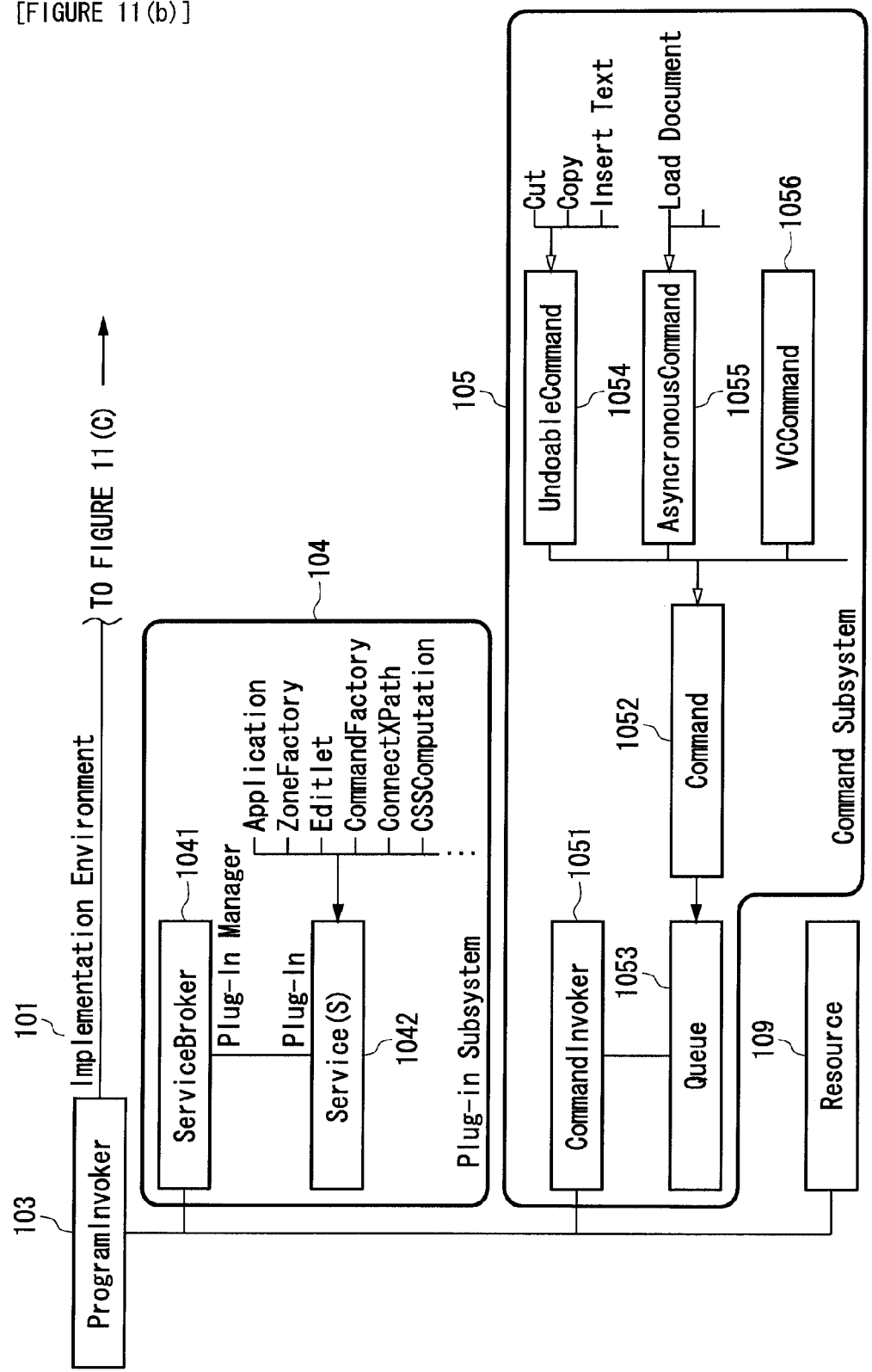

[FIGURE 11(c)]
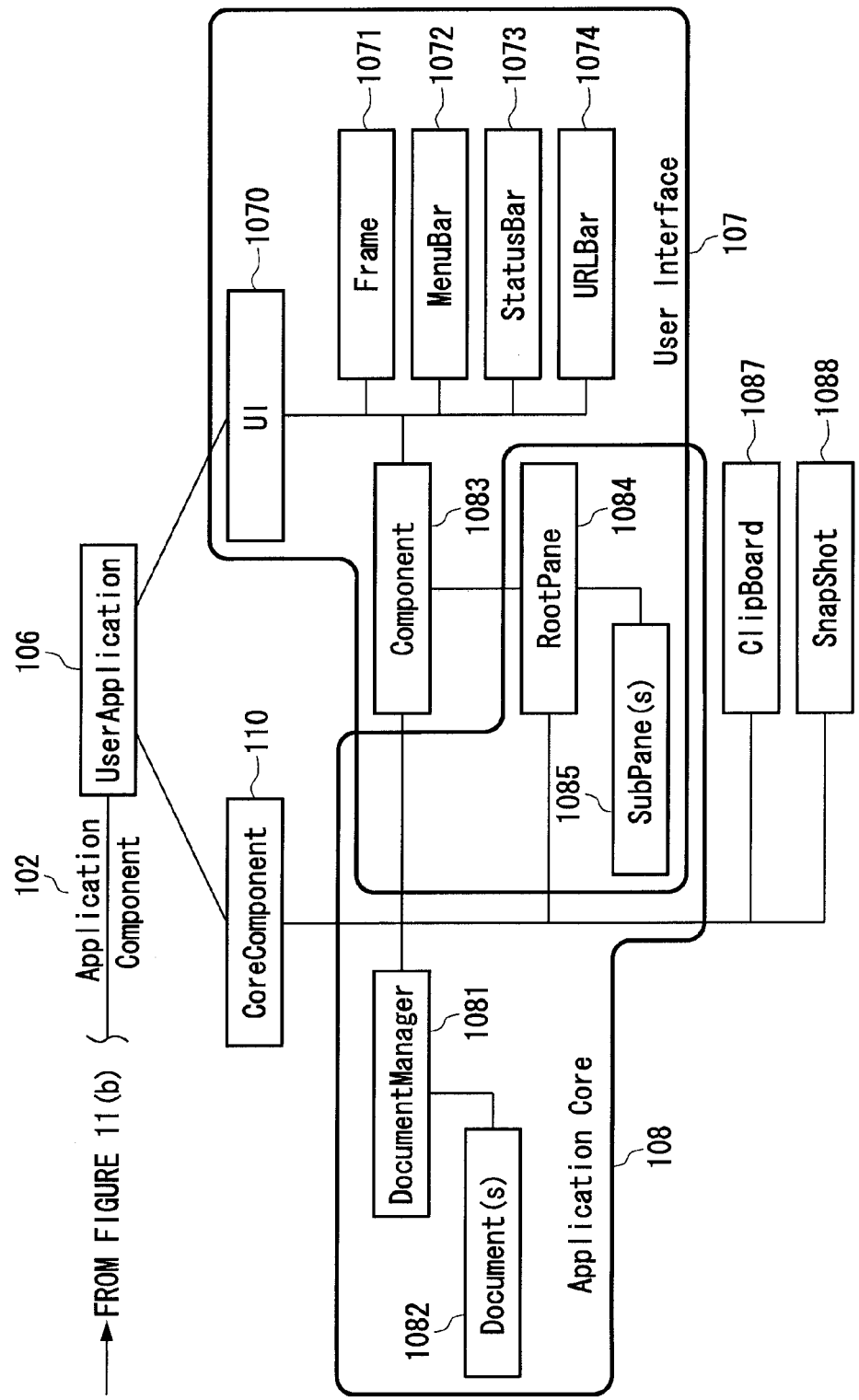

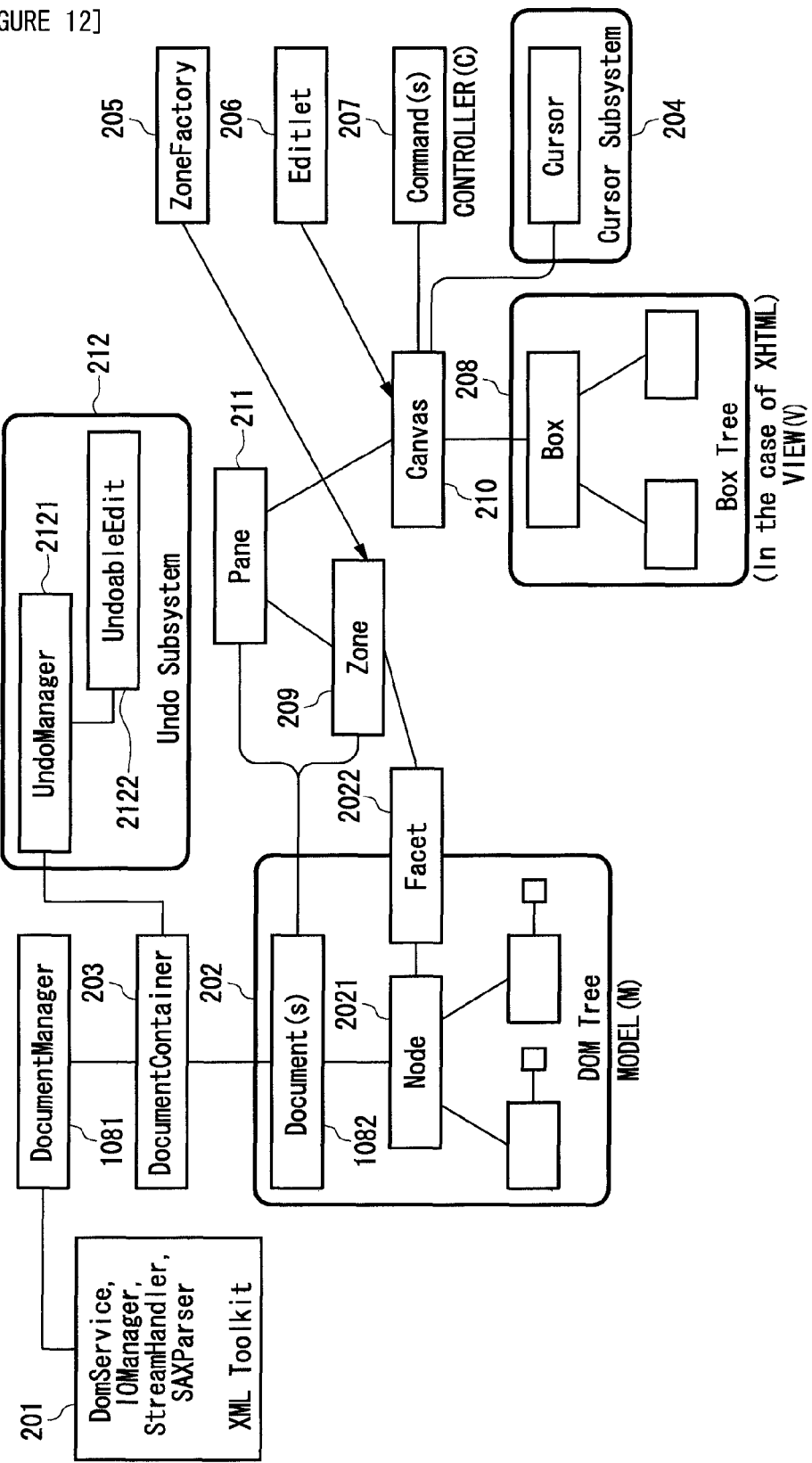
[FIGURE 12]

[FIGURE 13]
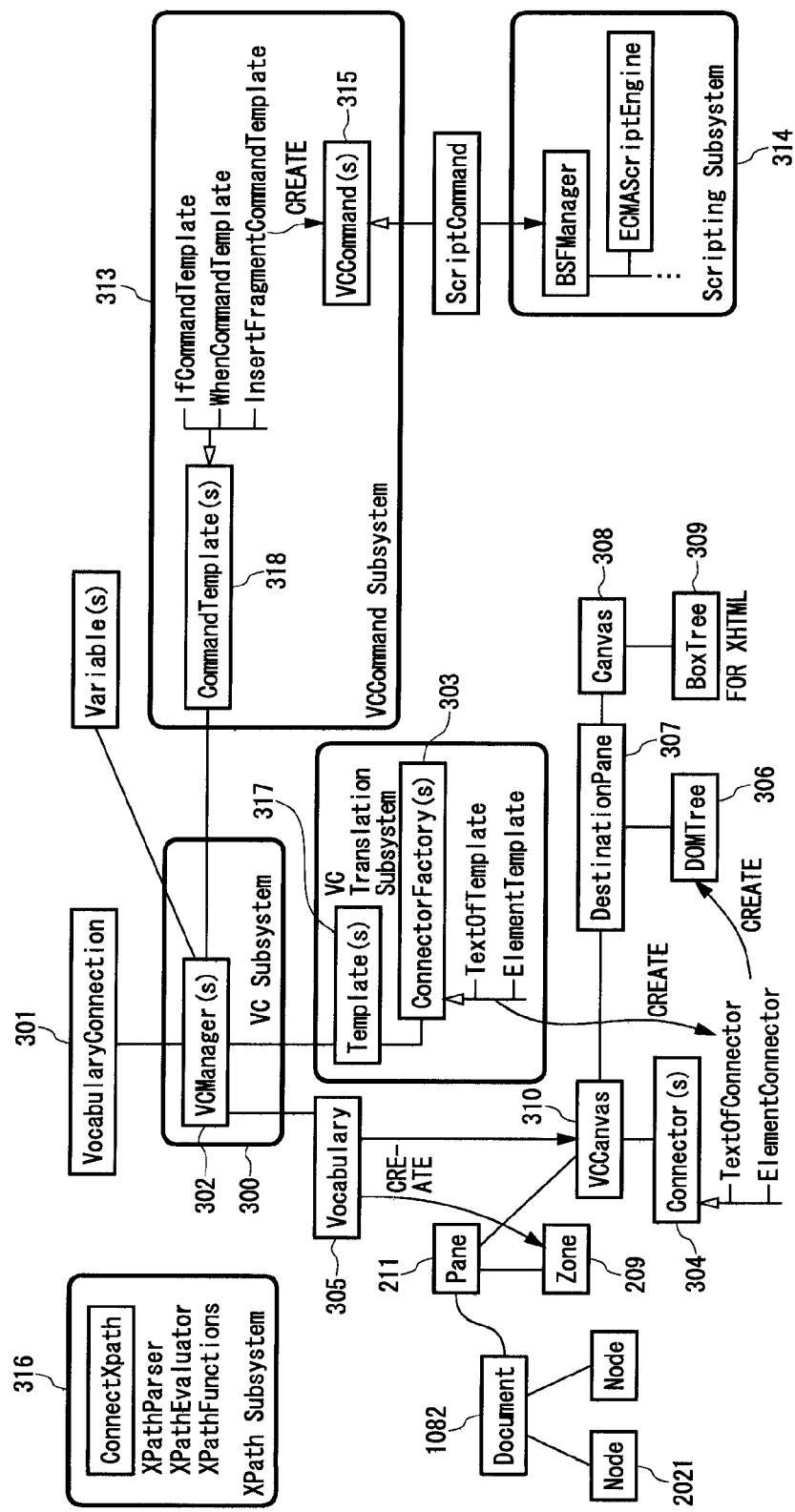

[FIGURE 14]
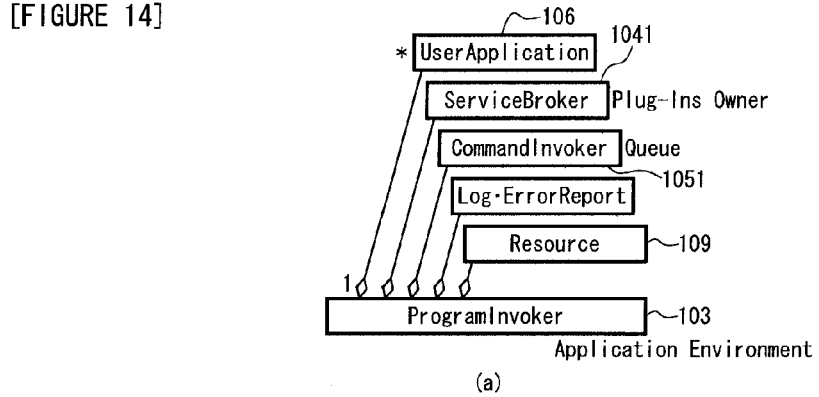
(a)
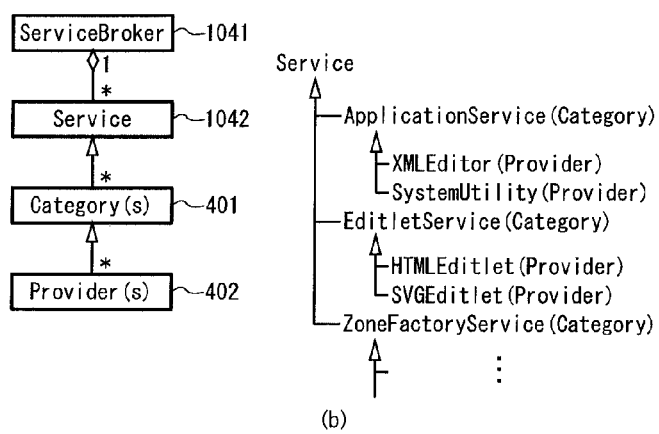
(b)
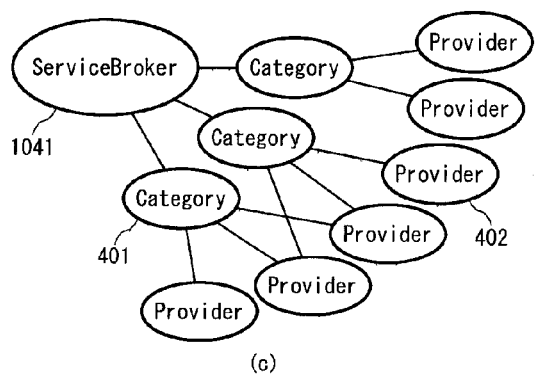
(c)
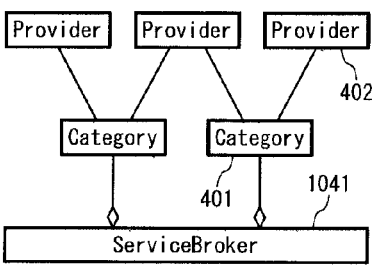
(d)
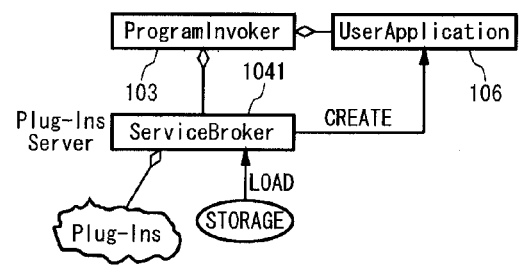
(e)

[FIGURE 15]
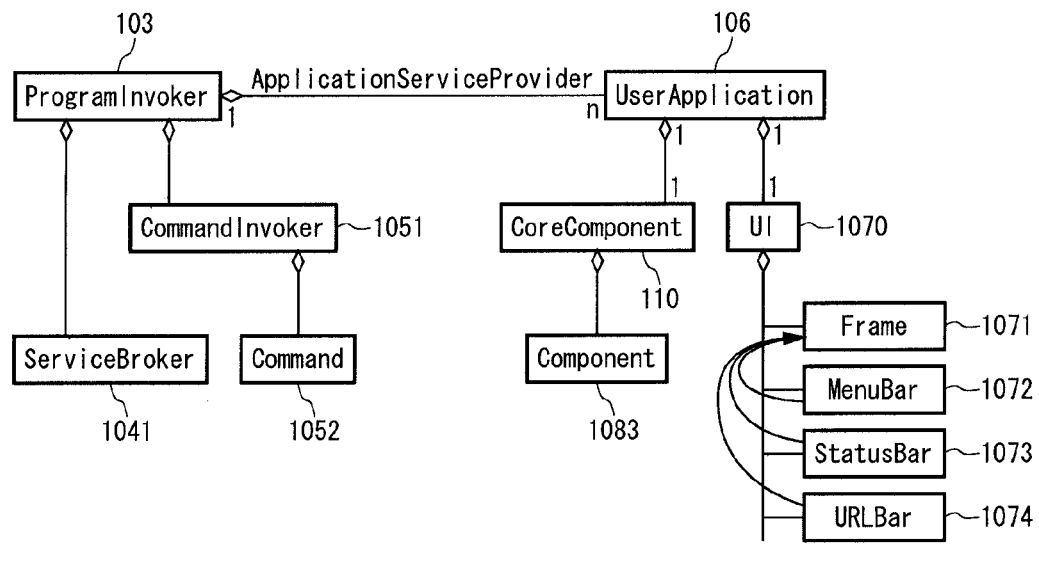
(a)
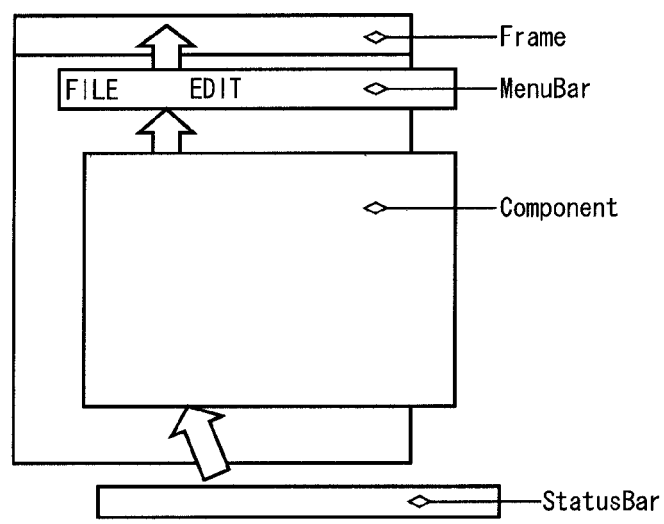
(b)

[FIGURE 16]
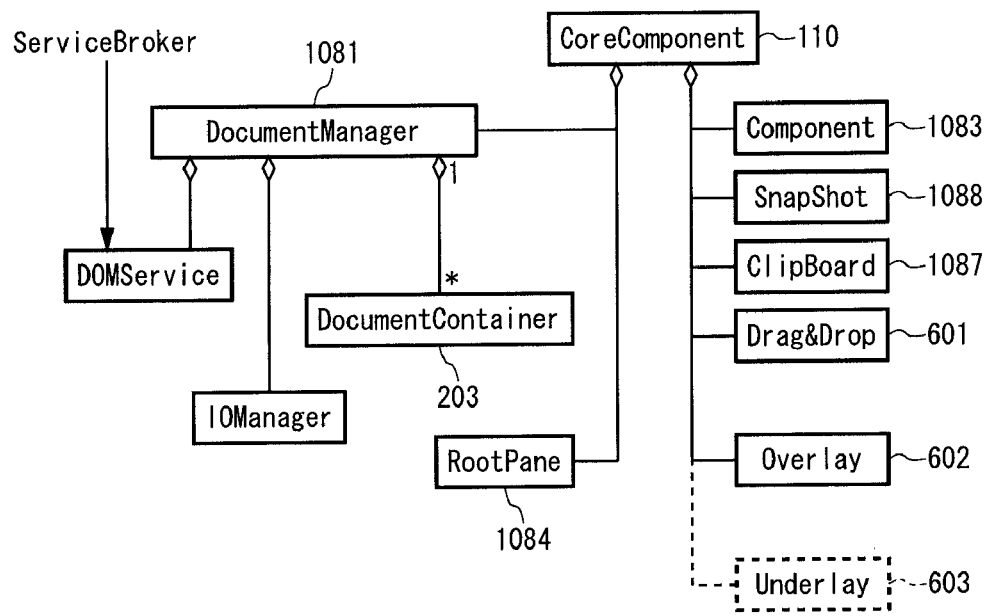
(a)
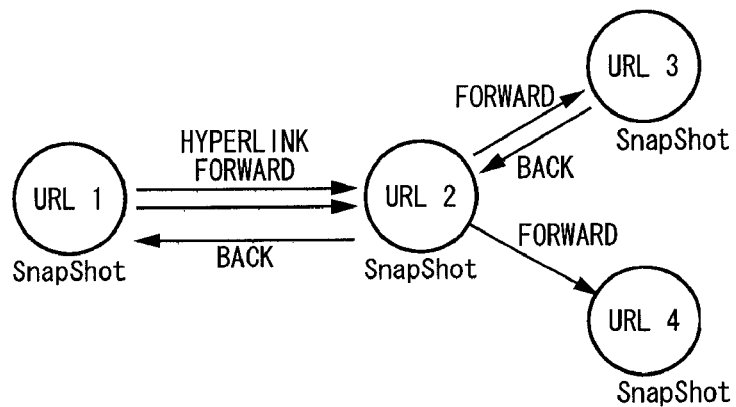
(b)

[FIGURE 17]
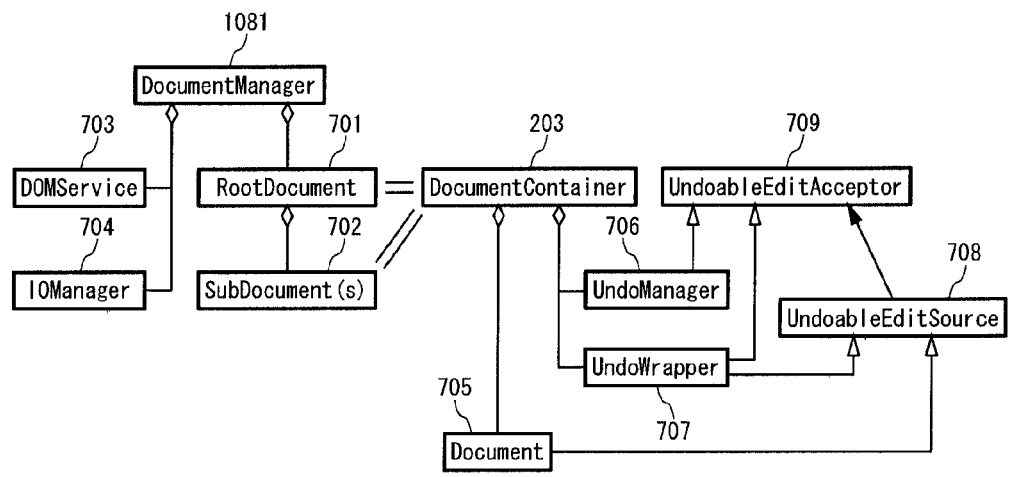
(a)
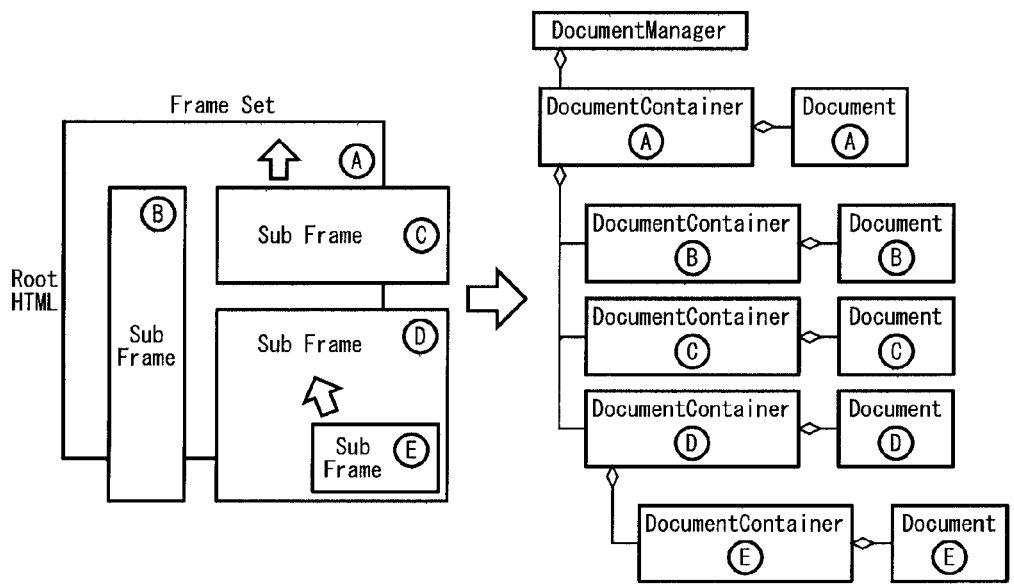
(b)

[FIGURE 18]
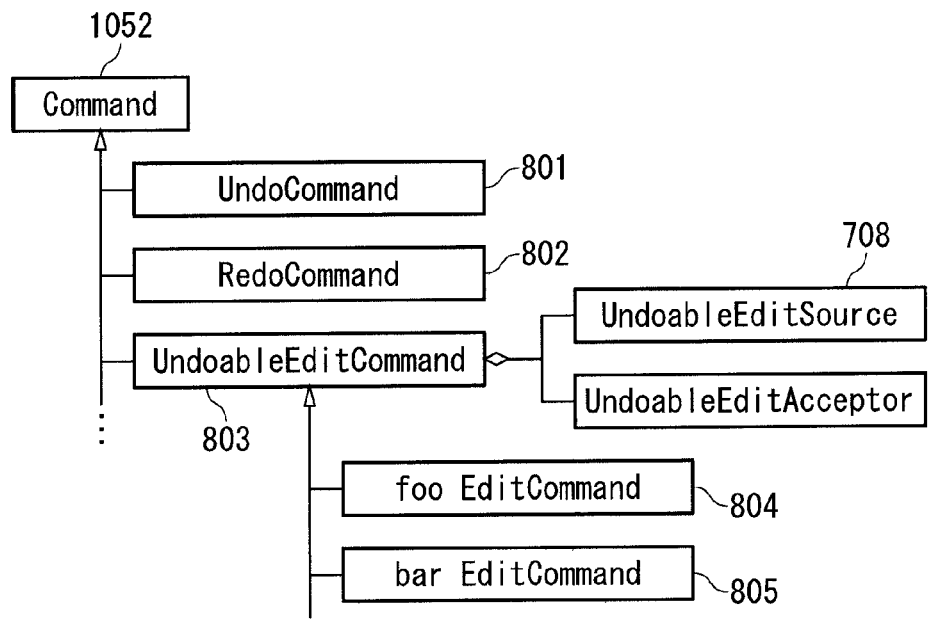
(a)
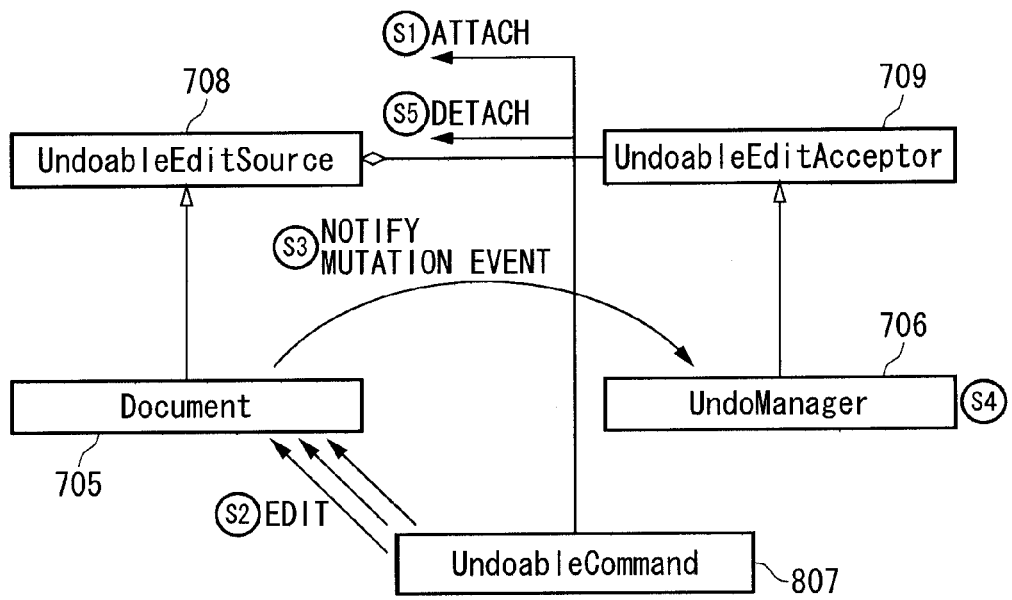
(b)

[FIGURE 19]
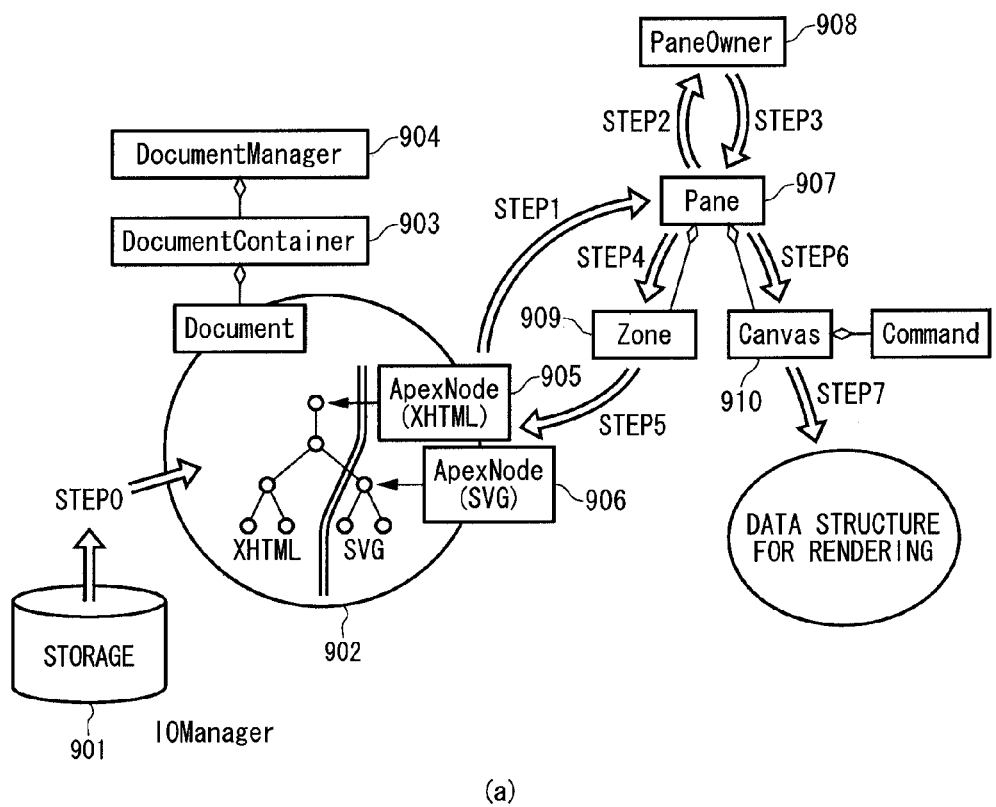
(a)
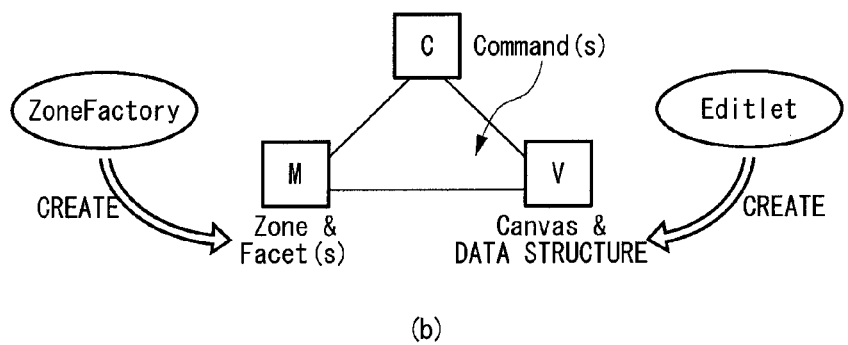
(b)

[FIGURE 20]
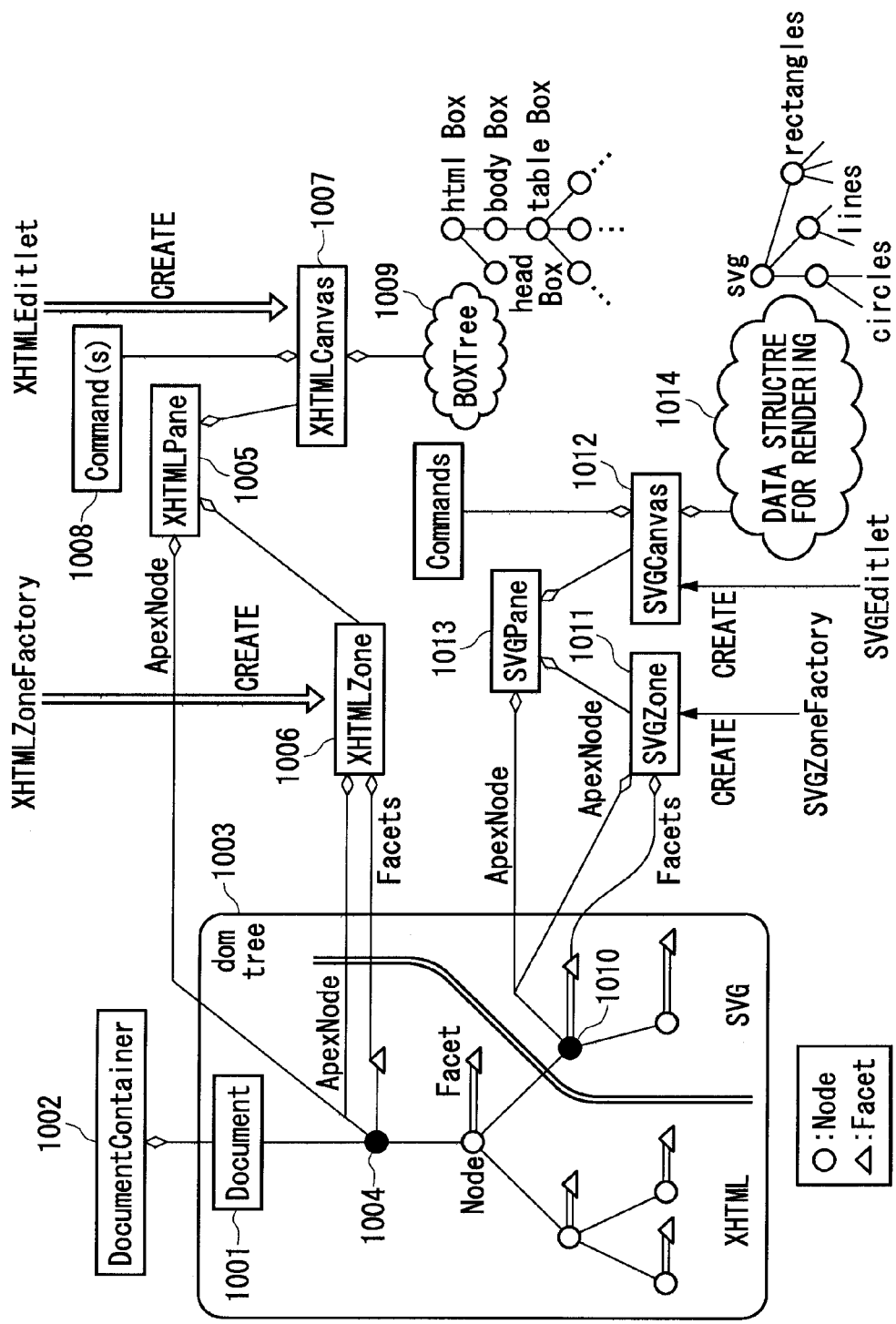

[FIGURE 21]
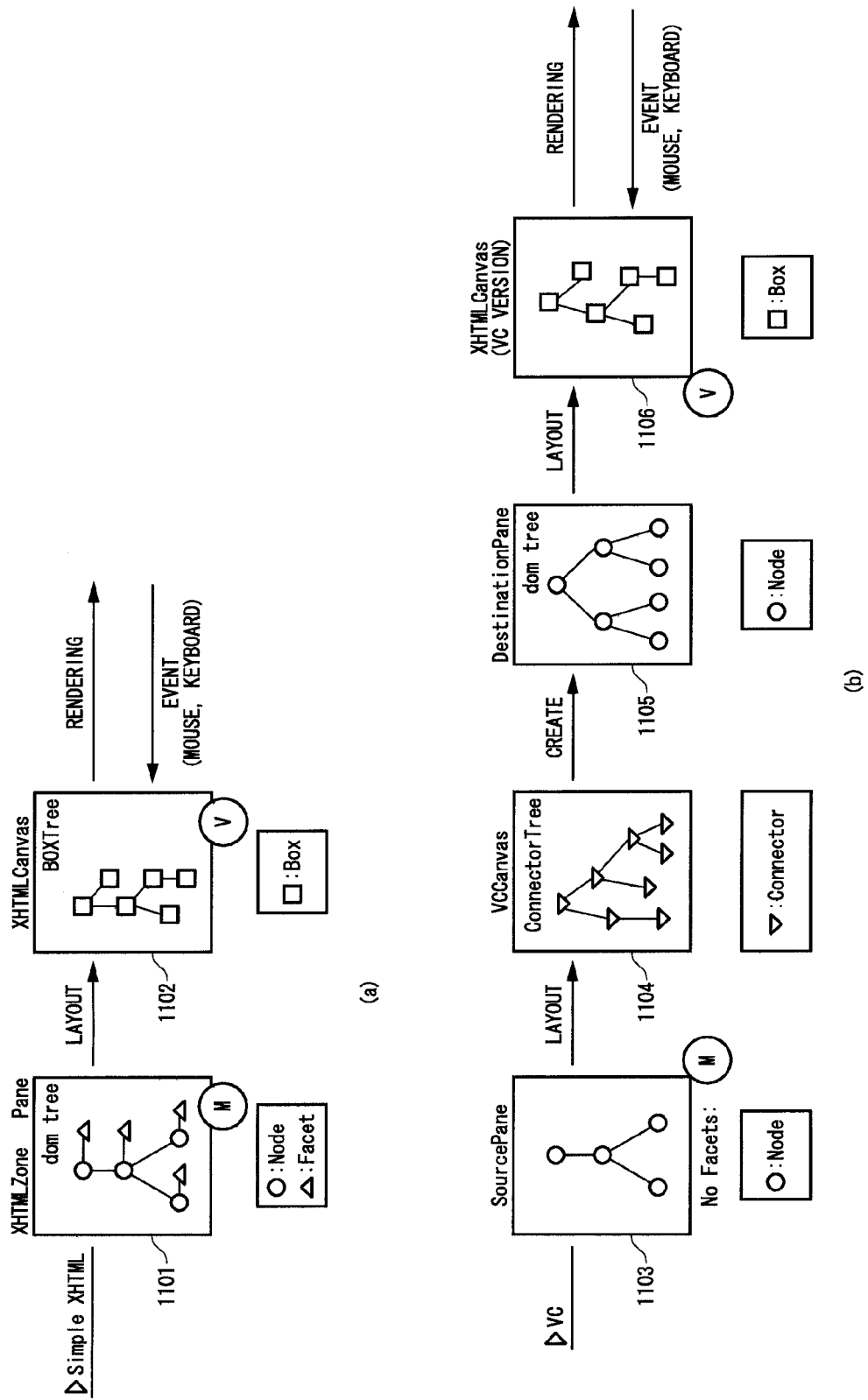

[FIGURE 22]
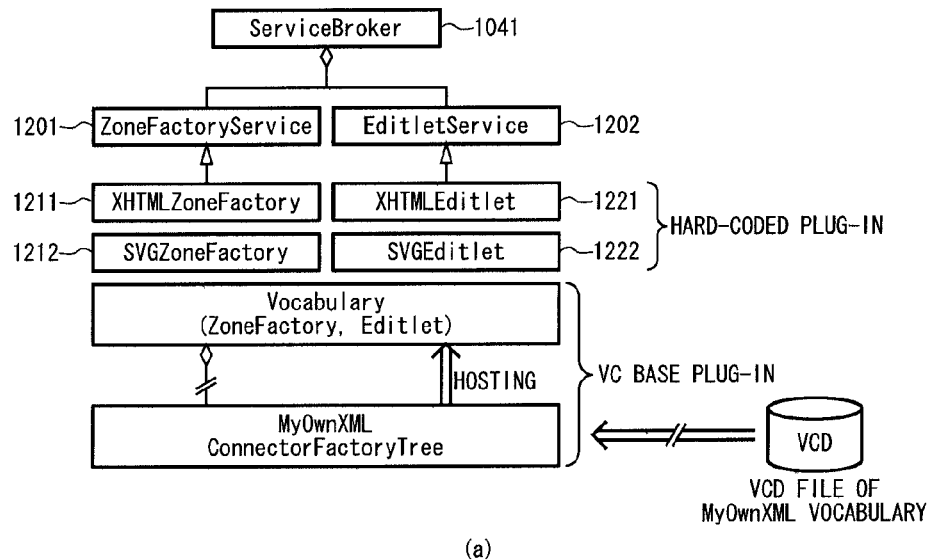
(a)
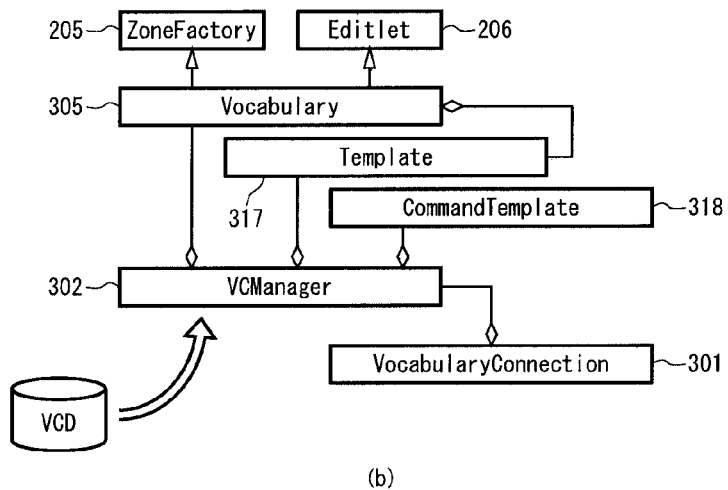
(b)
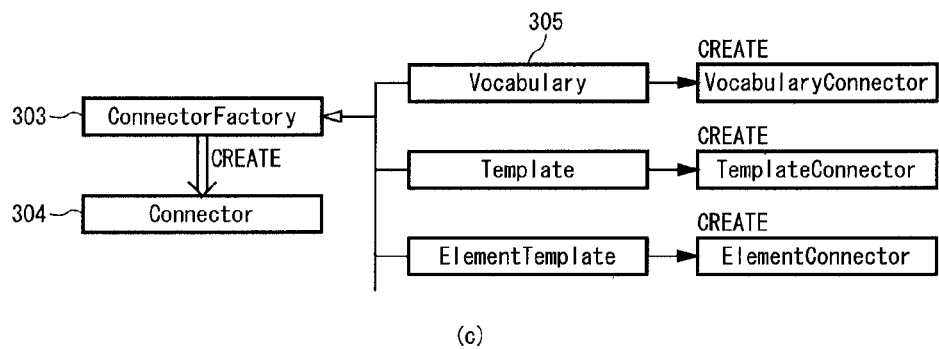
(c)

[FIGURE 23]
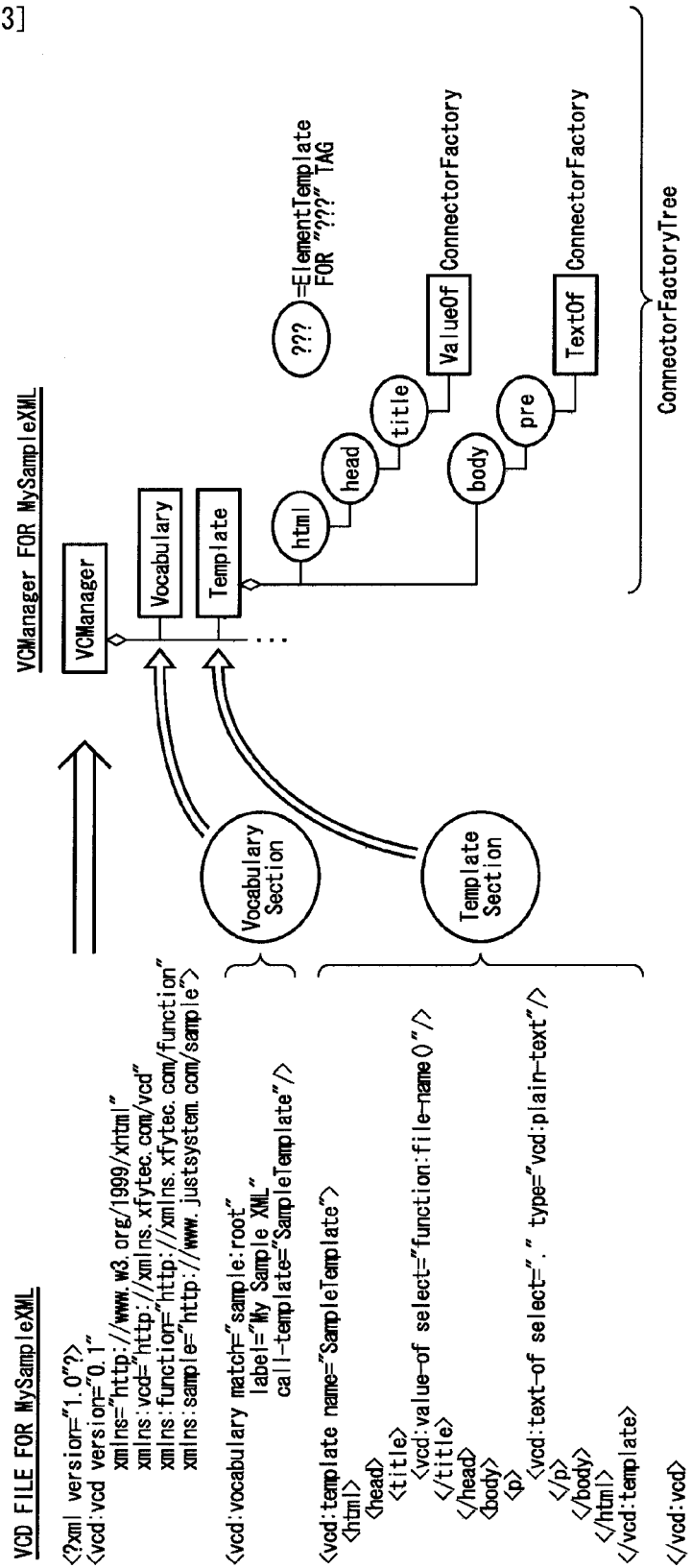

[FIGURE 24]
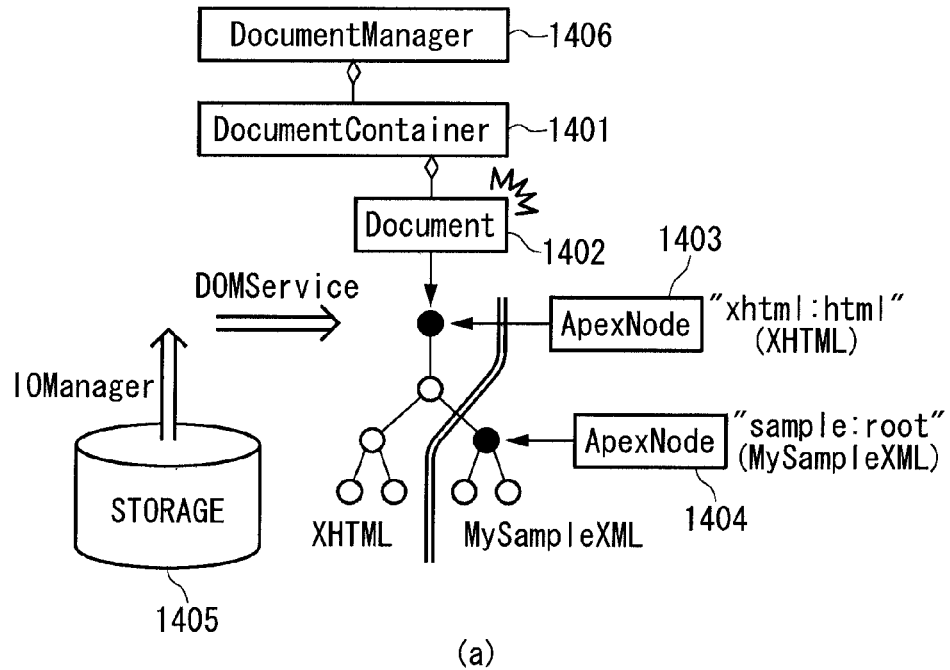
(a)
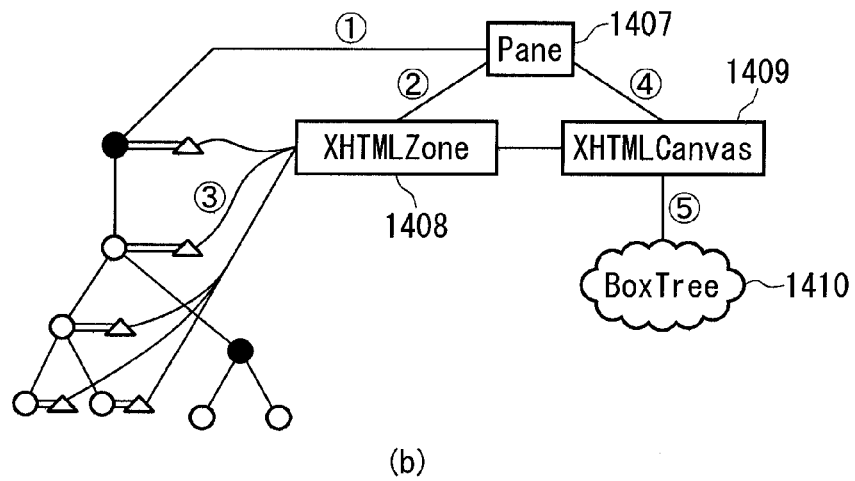
(b)
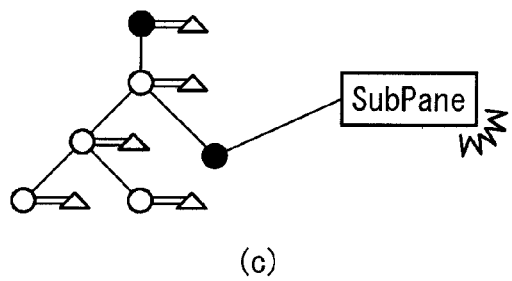
(c)

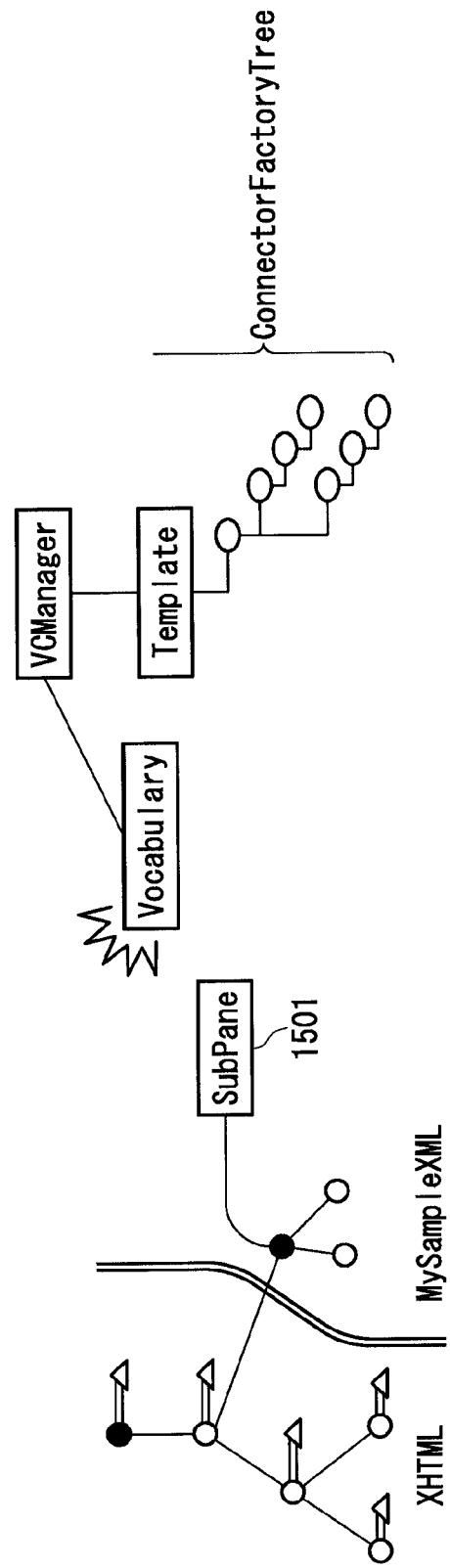
[FIGURE 25]

[FIGURE 26]
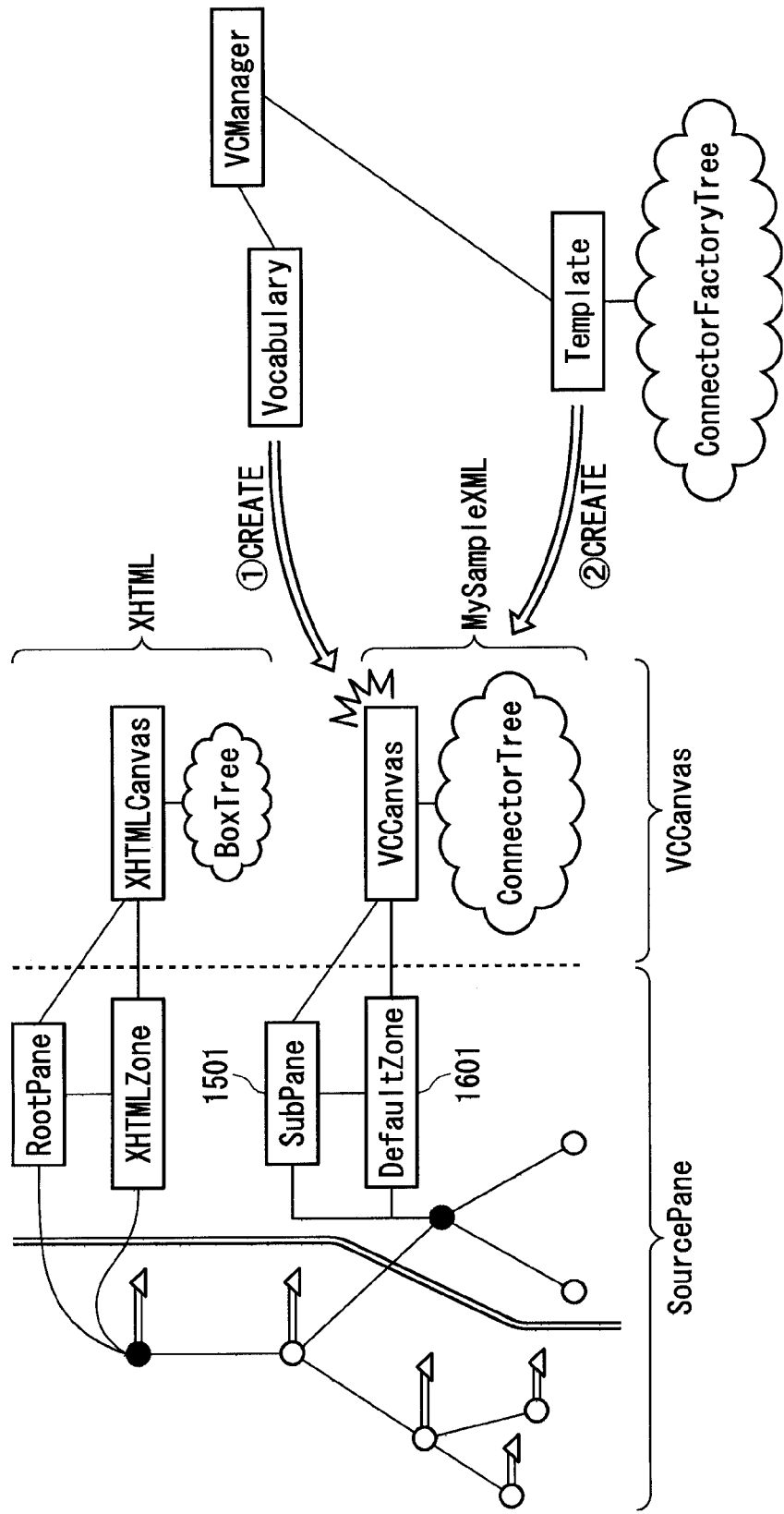

[FIGURE 27]
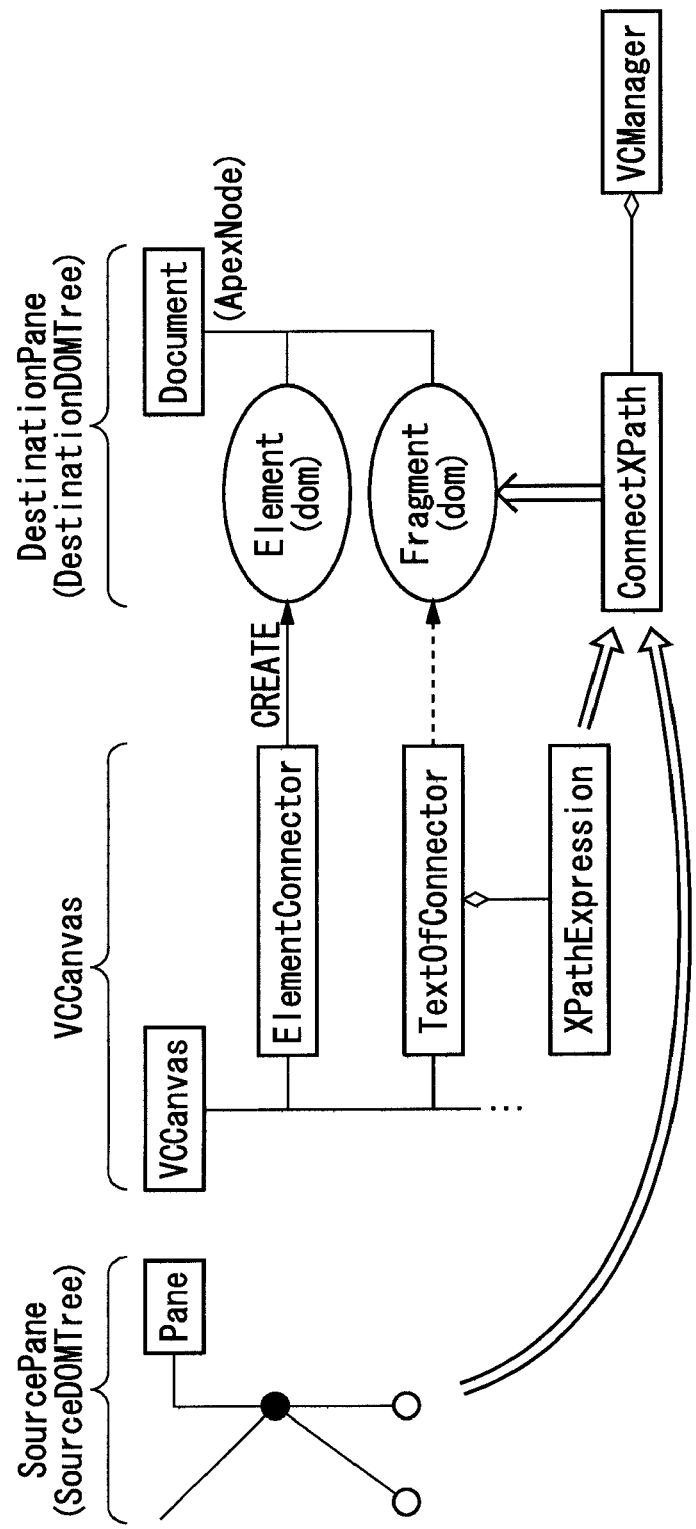

[FIGURE 28]
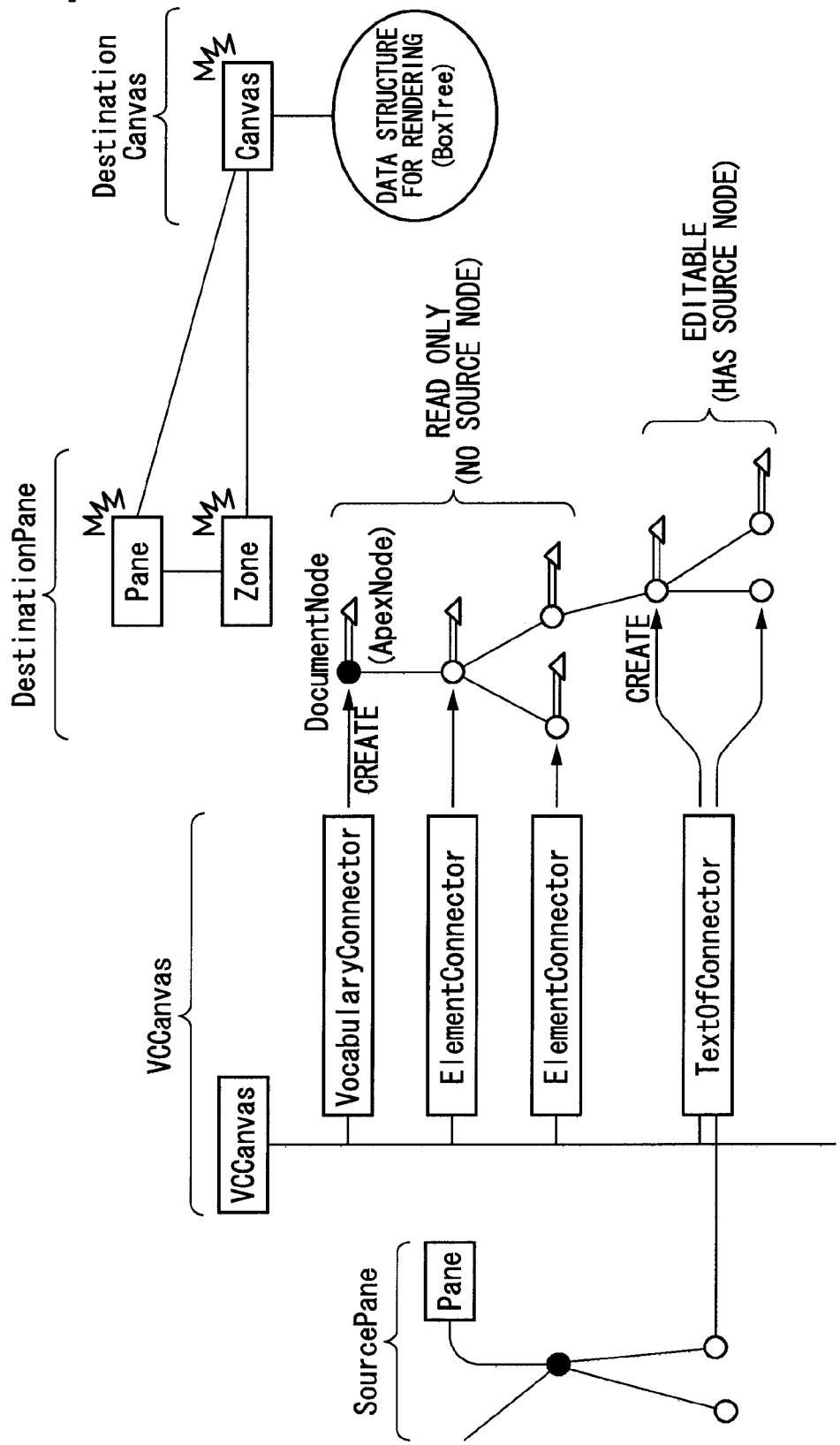

[FIGURE 29]
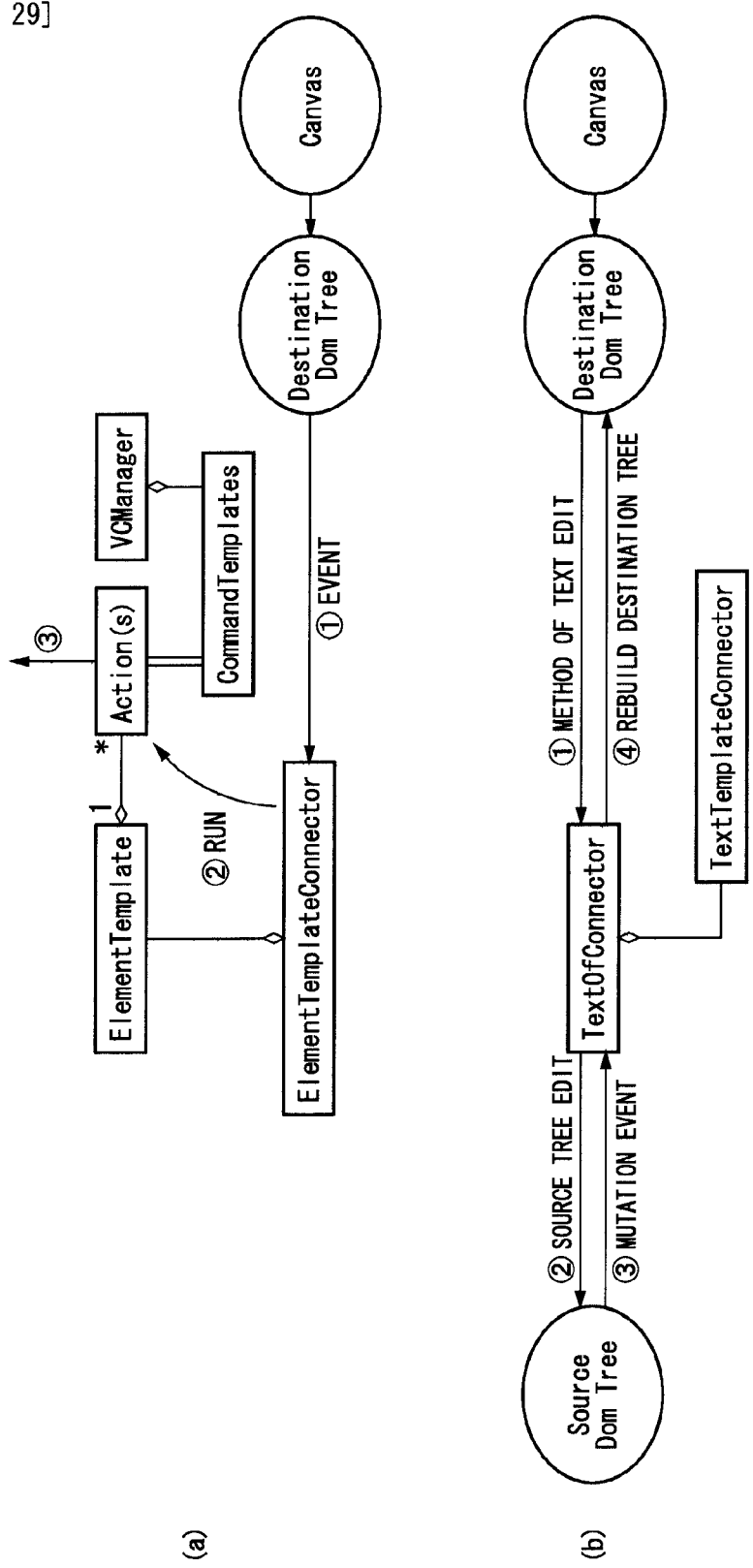

[FIGURE 30]
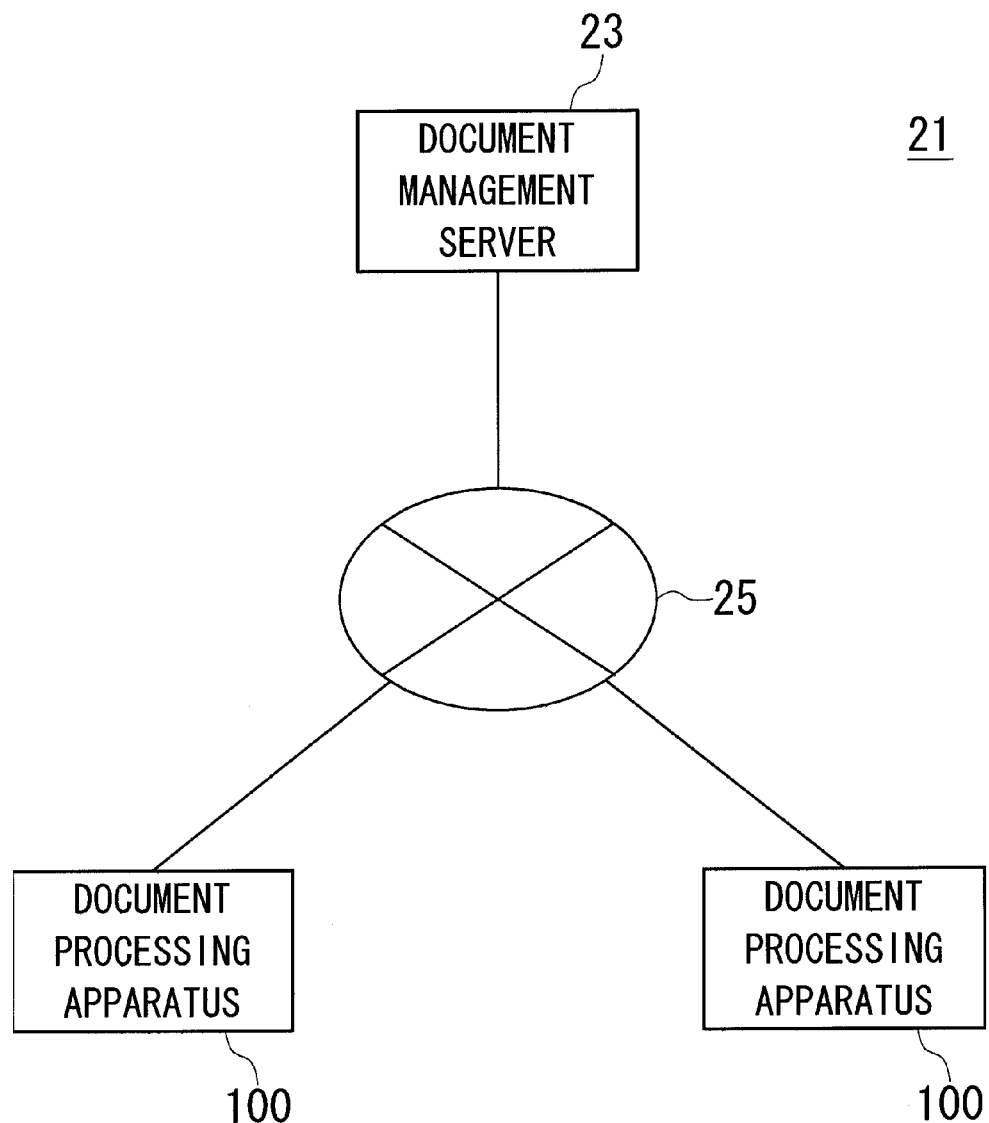

[FIGURE 31]
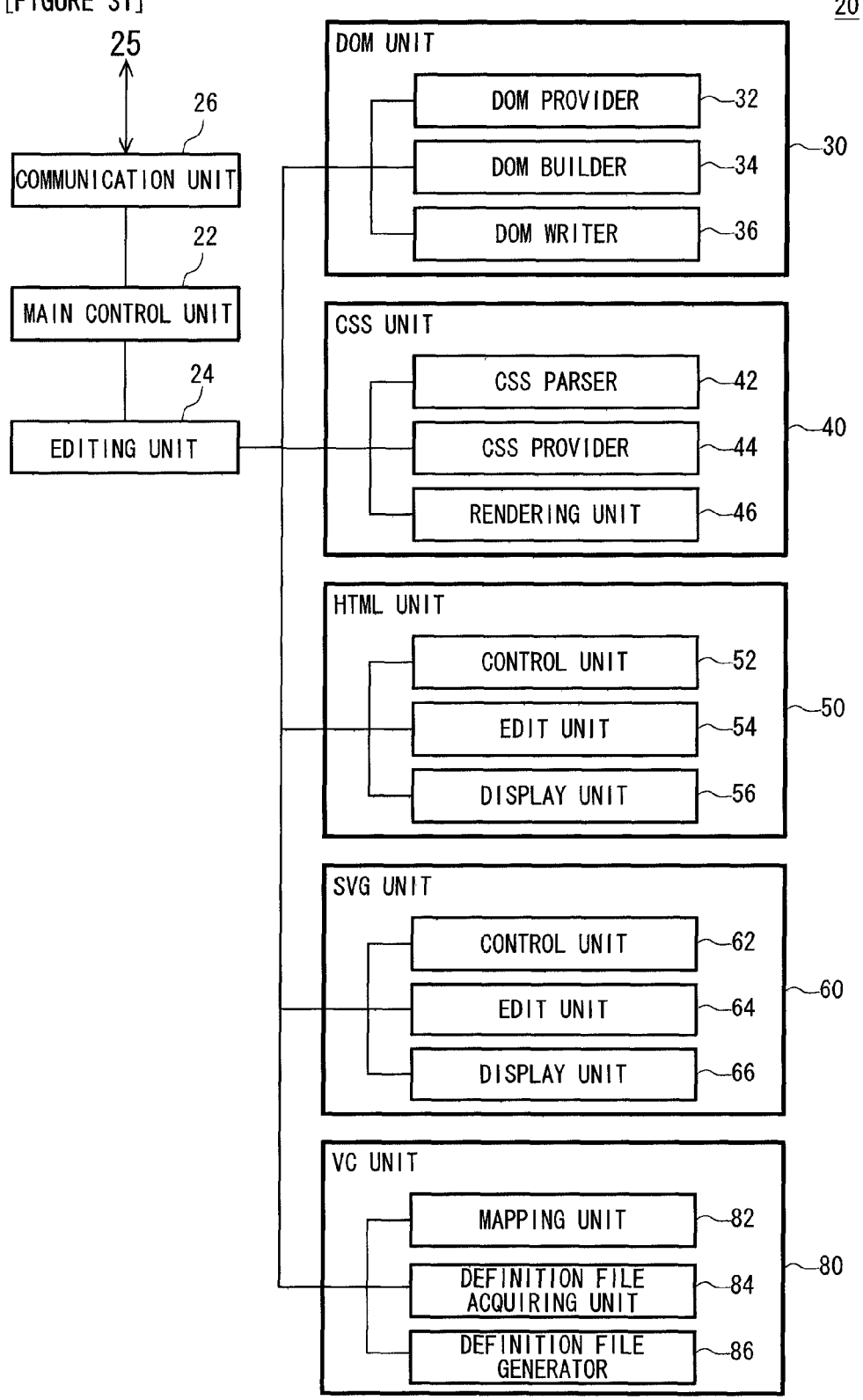

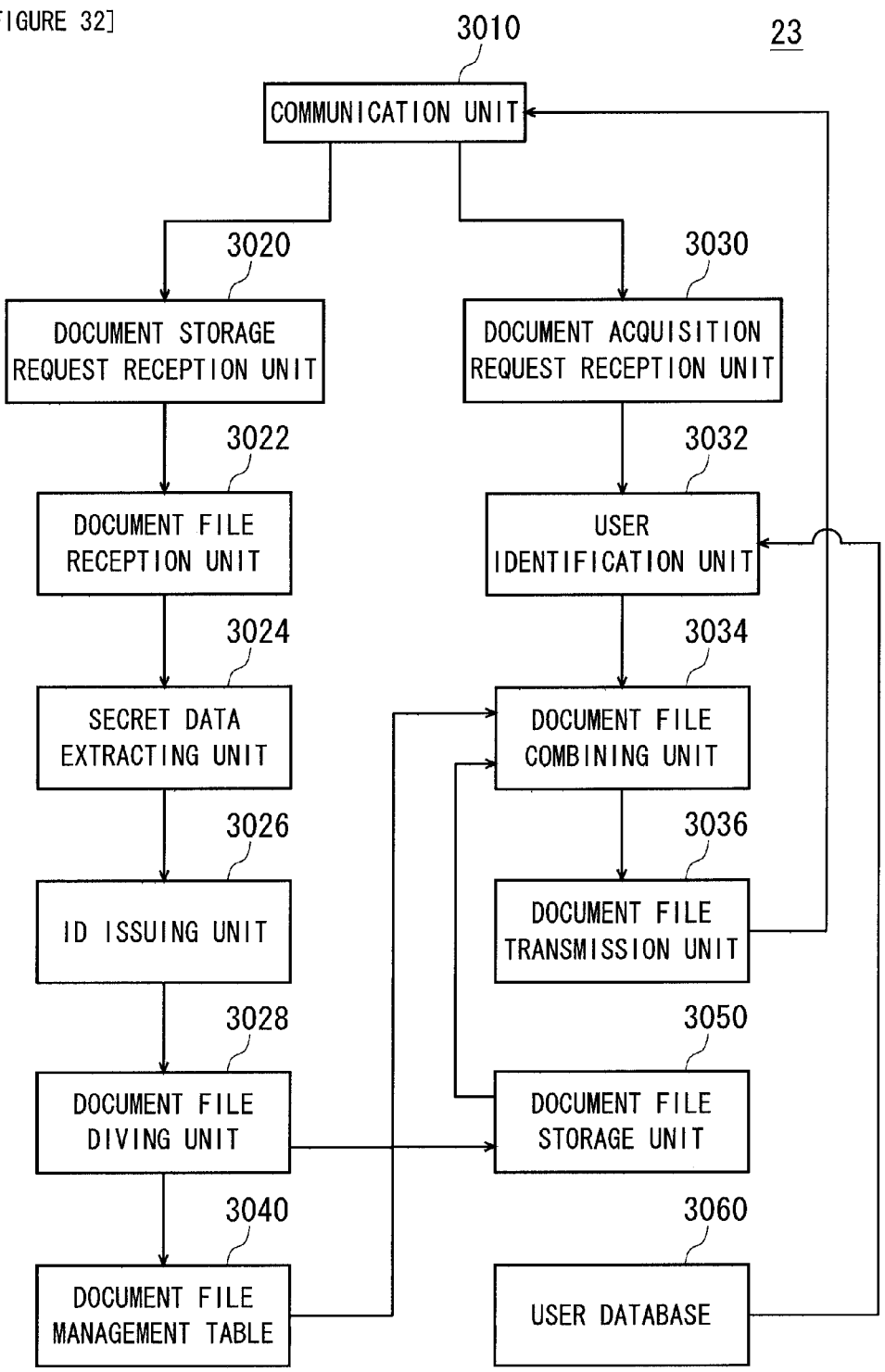
[FIGURE 32]

[FIGURE 33]

| DOCUMENT FILENAME | CORRESPONDENCE INFORMATION | | CORRESPONDENCE INFORMATION | |
|---|---|---|---|---|
| | CERTIFICATION LEVEL | SECRET FILENAME | CERTIFICATION LEVEL | SECRET FILENAME |
| sample.xml | 1 | anonymous1.xml | 2 | anonymous2.xml |
| . | . | . | . | . |

| USER ID | PASSWORD | CERTIFICATION LEVEL |
|---|---|---|
| 0001 | **** | 1 |
| 0002 | **** | 2 |
| 0003 | **** | 1 |
| . | . | . |

```xml
<?xml version="1.0"?>
<?com.xfytec vocabulary-connection href="sample.vcd" ?>

<xmail:xmail xmlns:xmail="http://www.justsystem.co.jp/2004/xmail">
    <xmail:title>
        INVENTOR LIST
    </xmail:title>
    <xmail:comment>
        MANY THANKS FOR YOUR CONTINUOUS SUPPORT.
        WE ARE PLEASED TO SEND YOU THE INVENTOR LIST, AS MENTIONED EARLIER.
        <xmail:list>
            <xmail:lt>
                INVENTOR LIST
            </xmail:lt>
            <xmail:person>
                <xmail:name>
                    TOKUSHIMA TARO
                </xmail:name>
                <xmail:address>
                    XX, HIRAISHIWAKAMATSU, KAWAUCHI-CHO,
                    TOKUSHIMA-SHI, TOKUSHIMA
                </xmail:address>
            </xmail:person>
            <xmail:person>
                <xmail:name>
                    AWA HANAKO
                </xmail:name>
                <xmail:address>
                    XX, HIRAISHIWAKAMATSU, KAWAUCHI-CHO,
                    TOKUSHIMA-SHI, TOKUSHIMA
                </xmail:address>
            </xmail:person>
            <xmail:person>
                <xmail:name>
                    SHIKOKU SABURO
                </xmail:name>
                <xmail:address>
                    XX, HIRAISHIWAKAMATSU, KAWAUCHI-CHO,
                    TOKUSHIMA-SHI, TOKUSHIMA
                </xmail:address>
            </xmail:person>
        </xmail:list>
        A TOTAL OF THREE PERSONS
    </xmail:comment>
</xmail:xmail>
```

[FIGURE 36]

```
<?xml version="1.0"?>

<vcd:vcd
    xmlns:xmail="http://www.justsystem.co.jp/2004/xmail"
    xmlns:vcd="http://xmlns.xfytec.com/vcd"
    xmlns="http://www.w3.org/1999/xhtml"
    version="0.01">
    <vcd:vocabulary match="xmail:xmail" label="xmail" call-template="root">
    </vcd:vocabulary>

<!-- beggining of root element -->
    <vcd:template name="root">
        <html>
        <head>
            <title>
                <vcd:value-of select="xmail:title/text()" />
            </title>
        </head>
        <body>
            <h1>
                <vcd:value-of select="xmail:title/text()" />
            </h1>
            <vcd:apply-templates select="xmail:comment" />
        </body>
        </html>
    </vcd:template>

<vcd:template match="xmail:comment">
        <p><vcd:value-of select="text()" /></p>
        <vcd:apply-templates select="xmail:list" />
    </vcd:template>

<vcd:template match="xmail:list">
        <table>
            <tr><th><vcd:value-of select="xmail:lt/text()" /></th></tr>
            <tr><td>NAME</td><td>ADDRESS</td></tr>

<vcd:apply-templates select="xmail:person" />
        </table>
    </vcd:template>

<vcd:template match="xmail:person">
        <tr>
            <td><vcd:apply-templates select="xmail:name" /></td>
            <td><vcd:apply-templates select="xmail:address" /></td>
        </tr>
    </vcd:template>

<vcd:template match="xmail:name">
        <vcd:value-of select="text()" />
    </vcd:template>

<vcd:template match="xmail:address">
        <vcd:value-of select="text()" />
    </vcd:template>

</vcd:vcd>
```

INVENTOR LIST

MANY THANKS FOR YOUR CONTINUOUS SUPPORT.
WE ARE PLEASED TO SEND YOU THE INVENTOR LIST, AS MENTIONED EARLIER.

INVENTOR LIST

| NAME | ADDRESS |
|---|---|
| TOKUSHIMA TARO | XX, HIRAISHIWAKAMATSU, KAWAUCHI-CHO, TOKUSHIMA-SHI, TOKUSHIMA |
| AWA HANAKO | XX, HIRAISHIWAKAMATSU, KAWAUCHI-CHO, TOKUSHIMA-SHI, TOKUSHIMA |
| SHIKOKU SABURO | XX, HIRAISHIWAKAMATSU, KAWAUCHI-CHO, TOKUSHIMA-SHI, TOKUSHIMA |

[FIGURE 38]

```
<?xml version="1.0"?>
<?com.xfytec vocabulary-connection href="sample.vcd" ?>

<xmail:xmail xmlns:xmail="http://www.justsystem.co.jp/2004/xmail">
    <xmail:title>
        INVENTOR LIST
    </xmail:title>
    <xmail:comment>
        MANY THANKS FOR YOUR CONTINUOUS SUPPORT.
        WE ARE PLEASED TO SEND YOU THE INVENTOR LIST, AS MENTIONED EARLIER.
        <xmail:list>
            <xmail:lt>
                INVENTOR LIST
            </xmail:lt>
            <xmail:person>
                <xmail:name>
                    <xmail:secret level="1">
                        TOKUSHIMA TARO
                    </xmail:secret>
                </xmail:name>
                <xmail:address>
                    <xmail:secret level="2">
                        XX, HIRAISHIWAKAMATSU, KAWAUCHI-CHO,
                        TOKUSHIMA-SHI, TOKUSHIMA
                    </xmail:secret>
                </xmail:address>
            </xmail:person>
            <xmail:person>
                <xmail:secret level="1">
                    AWA HANAKO
                </xmail:secret>
                <xmail:address>
                    <xmail:secret level="2">
                        XX, HIRAISHIWAKAMATSU, KAWAUCHI-CHO,
                        TOKUSHIMA-SHI, TOKUSHIMA
                    </xmail:secret>
                </xmail:address>
            </xmail:person>
            <xmail:person>
                <xmail:secret level="1">
                    SHIKOKU SABURO
                </xmail:secret>
                <xmail:address>
                    <xmail:secret level="2">
                        XX, HIRAISHIWAKAMATSU, KAWAUCHI-CHO,
                        TOKUSHIMA-SHI, TOKUSHIMA
                    </xmail:secret>
                </xmail:address>
            </xmail:person>
        </xmail:list>
        A TOTAL OF THREE PERSONS
    </xmail:comment>
</xmail:xmail>
```

[FIGURE 39]

```
<?xml version="1.0"?>
<?com.xfytec vocabulary-connection href="sample.vcd" ?>

<xmail:xmail xmlns:xmail="http://www.justsystem.co.jp/2004/xmail">
    <xmail:title>
        INVENTOR LIST
    </xmail:title>
    <xmail:comment>
        MANY THANKS FOR YOUR CONTINUOUS SUPPORT.
        WE ARE PLEASED TO SEND YOU THE INVENTOR LIST, AS MENTIONED EARLIER.
        <xmail:list>
            <xmail:lt>
                INVENTOR LIST
            </xmail:lt>
            <xmail:person>
                <xmail:name>
                    <xmail:anonymous id="0001" />
                </xmail:name>
                <xmail:address>
                    <xmail:anonymous id="0004" />
                </xmail:address>
            </xmail:person>
            <xmail:person>
                <xmail:name>
                    <xmail:anonymous id="0002" />
                </xmail:name>
                <xmail:address>
                    <xmail:anonymous id="0004" />
                </xmail:address>
            </xmail:person>
            <xmail:person>
                <xmail:name>
                    <xmail:anonymous id="0003" />
                </xmail:name>
                <xmail:address>
                    <xmail:anonymous id="0004" />
                </xmail:address>
            </xmail:person>
        </xmail:list>
        A TOTAL OF THREE PERSONS
    </xmail:comment>
</xmail:xmail>
```

[FIGURE 40]

```
<?xml version="1.0"?>
<anonymous xmlns="http://www.justsystem.co.jp/2004/anonymous">
    <item>
        <serial>0001</serial>
        <name>TOKUSHIMA TARO</name>
    </item>
    <item>
        <serial>0002</serial>
        <name>AWA HANAKO</name>
    </item>
    <item>
        <serial>0003</serial>
        <name>SHIKOKU SABURO</name>
    </item>
</anonymous>
```

[FIGURE 41]

```
<?xml version="1.0"?>
<anonymous xmlns="http://www.justsystem.co.jp/2004/anonymous">
    <item>
        <serial>0001</serial>
        <name>TOKUSHIMA TARO</name>
    </item>
    <item>
        <serial>0002</serial>
        <name>AWA HANAKO</name>
    </item>
    <item>
        <serial>0003</serial>
        <name>SHIKOKU SABURO</name>
    </item>
    <item>
        <serial>0004</serial>
        <name>
            XX, HIRAISHIWAKAMATSU, KAWAUCHI-CHO,
            TOKUSHIMA-SHI, TOKUSHIMA
        </name>
    </item>
</anonymous>
```

[FIGURE 42]

```
<?xml version="1.0"?>

<vcd:vcd
    xmlns:xmail="http://www.justsystem.co.jp/2004/xmail"
    xmlns:vcd="http://xmlns.xfytec.com/vcd"
    xmlns="http://www.w3.org/1999/xhtml"
4012 ─xmlns:anonymous="http://www.justsystem.co.jp/2004/annonymous"
    version="0.01">
    <vcd:vocabulary match="xmail:xmail" label="xmail" call-template="root">
    </vcd:vocabulary>

<!-- beggining of root element -->
    <vcd:template name="root">
        <html>
        <head>
            <title>
                <vcd:value-of select="xmail:title/text()" />
            </title>
        </head>
4000    <body>
            <h1>
                <vcd:value-of select="xmail:title/text()" />
            </h1>
            <vcd:apply-templates select="xmail:comment" />
        </body>
        </html>
    </vcd:template>

<vcd:template match="xmail:comment">
        <p><vcd:value-of select="text()" /></p>
4002    <vcd:apply-templates select="xmail:list" />
    </vcd:template>

<vcd:template match="xmail:list">
        <table>
            <tr><th><vcd:value-of select="xmail:lt/text()" /></th></tr>
            <tr><td>NAME</td><td>ADDRESS</td></tr>
4004
            <vcd:apply-templates select="xmail:person" />
        </table>
    </vcd:template>

<vcd:template match="xmail:person">
        <tr>
            <td><vcd:apply-templates select="xmail:name" /></td>
4006        <td><vcd:apply-templates select="xmail:address" /></td>
        </tr>
    </vcd:template>

<vcd:template match="xmail:name">
        <!-- anonymous/@id IS A DESCRIPTION FOR DISPLAYING A SERIAL NUMBER -->
        <!-- IT CAN BE REPLACED BY A COMMAND FOR DISPLAYING AN ICON, FOR EXAMPLE. -->
4014    <anonymous:value-of select="xmail:anonymous/@id" />
    </vcd:template>

<vcd:template match="xmail:address">
4016    <anonymous:value-of select="xmail:anonymous/@id" />
    </vcd:template>

</vcd:vcd>
```

[FIGURE 43]

INVENTOR LIST

MANY THANKS FOR YOUR CONTINUOUS SUPPORT.
WE ARE PLEASED TO SEND YOU THE INVENTOR LIST, AS MENTIONED EARLIER.

INVENTOR LIST

| NAME | ADDRESS |
|------|---------|
| 0001 | 0004 |
| 0002 | 0004 |
| 0003 | 0004 |

[FIGURE 44]

INVENTOR LIST

MANY THANKS FOR YOUR CONTINUOUS SUPPORT.
WE ARE PLEASED TO SEND YOU THE INVENTOR LIST, AS MENTIONED EARLIER.

INVENTOR LIST

| NAME | ADDRESS |
|------|---------|
| ? | ? |
| ? | ? |
| ? | ? |

[FIGURE 45]

```
INVENTOR LIST

MANY THANKS FOR YOUR CONTINUOUS SUPPORT.
WE ARE PLEASED TO SEND YOU THE INVENTOR LIST, AS MENTIONED EARLIER.

INVENTOR LIST
NAME              ADDRESS
TOKUSHIMA TARO    0004
AWA HANAKO        0004
SHIKOKU SABURO    0004
```

[FIGURE 46]

```
INVENTOR LIST

MANY THANKS FOR YOUR CONTINUOUS SUPPORT.
WE ARE PLEASED TO SEND YOU THE INVENTOR LIST, AS MENTIONED EARLIER.

INVENTOR LIST
NAME              ADDRESS
TOKUSHIMA TARO     [ ? ]

AWA HANAKO         [ ? ]

SHIKOKU SABURO     [ ? ]
```

[FIGURE 47]

```
<?xml version="1.0"?>
<?com.xfytec vocabulary-connection href="anonymous.vcd" ?>

<xmail:xmail xmlns:xmail="http://www.justsystem.co.jp/2004/xmail">
    <xmail:title>
        INVENTOR LIST
    </xmail:title>
    <xmail:comment>
        MANY THANKS FOR YOUR CONTINUOUS SUPPORT.
        WE ARE PLEASED TO SEND YOU THE INVENTOR LIST, AS MENTIONED EARLIER.
        <xmail:list>
            <xmail:lt>
                INVENTOR LIST
            </xmail:lt>
            <xmail:person>
                <xmail:name>
                    <xmail:anonymous id="0001">
                        ANONYMOUS A
                    </xmail:anonymous>
                </xmail:name>
                <xmail:address>
                    <xmail:anonymous id="0004" />
                </xmail:address>
            </xmail:person>
            <xmail:person>
                <xmail:name>
                    <xmail:anonymous id="0002">
                        ANONYMOUS B
                    </xmail:anonymous>
                </xmail:name>
                <xmail:address>
                    <xmail:anonymous id="0004" />
                </xmail:address>
            </xmail:person>
            <xmail:person>
                <xmail:name>
                    <xmail:anonymous id="0003">
                        ANONYMOUS C
                    </xmail:anonymous>
                </xmail:name>
                <xmail:address>
                    <xmail:anonymous id="0004" />
                </xmail:address>
            </xmail:person>
        </xmail:list>
        A TOTAL OF THREE PERSONS
    </xmail:comment>
</xmail:xmail>
```

[FIGURE 48]

```xml
<?xml version="1.0"?>

<vcd:vcd
    xmlns:xmail="http://www.justsystem.co.jp/2004/xmail"
    xmlns:vcd="http://xmlns.xfytec.com/vcd"
    xmlns="http://www.w3.org/1999/xhtml"
    xmlns:anonymous="http://www.justsystem.co.jp/2004/annonymous"
    version="0.01">
    <vcd:vocabulary match="xmail:xmail" label="xmail" call-template="root">
    </vcd:vocabulary>

<!-- beggining of root element -->
    <vcd:template name="root">
        <html>
        <head>
            <title>
                <vcd:value-of select="xmail:title/text()" />
            </title>
        </head>
        <body>
            <h1>
                <vcd:value-of select="xmail:title/text()" />
            </h1>
            <vcd:apply-templates select="xmail:comment" />
        </body>
        </html>
    </vcd:template>                                              — 4000

<vcd:template match="xmail:comment">
        <p><vcd:value-of select="text()" /></p>
        <vcd:apply-templates select="xmail:list" />              — 4002
    </vcd:template>

<vcd:template match="xmail:list">
        <table>
            <tr><th><vcd:value-of select="xmail:lt/text()" /></th></tr>
            <tr><td>NAME</td><td>ADDRESS</td></tr>

<vcd:apply-templates select="xmail:person" />        — 4004
        </table>
    </vcd:template>

<vcd:template match="xmail:person">
        <tr>
            <td><vcd:apply-templates select="xmail:name" /></td>
            <td><vcd:apply-templates select="xmail:address" /></td>   — 4006
        </tr>
    </vcd:template>

<vcd:template match="xmail:name">
        <!-- anonymous/@id IS A DESCRIPTION FOR DISPLAYING A SERIAL NUMBER -->
        <!-- IT CAN BE REPLACED BY A COMMAND FOR DISPLAYING AN ICON, FOR EXAMPLE. -->
        <anonymous:value-of select="xmail:anonymous/@id" />      — 4018
    </vcd:template>

<vcd:template match="xmail:address">
        <anonymous:value-of select="xmail:anonymous/@id" />      — 4016
    </vcd:template>

</vcd:vcd>
```

[FIGURE 49]
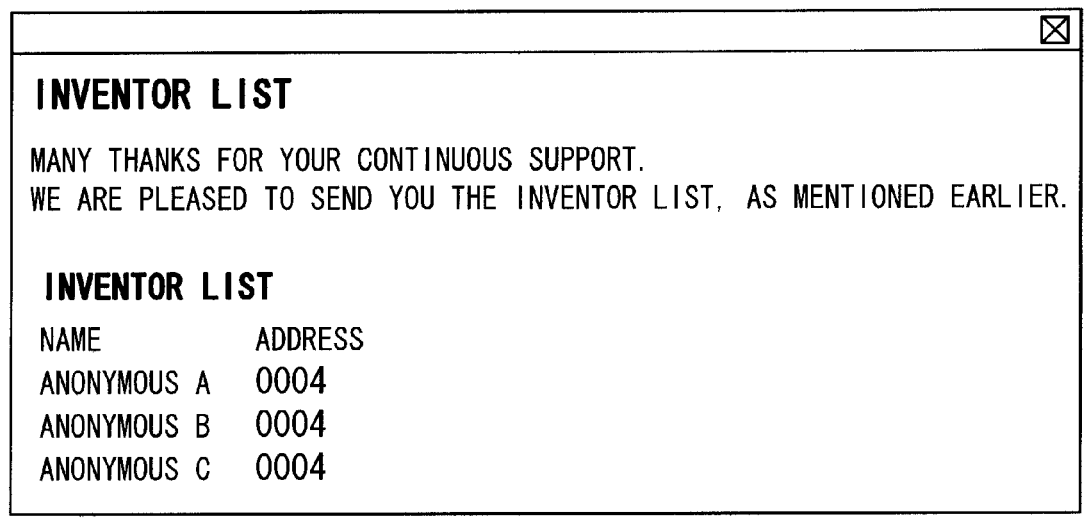

DOCUMENT MANAGEMENT DEVICE AND DOCUMENT MANAGEMENT METHOD

TECHNICAL FIELD

The present invention relates to a document management technique, and particularly to a document management apparatus and a document management method for managing a document including proper nouns.

BACKGROUND ART

XML has been attracting attention as a format that allows the user to share data with other users via a network or the like. This encourages the development of applications for creating, displaying, and editing XML documents (see Patent document 1, for example). XML documents are created based upon a vocabulary (tag set) defined according to a document type definition.

[Patent Document 1]
Japanese Patent Application Laid-open No. 2001-290804

DISCLOSURE OF INVENTION

Problems to be Solved by the Invention

XML has a prospect of serving as a common format which allows multiple users to share the data. With such an arrangement, data such as a document described in XML is shared among multiple users via a network. This leads to an increased demand for properly managing the security of the data such as proper nouns which are included in a file and is to be kept secret.

The present invention has been made in view of such a situation. Accordingly, it is a general purpose of the present invention to provide a technique for maintaining the security of the proper nouns included in a document.

Means for Solving the Problems

An aspect according to the present invention relates to a document management apparatus. The document management apparatus comprises: an acquisition unit which acquires a document; an extracting unit which extracts a proper noun included in the document; an issuing unit which issues an identifier to the proper noun extracted by the extracting unit; a replacing unit which replaces the proper noun in the document by the identifier; and a storage unit which stores the proper noun and the identifier in association with each other. Such an arrangement ensures the security of the proper nouns included in a document in an appropriate manner.

Also, the document management apparatus may further include a combining unit having a function whereby, in a case of reception of a request from a user, who has a permission to access the proper noun, to acquire the document, the proper noun is read out from the storage unit, and the proper noun thus read out is combined with the document. Such an arrangement allows the proper nouns to be displayed for a user who has permission to access the proper noun. Also, the combining unit may select the proper noun, of which access is to be permitted, according to the user's permission level, and the proper noun thus selected may be combined with the file. Such an arrangement displays the proper nouns for a user who has permission to access the secret data. On the other hand, such an arrangement does not display the proper nouns for a user who has no permission to access the secret data. Such an arrangement manages the security of the proper nouns in an appropriate manner. Also, the storage unit may be provided in the form of a separate file that differs from the document file.

Note that any combination of the aforementioned components or any manifestation of the present invention realized by modification of a method, device, system, and so forth, is effective as an embodiment of the present invention.

Advantages

The present invention provides a technique for maintaining the security of the proper nouns included in a document.

BRIEF DESCRIPTION OF THE DRAWINGS

FIG. 1 is a diagram which shows a configuration of a document processing apparatus according to the background technique.

FIG. 2 is a diagram which shows an example of an XML document to be processed.

FIG. 3 is a diagram which shows an example in which the XML document shown in FIG. 2 is mapped to a table described in HTML.

FIG. 4(a) is a diagram which shows an example of a definition file used for mapping the XML document shown in FIG. 2 to the table shown in FIG. 3.

FIG. 4(b) is a diagram which shows an example of a definition file used for mapping the XML document shown in FIG. 2 to the table shown in FIG. 3.

FIG. 5 is a diagram which shows an example of a screen on which the XML document, which has been described in the marks managing vocabulary and which is shown in FIG. 2, is displayed after having been mapped to HTML according to the correspondence shown in FIG. 3.

FIG. 6 is a diagram which shows an example of a graphical user interface provided by a definition file creating unit, which allows the user to create a definition file.

FIG. 7 is a diagram which shows another example of a screen layout created by the definition file creating unit.

FIG. 8 is a diagram which shows an example of an editing screen for an XML document, as provided by the document processing apparatus.

FIG. 9 is a diagram which shows another example of an XML document which is to be edited by the document processing apparatus.

FIG. 10 is a diagram which shows an example of a screen on which the document shown in FIG. 9 is displayed.

FIG. 11(a) is a diagram which shows a basic configuration of a document processing system.

FIG. 11(b) is a block diagram which shows an overall block configuration of a document processing system.

FIG. 11(c) is a block diagram which shows an overall block configuration of a document processing system.

FIG. 12 is a diagram which shows a document management unit in detail.

FIG. 13 is a diagram which shows a vocabulary connection sub-system in detail.

FIG. 14 is a diagram which shows a relation between a program invoker and other components in detail.

FIG. 15 is a diagram which shows a structure of an application service loaded to the program invoker in detail.

FIG. 16 is a diagram which shows a core component in detail.

FIG. 17 is a diagram which shows a document management unit in detail.

FIG. 18 is a diagram which shows an undo framework and an undo command in detail.

FIG. 19 is a diagram which shows the operation in which a document is loaded to the document processing system.

FIG. 20 is a diagram which shows an example of a document and a representation of the document.

FIG. 21 is a diagram which shows a relation between a model and a controller.

FIG. 22 is a diagram which shows a plug-in sub-system, a vocabulary connection, and a connector, in detail.

FIG. 23 is a diagram which shows an example of a VCD file.

FIG. 24 is a diagram which shows a procedure for loading a compound document to the document processing system.

FIG. 25 is a diagram which shows a procedure for loading a compound document to the document processing system.

FIG. 26 is a diagram which shows a procedure for loading a compound document to the document processing system.

FIG. 27 is a diagram which shows a procedure for loading a compound document to the document processing system.

FIG. 28 is a diagram which shows a procedure for loading a compound document to the document processing system.

FIG. 29 is a diagram which shows a command flow.

FIG. 30 is a diagram which shows a configuration of a document management system according to an embodiment.

FIG. 31 is a diagram which shows an internal configuration of a document processing apparatus according to the present embodiment.

FIG. 32 is a diagram which shows an internal configuration of a document management server.

FIG. 33 is a diagram which shows an example of internal data of a document file management table.

FIG. 34 is a diagram which shows an example of internal data of a user database.

FIG. 35 is a diagram which shows an example of an XML document which is to be processed by the document management system according to the present embodiment.

FIG. 36 is a diagram which shows an example of a definition file used for mapping the XML document shown in FIG. 35 to an XHTML document, thereby allowing the XML document to be edited and displayed.

FIG. 37 is a diagram shows an example of a screen on which the XML document shown in FIG. 35, to which the definition file shown in FIG. 36 has been applied, is displayed.

FIG. 38 is a diagram which shows an XML document in which the secret data has been marked up.

FIG. 39 is a diagram which shows an example of a public file created by dividing the XML document shown in FIG. 38 by a document file dividing unit.

FIG. 40 is a diagram which shows an example of a secret file created by dividing the XML document shown in FIG. 38 by the document file dividing unit.

FIG. 41 is a diagram which shows another example of a secret file created by dividing the XML document shown in FIG. 38 by the document file dividing unit.

FIG. 42 is a diagram which shows a definition file that specifies a definition used for combining the public file shown in FIG. 39 with the secret file shown in FIG. 40.

FIG. 43 is a diagram which shows an example of the display of a composite file thus created.

FIG. 44 is a diagram which shows an example of the display of a composite file thus created.

FIG. 45 is a diagram which shows an example of the display of a composite file thus created.

FIG. 46 is a diagram which shows an example of the display of a composite file thus created.

FIG. 47 is a diagram which shows another example of a public file created by dividing the XML document shown in FIG. 38 by the document file dividing unit.

FIG. 48 is a diagram which shows an example of a definition file which is to be applied to the public file shown in FIG. 47.

FIG. 49 is a diagram which shows an example of a screen that displays the public file shown in FIG. 47, to which the definition file shown in FIG. 48 has been applied.

REFERENCE NUMERALS 20 document processing apparatus
21 document management system
22 main control unit
23 document management server
24 editing unit
30 DOM unit
32 DOM provider
34 DOM builder
36 DOM writer
40 CSS unit
42 CSS parser
44 CSS provider
46 rendering unit
50 HTML unit
52, 62 control unit
54, 64 editing unit
56, 66 display unit
60 SVG unit
80 VC unit
82 mapping unit
84 definition file acquisition unit
86 definition file creating unit
100 document processing apparatus
3020 document storage request reception unit
3022 document file reception unit
3024 secret data extracting unit
3026 ID issuing unit
3028 document file dividing unit
3030 document acquisition request reception unit
3032 user identification unit
3034 document file combining unit
3036 document file transmission unit
3040 document file management table
3050 document file storage unit
3060 user database

BEST MODE FOR CARRYING OUT THE INVENTION (Background Technique)

FIG. 1 illustrates a structure of a document processing apparatus 20 according to the background technique. The document processing apparatus 20 processes a structured document where data in the document are classified into a plurality of components having a hierarchical structure. Represented in the background technique is an example in which an XML document, as one type of a structured document, is processed. The document processing apparatus 20 is comprised of a main control unit 22, an editing unit 24, a DOM unit 30, a CSS unit 40, an HTML unit 50, an SVG unit 60 and a VC unit 80 which serves as an example of a conversion unit. In terms of hardware components, these unit structures may be realized by any conventional processing system or equipment, including a CPU or memory of any computer, a memory-loaded program, or the like. Here, the drawing shows a functional block configuration which is realized by cooperation between the hardware components and software components. Thus, it would be understood by those skilled in the art that these function blocks can be realized in a variety of forms by hardware only, software only or the combination thereof.

The main control unit 22 provides for the loading of a plug-in or a framework for executing a command. The editing unit 24 provides a framework for editing XML documents. Display and editing functions for a document in the document processing apparatus 20 are realized by plug-ins, and the necessary plug-ins are loaded by the main control unit 22 or the editing unit 24 according to the type of document under consideration. The main control unit 22 or the editing unit 24 determines which vocabulary or vocabularies describes the content of an XML document to be processed, by referring to a name space of the document to be processed, and loads a plug-in for display or editing corresponding to the thus determined vocabulary so as to execute the display or the editing. For instance, an HTML unit 50, which displays and edits HTML documents, and an SVG unit 60, which displays and edits SVG documents, are implemented in the document processing apparatus 20. That is, a display system and an editing system are implemented as plug-ins for each vocabulary (tag set), so that when an HTML document and an SVG document are edited, the HTML unit 50 and the SVG unit 60 are loaded, respectively. As will be described later, when compound documents, which contain both the HTML and SVG components, are to be processed, both the HTML unit 50 and the SVG unit 60 are loaded.

By implementing the above structure, a user can select so as to install only necessary functions, and can add or delete a function or functions at a later stage, as appropriate. Thus, the storage area of a recording medium, such as a hard disk, can be effectively utilized, and the wasteful use of memory can be prevented at the time of executing programs. Furthermore, since the capability of this structure is highly expandable, a developer can deal with new vocabularies in the form of plug-ins, and thus the development process can be readily facilitated. As a result, the user can also add a function or functions easily at low cost by adding a plug-in or plug-ins.

The editing unit 24 receives an event, which is an editing instruction, from the user via the user interface. Upon reception of such an event, the editing unit 24 notifies a suitable plug-in or the like of this event, and controls the processing such as redoing this event, canceling (undoing) this event, etc.

The DOM unit 30 includes a DOM provider 32, a DOM builder 34 and a DOM writer 36. The DOM unit 30 realizes functions in compliance with a document object model (DOM), which is defined to provide an access method used for handling data in the form of an XML document. The DOM provider 32 is an implementation of a DOM that satisfies an interface defined by the editing unit 24. The DOM builder 34 generates DOM trees from XML documents. As will be described later, when an XML document to be processed is mapped to another vocabulary by the VC unit 80, a source tree, which corresponds to the XML document in a mapping source, and a destination tree, which corresponds to the XML document in a mapping destination, are generated. At the end of editing, for example, the DOM writer 36 outputs a DOM tree as an XML document.

The CSS unit 40, which provides a display function conforming to CSS, includes a CSS parser 42, a CSS provider 44 and a rendering unit 46. The CSS parser 42 has a parsing function for analyzing the CSS syntax. The CSS provider 44 is an implementation of a CSS object and performs CSS cascade processing on the DOM tree. The rendering unit 46 is a CSS rendering engine and is used to display documents, described in a vocabulary such as HTML, which are laid out using CSS.

The HTML unit 50 displays or edits documents described in HTML. The SVG unit 60 displays or edits documents described in SVG. These display/editing systems are realized in the form of plug-ins, and each system is comprised of a display unit (also designated herein as a "canvas") 56 and 66, which displays documents, a control unit (also designated herein as an "editlet") 52 and 62, which transmits and receives events containing editing commands, and an edit unit (also designated herein as a "zone") 54 and 64, which edits the DOM according to the editing commands. Upon the control unit 52 or 62 receiving a DOM tree editing command from an external source, the edit unit 54 or 64 modifies the DOM tree and the display unit 56 or 66 updates the display. These units have a structure similar to the framework of the so-called MVC (Model-View-Controller). With such a structure, in general, the display units 56 and 66 correspond to "View". On the other hand, the control units 52 and 62 correspond to "Controller", and the edit units 54 and 64 and DOM instance corresponds to "Model". The document processing apparatus 20 according to the background technique allows an XML document to be edited according to each given vocabulary, as well as providing a function of editing the HTML document in the form of tree display. The HTML unit 50 provides a user interface for editing an HTML document in a manner similar to a word processor, for example. On the other hand, the SVG unit 60 provides a user interface for editing an SVG document in a manner similar to an image drawing tool.

The VC unit 80 includes a mapping unit 82, a definition file acquiring unit 84 and a definition file generator 86. The VC unit 80 performs mapping of a document, which has been described in a particular vocabulary, to another given vocabulary, thereby providing a framework that allows a document to be displayed and edited by a display/editing plug-in corresponding to the vocabulary to which the document is mapped. In the background technique, this function is called a vocabulary connection (VC). In the VC unit 80, the definition file acquiring unit 84 acquires a script file in which the mapping definition is described. Here, the definition file specifies the correspondence (connection) between the nodes for each node. Furthermore, the definition file may specify whether or not editing of the element values or attribute values is permitted. Furthermore, the definition file may include operation expressions using the element values or attribute values for the node. Detailed description will be made later regarding these functions. The mapping unit 82 instructs the DOM builder 34 to generate a destination tree with reference to the script file acquired by the definition file acquiring unit 84. This manages the correspondence between the source tree and the destination tree. The definition file generator 86 offers a graphical user interface which allows the user to generate a definition file.

The VC unit 80 monitors the connection between the source tree and the destination tree. Upon reception of an editing instruction from the user via a user interface provided by a plug-in that handles a display function, the VC unit 80 first modifies a relevant node of the source tree. As a result, the DOM unit 30 issues a mutation event indicating that the source tree has been modified. Upon reception of the mutation event thus issued, the VC unit 80 modifies a node of the destination tree corresponding to the modified node, thereby updating the destination tree in a manner that synchronizes with the modification of the source tree. Upon reception of a mutation event that indicates that the destination tree has been modified, a plug-in having functions of displaying/editing the destination tree, e.g., the HTML unit 50, updates a display with reference to the destination tree thus modified. Such a structure allows a document described in any vocabulary, even a minor vocabulary used in a minor user segment, to be converted into a document described in another major vocabulary. This enables such a document described in a minor vocabulary to be displayed, and provides an editing environment for such a document.

An operation in which the document processing apparatus 20 displays and/or edits documents will be described herein below. When the document processing apparatus 20 loads a document to be processed, the DOM builder 34 generates a DOM tree from the XML document. The main control unit 22 or the editing unit 24 determines which vocabulary describes the XML document by referring to a name space of the XML document to be processed. If the plug-in corresponding to the vocabulary is installed in the document processing apparatus 20, the plug-in is loaded so as to display/edit the document. If, on the other hand, the plug-in is not installed in the document processing apparatus 20, a check shall be made to see whether a mapping definition file exists or not. And if the definition file exits, the definition file acquiring unit 84 acquires the definition file and generates a destination tree according to the definition, so that the document is displayed/edited by the plug-in corresponding to the vocabulary which is to be used for mapping. If the document is a compound document containing a plurality of vocabularies, relevant portions of the document are displayed/edited by plug-ins corresponding to the respective vocabularies, as will be described later. If the definition file does not exist, a source or tree structure of a document is displayed and the editing is carried out on the display screen.

FIG. 2 shows an example of an XML document to be processed. According to this exemplary illustration, the XML document is used to manage data concerning grades or marks that students have earned. A component "marks", which is the top node of the XML document, includes a plurality of components "student" provided for each student under "marks". The component "student" has an attribute "name" and contains, as child elements, the subjects "japanese", "mathematics", "science", and "social_studies". The attribute "name" stores the name of a student. The components "japanese", "mathematics", "science" and "social_studies" store the test scores for the subjects Japanese, mathematics, science, and social studies, respectively. For example, the marks of a student whose name is "A" are "90" for Japanese, "50" for mathematics, "75" for science and "60" for social studies. Hereinafter, the vocabulary (tag set) used in this document will be called "marks managing vocabulary".

Here, the document processing apparatus 20 according to the background technique does not have a plug-in which conforms to or handles the display/editing of marks managing vocabularies. Accordingly, before displaying such a document in a manner other than the source display manner or the tree display manner, the above-described VC function is used. That is, there is a need to prepare a definition file for mapping the document, which has been described in the marks managing vocabulary, to another vocabulary, which is supported by a corresponding plug-in, e.g., HTML or SVG. Note that description will be made later regarding a user interface that allows the user to create the user's own definition file. Now, description will be made below regarding a case in which a definition file has already been prepared.

FIG. 3 shows an example in which the XML document shown in FIG. 2 is mapped to a table described in HTML. In an example shown in FIG. 3, a "student" node in the marks managing vocabulary is associated with a row ("TR" node) of a table ("TABLE" node) in HTML. The first column in each row corresponds to an attribute value "name", the second column to a "japanese" node element value, the third column to a "mathematics" node element value, the fourth column to a "science" node element value and the fifth column to a "social_studies" node element value. As a result, the XML document shown in FIG. 2 can be displayed in an HTML tabular format. Furthermore, these attribute values and element values are designated as being editable, so that the user can edit these values on a display screen using an editing function of the HTML unit 50. In the sixth column, an operation expression is designated for calculating a weighted average of the marks for Japanese, mathematics, science and social studies, and average values of the marks for each student are displayed. In this manner, more flexible display can be effected by making it possible to specify the operation expression in the definition file, thus improving the users' convenience at the time of editing. In this example shown in FIG. 3, editing is designated as not being possible in the sixth column, so that the average value alone cannot be edited individually. Thus, in the mapping definition it is possible to specify editing or no editing so as to protect the users against the possibility of performing erroneous operations.

FIG. 4(*a*) and FIG. 4(*b*) illustrate an example of a definition file to map the XML document shown in FIG. 2 to the table shown in FIG. 3. This definition file is described in script language defined for use with definition files. In the definition file, definitions of commands and templates for display are described. In the example shown in FIG. 4(*a*) and FIG. 4(*b*), "add student" and "delete student" are defined as commands, and an operation of inserting a node "student" into a source tree and an operation of deleting the node "student" from the source tree, respectively, are associated with these commands. Furthermore, the definition file is described in the form of a template, which describes that a header, such as "name" and "japanese", is displayed in the first row of a table and the contents of the node "student" are displayed in the second and subsequent rows. In the template displaying the contents of the node "student", a term containing "text-of" indicates that editing is permitted, whereas a term containing "value-of" indicates that editing is not permitted. Among the rows where the contents of the node "student" are displayed, an operation expression "(src:japanese+src:mathematics+scr:science+scr:social_studies) div 4" is described in the sixth row. This means that the average of the student's marks is displayed.

FIG. 5 shows an example of a display screen on which an XML document described in the marks managing vocabulary shown in FIG. 2 is displayed by mapping the XML document to HTML using the correspondence shown in FIG. 3. Displayed from left to right in each row of a table 90 are the name of each student, marks for Japanese, marks for mathematics, marks for science, marks for social studies and the averages thereof. The user can edit the XML document on this screen. For example, when the value in the second row and the third column is changed to "70", the element value in the source tree corresponding to this node, that is, the marks of student "B" for mathematics are changed to "70". At this time, in order to have the destination tree follow the source tree, the VC unit 80 changes a relevant portion of the destination tree accordingly, so that the HTML unit 50 updates the display based on the destination tree thus changed. Hence, the marks of student "B" for mathematics are changed to "70", and the average is changed to "55" in the table on the screen.

On the screen as shown in FIG. 5, commands like "add student" and "delete student" are displayed in a menu as defined in the definition file shown in FIG. 4(*a*) and FIG. 4(*b*). When the user selects a command from among these commands, a node "student" is added or deleted in the source tree. In this manner, with the document processing apparatus 20 according to the background technique, it is possible not only to edit the element values of components in a lower end of a hierarchical structure but also to edit the hierarchical structure. An edit function for editing such a tree structure may be presented to the user in the form of commands. Furthermore, a command to add or delete rows of a table may, for example, be linked to an operation of adding or deleting the node "student". A command to embed other vocabularies therein may be presented to the user. This table may be used as an input template, so that marks data for new students can be added in a fill-in-the-blank format. As described above, the VC function allows a document described in the marks managing vocabulary to be edited using the display/editing function of the HTML unit 50.

FIG. 6 shows an example of a graphical user interface, which the definition file generator 86 presents to the user, in order for the user to generate a definition file. An XML document to be mapped is displayed in a tree in a left-hand area 91 of a screen. The screen layout of an XML document after mapping is displayed in a right-hand area 92 of the screen. This screen layout can be edited by the HTML unit 50, and the user creates a screen layout for displaying documents in the right-hand area 92 of the screen. For example, a node of the XML document which is to be mapped, which is displayed in the left-hand area 91 of the screen, is dragged and dropped into the HTML screen layout in the right-hand area 92 of the screen using a pointing device such as a mouse, so that a connection between a node at a mapping source and a node at a mapping destination is specified. For example, when "mathematics," which is a child element of the element "student," is dropped to the intersection of the first row and the third column in a table 90 on the HTML screen, a connection is established between the "mathematics" node and a "TD" node in the third column. Either editing or no editing can be specified for each node. Moreover, the operation expression can be embedded in a display screen. When the screen editing is completed, the definition file generator 86 generates definition files, which describe connections between the screen layout and nodes.

Viewers or editors which can handle major vocabularies such as XHTML, MathML and SVG have already been developed. However, it does not serve any practical purpose to develop dedicated viewers or editors for such documents described in the original vocabularies as shown in FIG. 2. If, however, the definition files for mapping to other vocabularies are created as mentioned above, the documents described in the original vocabularies can be displayed and/or edited utilizing the VC function without the need to develop a new viewer or editor.

FIG. 7 shows another example of a screen layout generated by the definition file generator 86. In the example shown in FIG. 7, a table 90 and circular graphs 93 are created on a screen for displaying XML documents described in the marks managing vocabulary. The circular graphs 93 are described in SVG. As will be discussed later, the document processing apparatus 20 according to the background technique can process a compound document described in the form of a single XML document according to a plurality of vocabularies. That is why the table 90 described in HTML and the circular graphs 93 described in SVG can be displayed on the same screen.

FIG. 8 shows an example of a display medium, which in a preferred but non-limiting embodiment is an edit screen, for XML documents processed by the document processing apparatus 20. In the example shown in FIG. 8, a single screen is partitioned into a plurality of areas and the XML document to be processed is displayed in a plurality of different display formats at the respective areas. The source of the document is displayed in an area 94, the tree structure of the document is displayed in an area 95, and the table shown in FIG. 5 and described in HTML is displayed in an area 96. The document can be edited in any of these areas, and when the user edits content in any of these areas, the source tree will be modified accordingly, and then each plug-in that handles the corresponding screen display updates the screen so as to effect the modification of the source tree. Specifically, display units of the plug-ins in charge of displaying the respective edit screens are registered in advance as listeners for mutation events that provide notice of a change in the source tree. When the source tree is modified by any of the plug-ins or the VC unit 80, all the display units, which are displaying the edit screen, receive the issued mutation event(s) and then update the screens. At this time, if the plug-in is executing the display through the VC function, the VC unit 80 modifies the destination tree following the modification of the source tree. Thereafter, the display unit of the plug-in modifies the screen by referring to the destination tree thus modified.

For example, when the source display and tree-view display are implemented by dedicated plug-ins, the source-display plug-in and the tree-display plug-in execute their respective displays by directly referring to the source tree without involving the destination tree. In this case, when the editing is done in any area of the screen, the source-display plug-in and the tree-display plug-in update the screen by referring to the modified source tree. Also, the HTML unit 50 in charge of displaying the area 96 updates the screen by referring to the destination tree, which has been modified following the modification of the source tree.

The source display and the tree-view display can also be realized by utilizing the VC function. That is to say, an arrangement may be made in which the source and the tree structure are laid out in HTML, an XML document is mapped to the HTML structure thus laid out, and the HTML unit 50 displays the XML document thus mapped. In such an arrangement, three destination trees in the source format, the tree format and the table format are generated. If the editing is carried out in any of the three areas on the screen, the VC unit 80 modifies the source tree and, thereafter, modifies the three destination trees in the source format, the tree format and the table format. Then, the HTML unit 50 updates the three areas of the screen by referring to the three destination trees.

In this manner, a document is displayed on a single screen in a plurality of display formats, thus improving a user's convenience. For example, the user can display and edit a document in a visually easy-to-understand format using the table 90 or the like while understanding the hierarchical structure of the document by the source display or the tree display. In the above example, a single screen is partitioned into a plurality of display formats, and they are displayed simultaneously. Also, a single display format may be displayed on a single screen so that the display format can be switched according to the user's instructions. In this case, the main control unit 22 receives from the user a request for switching the display format and then instructs the respective plug-ins to switch the display.

FIG. 9 illustrates another example of an XML document edited by the document processing apparatus 20. In the XML document shown in FIG. 9, an XHTML document is embedded in a "foreignobject" tag of an SVG document, and the XHTML document contains an equation described in MathML. In this case, the editing unit 24 assigns the rendering job to an appropriate display system by referring to the name space. In the example illustrated in FIG. 9, first, the editing unit 24 instructs the SVG unit 60 to render a rectangle, and then instructs the HTML unit 50 to render the XHTML document. Furthermore, the editing unit 24 instructs a MathML unit (not shown) to render an equation. In this manner, the compound document containing a plurality of vocabularies is appropriately displayed. FIG. 10 illustrates the resulting display.

The displayed menu may be switched corresponding to the position of the cursor (carriage) during the editing of a document. That is, when the cursor lies in an area where an SVG document is displayed, the menu provided by the SVG unit 60, or a command set which is defined in the definition file for mapping the SVG document, is displayed. On the other hand, when the cursor lies in an area where the XHTML document is displayed, the menu provided by the HTML unit 50, or a command set which is defined in the definition file for mapping the HTML document, is displayed. Thus, an appropriate user interface can be presented according to the editing position.

In a case that there is neither a plug-in nor a mapping definition file suitable for any one of the vocabularies according to which the compound document has been described, a portion described in this vocabulary may be displayed in source or in tree format. In the conventional practice, when a compound document is to be opened where another document is embedded in a particular document, their contents cannot be displayed without the installation of an application to display the embedded document. According to the background technique, however, the XML documents, which are composed of text data, may be displayed in source or in tree format so that the contents of the documents can be ascertained. This is a characteristic of the text-based XML documents or the like.

Another advantageous aspect of the data being described in a text-based language, for example, is that, in a single compound document, a part of the compound document described in a given vocabulary can be used as reference data for another part of the same compound document described in a different vocabulary. Furthermore, when a search is made within the document, a string of characters embedded in a drawing, such as SVG, may also be search candidates.

In a document described in a particular vocabulary, tags belonging to other vocabularies may be used. Though such an XML document is generally not valid, it can be processed as a valid XML document as long as it is well-formed. In such a case, the tags thus inserted that belong to other vocabularies may be mapped using a definition file. For instance, tags such as "Important" and "Most Important" may be used so as to display a portion surrounding these tags in an emphasized manner, or may be sorted out in the order of importance.

When the user edits a document on an edit screen as shown in FIG. 10, a plug-in or a VC unit 80, which is in charge of processing the edited portion, modifies the source tree. A listener for mutation events can be registered for each node in the source tree. Normally, a display unit of the plug-in or the VC unit 80 conforming to a vocabulary that belongs to each node is registered as the listener. When the source tree is modified, the DOM provider 32 traces toward a higher hierarchy from the modified node. If there is a registered listener, the DOM provider 32 issues a mutation event to the listener. For example, referring to the document shown in FIG. 9, if a node which lies lower than the <html> node is modified, the mutation event is notified to the HTML unit 50, which is registered as a listener to the <html> node. At the same time, the mutation event is also notified to the SVG unit 60, which is registered as a listener in an <svg> node, which lies upper to the <html> node. At this time, the HTML unit 50 updates the display by referring to the modified source tree. Since the nodes belonging to the vocabulary of the SVG unit 60 itself are not modified, the SVG unit 60 may disregard the mutation event.

Depending on the contents of the editing, modification of the display by the HTML unit 50 may change the overall layout. In such a case, the layout is updated by a screen layout management mechanism, e.g., the plug-in that handles the display of the highest node, in increments of display regions which are displayed according to the respective plug-ins. For example, in a case of expanding a display region managed by the HTML unit 50, first, the HTML unit 50 renders a part managed by the HTML unit 50 itself, and determines the size of the display region. Then, the size of the display area is notified to the component that manages the screen layout so as to request the updating of the layout. Upon receipt of this notice, the component that manages the screen layout rebuilds the layout of the display area for each plug-in. Accordingly, the display of the edited portion is appropriately updated and the overall screen layout is updated.

Then, further detailed description will be made regarding functions and components for providing the document processing 20 according to the background technique. In the following description, English terms are used for the class names and so forth.

A. Outline

The advent of the Internet has resulted in a nearly exponential increase in the number of documents processed and managed by users. The Web (World Wide Web), which serves as the core of the Internet, provides a massive storage capacity for storing such document data. The Web also provides an information search system for such documents, in addition to the function of storing the documents. In general, such a document is described in a markup language. HTML (HyperText Markup Language) is an example of a popular basic markup language. Such a document includes links, each of which links the document to another document stored at another position on the Web. XML (eXtensible Markup Language) is a popular further improved markup language. Simple browsers which allow the user to access and browse such Web documents have been developed using object-oriented programming languages such as Java (trademark).

In general, documents described in markup languages are represented in a browser or other applications in the form of a tree data structure. This structure corresponds to a tree structure obtained as a result of parsing a document. The DOM (Document Object Model) is a well-known tree-based data structure model, which is used for representing and processing a document. The DOM provides a standard object set for representing documents, examples of which include an HTML document, an XML document, etc. The DOM includes two basic components, i.e., a standard model which shows how the objects that represent the respective components included in a document are connected to one another, and a standard interface which allows the user to access and operate each object.

Application developers can support the DOM as an interface for handling their own data structure and API (Application Program Interface). On the other hand, application providers who create documents can use the standard interface of the DOM, instead of using the DOM as an interface for handling their own API. The capacity of the DOM to provide such a standard interface has been effective in promoting document sharing in various environments, particularly on the Web. Several versions of the DOM have been defined, which are used in different environments and applications.

A DOM tree is a hierarchical representation of the structure of a document, which is based upon the content of a corresponding DOM. A DOM tree includes a "root", and one or more "nodes" branching from the root. In some cases, an entire document is represented by a root alone. An intermediate node can represent an element such as a table, or a row or a column of the table, for example. A "leaf" of a DOM tree generally represents data which cannot be further parsed, such as text data, image data, etc. Each of the nodes of the DOM tree may be associated with an attribute that specifies a parameter of the element represented by the node, such as a font, size, color, indent, etc.

HTML is a language which is generally used for creating a document. However, HTML is a language that provides formatting and layout capabilities, and it is not meant to be used as a data description language. The node of the DOM tree for representing an HTML document is defined beforehand as an HTML formatting tag, and in general, HTML does not provide detailed data description and data tagging/labeling functions. This leads to a difficulty in providing a query format for the data included in an HTML document.

The goal of network designers is to provide a software application which allows the user to make a query for and to process a document provided on the Web. Such a software application should allow the user to make a query for and to process a document, regardless of the display method, as long as the document is described in a hierarchically structured language. A markup language such as XML (eXtensible Markup Language) provides such functions.

Unlike HTML, XML has a well-known advantage of allowing the document designer to label each data element using a tag which can be defined by the document designer as desired. Such data elements can form a hierarchical structure. Furthermore, an XML document can include a document type definition that specifies a "grammar" which specifies the tags used in the document and the relations between the tags. Also, in order to define the display method of such a structured XML document, CSS (Cascading Style Sheets) or XSL (XML Style Language) is used. Additional information with respect to the features of the DOM, HTML, XML, CSS, XSL, and the related languages can be acquired via the Web, for example, from "http://www.w3.org/TR/".

XPath provides common syntax and semantics which allow the position of a portion of an XML document to be specified. Examples of such functions include a function of traversing a DOM tree that corresponds to an XML document. This provides basic functions for operating character strings, values, and Boolean variables, which are related to the function of displaying an XML document in various manners. XPath does not provide a syntax for how the XML document is displayed, e.g., a grammar which handles a document in the form of text in increments of lines or characters. Instead of such a syntax, XPath handles a document in the form of an abstract and logical structure. The use of XPath allows the user to specify a position in an XML document via the hierarchical structure of a DOM tree of the XML document, for example. Also, XPath has been designed so as to allow the user to test whether or not the nodes included in a DOM tree match a given pattern. Detailed description of XPath can be obtained from http://www.w3.org/TR/xpath.

There is a demand for an effective document processing system based upon the known features and advantages of XML, which provides a user-friendly interface which handles a document described in a markup language (e.g., XML), and which allows the user to create and modify such a document.

Some of the system components as described here will be described in a well-known GUI (Graphical User Interface) paradigm which is called the MVC (Model-View-Controller) paradigm. The MVC paradigm divides a part of an application or an interface of an application into three parts, i.e., "model", "view", and "controller". In the GUI field, the MVC paradigm has been developed primarily for assigning the roles of "input", "processing", and "output".

[input]→[processing]→[output]
[controller]→[model]→[view]

The MVC paradigm separately handles modeling of external data, visual feedback for the user, and input from the user, using a model object (M), a view object (V), and a controller object (C). The controller object analyzes the input from the user input via a mouse and a keyboard, and maps such user actions to a command to be transmitted to the model object and/or the view object. The model object operates so as to manage one or more data elements. Furthermore, the model object makes a response to a query with respect to the state of the data elements, and operates in response to an instruction to change the state of the data elements. The view object has a function of presenting data to the user in the form of a combination of graphics and text.

B. Overall Configuration of the Document Processing System

In order to make clear an embodiment of the document processing system, description will be made with reference to FIGS. 11 through 29.

FIG. 11(a) shows an example of a configuration comprising components that provide the basic functions of a kind of document processing system according to a conventional technique as will be mentioned later. A configuration 10 includes a processor in the form of a CPU or a microprocessor 11 connected to memory 12 via a communication path 13. The memory 12 may be provided in the form of any kind of ROM and/or RAM that is currently available or that may be available in the future. In a typical case, the communication path 13 is provided in the form of a bus. An input/output interface 16 for user input devices such as a mouse, a keyboard, a speech recognition system, etc., and a display device 15 (or other user interfaces) is connected to the bus that provides communication with the processor 11 and the memory 12. Such a configuration may be provided in the form of a standalone device. Also, such a configuration may be provided in the form of a network which includes multiple terminals and one or more servers connected to one another. Also, such a configuration may be provided in any known form. The present invention is not restricted to a particular layout of the components, a particular architecture, e.g., a centralized architecture or a distributed architecture, or a particular one of various methods of communication between the components.

Furthermore, description will be made below regarding the present system and the embodiment regarding an arrangement including several components and sub-components that provide various functions. In order to provide desired functions, the components and the sub-components can be realized by hardware alone, or by software alone, in addition to various combination of hardware and software. Furthermore, the hardware, the software, and the various combinations thereof can be realized by general purpose hardware, dedicated hardware, or various combinations of general purpose and dedicated hardware. Accordingly, the configuration of the component or the sub-component includes a general purpose or dedicated computation device for executing predetermined software that provides a function required for the component or the sub-component.

FIG. 11(b) is a block diagram which shows an overall configuration of an example of the document processing system. Such a document processing system allows a document to be created and edited. Such a document may be described in a desired language that has the functions required of a markup language, such as XML etc. Note that some terms and titles will be defined here for convenience of explanation. However, the general scope of the disclosure according to the present invention is not intended to be restricted by such terms and titles thus defined here.

The document processing system can be classified into two basic configurations. A first configuration is an "execution environment" 101 which provides an environment that allows the document processing system to operate. For example, the execution environment provides basic utilities and functions that support both the system and the user during the processing and management of a document. A second configuration is an "application" 102 that comprises applications that run under an execution environment. These applications include the documents themselves and various representations of the documents.

1. Execution Environment

The key component of the execution environment 101 is the ProgramInvoker (program invoking unit) 103. The ProgramInvoker 103 is a basic program, which is accessed in order to start up the document processing system. For example, upon the user logging on and starting up the document processing system, the ProgramInvoker 103 is executed. The ProgramInvoker 103 has: a function of reading out and executing a function added to the document processing system in the form of a plug-in; a function of starting up and executing an application; and a function of reading out the properties related to a document, for example. However, the functions of the ProgramInvoker 103 are not restricted to these functions. Upon the user giving an instruction to start up an application to be executed under the execution environment, the ProgramInvoker 103 finds and starts up the application, thereby executing the application.

Also, several components are attached to the ProgramInvoker 103, examples of which include a plug-in sub-system 104, a command sub-system 105, and a resource module 109. Detailed description will be made below regarding the configurations of such components.

a) Plug-In Sub-System

The plug-in sub-system is used as a highly flexible and efficient configuration which allows an additional function to be added to the document processing system. Also, the plug-in sub-system 104 can be used for modifying or deleting functions included in the document processing system. Also, various kinds of functions can be added or modified using the plug-in sub-system. For example, the plug-in sub-system 104 allows an Editlet (editing unit) to be added, which supports functions of allowing the user to edit via the screen. Also, the Editlet plug-in supports the functions of allowing the user to edit a vocabulary added to the system.

The plug-in sub-system 104 includes a ServiceBroker (service broker unit) 1041. The ServiceBroker 1041 manages a plug-in added to the document processing system, thereby mediating between the service thus added and the document processing system.

Each of the desired functions is added in the form of a Service 1042. Examples of the available types of Services 1042 include: an Application Service; a ZoneFactory (zone creating unit) Service; an Editlet (editing unit) Service; a CommandFactory (command creating unit) Service; a ConnectXPath (XPath management unit) Service; a CSSComputation (CSS calculation unit) Service; etc. However, the Service 1042 is not restricted to such services.

Detailed description will be made below regarding these Services, and regarding the relation between these Services and other components of the system, in order to facilitate understanding of the document processing system.

Description will be made below regarding the relation between a plug-in and a Service. The plug-in is a unit capable of including one or more ServiceProviders (service providing units). Each ServiceProvider has one or more classes for corresponding Services. For example, upon using a plug-in having an appropriate software application, one or more Services are added to the system, thereby adding the corresponding functions to the system.

b) Command Sub-System

The command sub-system 105 is used for executing a command relating to the processing of a document. The command sub-system 105 allows the user to execute the processing of the document by executing a series of commands. For example, the command sub-system 105 allows the user to edit an XML DOM tree that corresponds to an XML document stored in the document processing system, and to process the XML document, by issuing a command. These commands may be input by key-strokes, mouse-clicks, or actions via other valid user interfaces. In some cases, when a single command is input, one or more sub-commands are executed. In such a case, these sub-commands are wrapped in a single command, and the sub-commands are consecutively executed. For example, let us consider a case in which the user has given an instruction to replace an incorrect word with a correct word. In this case, a first sub-command is an instruction to detect an incorrect word in the document. Then, a second sub-command is an instruction to delete the incorrect word. Finally, a third function is an instruction to insert a correct word. These three sub-commands may be wrapped in a single command.

Each command may have a corresponding function, e.g., an "undo" function described later in detail. Such a function may also be assigned to several basic classes used for creating an object.

The key component of the command sub-system 105 is a CommandInvoker (command invoking unit) 1051 which operates so as to allow the user to selectively input and execute the commands. FIG. 11(*b*) shows an arrangement having a single CommandInvoker. Also, one or more CommandInvokers may be used. Also, one or more commands may be executed at the same time. The CommandInvoker 1051 holds the functions and classes required for executing the command. In the operation, the Command 1052 is loaded in a Queue 1053. Then, the CommandInvoker 1051 creates a command thread for executing the commands in sequence. In a case that no Command is currently being executed by the CommandInvoker, the Command 1052 provided to be executed by the CommandInvoker 1051 is executed. In a case that a command is currently being executed by the CommandInvoker, the new Command is placed at the end of the Queue 1053. However, each CommandInvoker 1051 executes only a single command at a time. In a case of failure in executing the Command thus specified, the CommandInvoker 1051 performs exception handling.

Examples of the types of Commands executed by the CommandInvoker 1051 include: an UndoableCommand (undoable command) 1054; an AsynchronousCommand (asynchronous command) 1055; and a VCCommand (VC command) 1056. However, the types of commands are not restricted to those examples. The UndoableCommand 1054 is a command which can be undone according to an instruction from the user. Examples of UndoableCommands include a deletion command, a copy command, a text insertion command, etc. Let us consider a case in which, in the course of operation, the user has selected a part of a document, following which the deletion command is applied to the part thus selected. In this case, the corresponding UndoableCommand allows the deleted part to be restored to the state that it was in before the part was deleted.

The VCCommand 1056 is stored in a Vocabulary Connection Descriptor (VCD) script file. The VCCommand 1056 is a user specified Command defined by a programmer. Such a Command may be a combination of more abstract Commands, e.g., a Command for adding an XML fragment, a Command for deleting an XML fragment, a Command for setting an attribute, etc. In particular, such Commands are provided with document editing in mind.

The AsynchronousCommand 1055 is a command primarily provided for the system, such as a command for loading a document, a command for storing a document, etc. AsynchronousCommands 1055 are executed in an asynchronous manner, independently of UndoableCommands and VCCommands. Note that the AsynchronousCommand does not belong to the class of undoable commands (it is not an UndoableCommand). Accordingly, an AsynchronousCommand cannot be undone.

c) Resource

The Resource 109 is an object that provides several functions to various classes. Examples of such system Resources include string resources, icon resources, and default key bind resources.

2. Application Component

The application component 102, which is the second principal component of the document processing system, is executed under the execution environment 101. The application component 102 includes actual documents and various kinds of logical and physical representations of the documents included in the system. Furthermore, the application component 102 includes the configuration of the system used for management of the documents. The application component 102 further includes a UserApplication (user application) 106, an application core 108, a user interface 107, and a CoreComponent (core component) 110.

a) User Application

The UserApplication 106 is loaded in the system along with the ProgramInvoker 103. The UserApplication 106 serves as an binding agent that connects a document, the various representations of the document, and the user interface required for communicating with the document. For example, let us consider a case in which the user creates a document set which is a part of a project. Upon loading the document set, an appropriate representation of the document is created. The user interface function is added as a part of the UserApplication 106. In other words, with regard to a document that forms a part of a project, the UserApplication 106 holds both the representation of the document that allows the user to communicate with the document, and various other document conditions. Once the UserApplication 106 has been created, such an arrangement allows the user to load the UserApplication 106 under the execution environment in a simple manner every time there is a need to communicate with a document that forms a part of a project.

b) Core Component

The CoreComponent 110 provides a method which allows a document to be shared over multiple panes. As described later in detail, the Pane displays a DOM tree, and provides a physical screen layout. For example, a physical screen is formed of multiple Panes within a screen, each of which displays a corresponding part of the information. With such an arrangement, a document displayed on the screen for the user can be displayed in one or more Panes. Also, two different documents may be displayed on the screen in two different Panes.

As shown in FIG. 11(c), the physical layout of the screen is provided in a tree form. The Pane can be a RootPane (root pane) 1084. Also, the Pane can be a SubPane (sub-pane) 1085. The RootPane 1084 is a Pane which is positioned at the root of a Pane tree. The SubPanes 1085 are other Panes that are distinct from the RootPane 1084.

The CoreComponent 110 provides a font, and serves as a source that provides multiple functional operations for a document. Examples of the tasks executed by the CoreComponent 110 include movement of a mouse cursor across the multiple Panes. Other examples of the tasks thus executed include a task whereby a part of the document displayed on a Pane is marked, and the part thus selected is duplicated on another Pane.

c) Application Core

As described above, the application component 102 has a structure that comprises documents to be processed and managed by the system. Furthermore, the application component 102 includes various kinds of logical and physical representations of the documents stored in the system. The application core 108 is a component of the application component 102. The application core 108 provides a function of holding an actual document along with all the data sets included in the document. The application core 108 includes a DocumentManager (document manager, document managing unit) 1081 and a Document (document) 1082 itself.

Detailed description will be made regarding various embodiments of the DocumentManager 1081. The DocumentManager 1081 manages the Document 1082. The DocumentManager 1081 is connected to the RootPane 1084, the SubPane 1085, a ClipBoard (clipboard) utility 1087, and a SnapShot (snapshot) utility 1088. The ClipBoard utility 1087 provides a method for holding a part of the document which is selected by the user as a part to be added to the clipboard. For example, let us consider a case in which the user deletes a part of a document, and stores the part thus deleted in a new document as a reference document. In this case, the part thus deleted is added to the ClipBoard.

Next, description will also be made regarding the SnapShot utility 1088. The SnapShot utility 1088 allows the system to store the current state of an application before the state of the application changes from one particular state to another state.

d) User Interface

The user interface 107 is another component of the application component 102, which provides a method that allows the user to physically communicate with the system. Specifically, the user interface allows the user to upload, delete, edit, and manage a document. The user interface includes a Frame (frame) 1071, a MenuBar (menu bar) 1072, a StatusBar (status bar) 1073, and a URLBar (URL bar) 1074.

The Frame 1071 serves as an active region of a physical screen, as is generally known. The Menubar 1072 is a screen region including a menu that provides selections to the user. The StatusBar 1073 is a screen region that displays the status of the application which is being executed. The URLBar 1074 provides a region which allows the user to input a URL address for Internet navigation.

C. Document Management and Corresponding Data Structure

FIG. 12 shows a configuration of the DocumentManager 1081 in detail. The DocumentManager 1081 includes a data structure and components used for representing a document in the document processing system. Description will be made regarding such components in this sub-section using the MVC paradigm for convenience of explanation.

The DocumentManager 1081 includes a DocumentContainer (document container) 203 which holds all the documents stored in the document processing system, and which serves as a host machine. A tool kit 201 attached to the DocumentManager 1081 provides various tools used by the DocumentManager 1081. For example, the tool kit 201 provides a DomService (DOM service) which provides all the functions required for creating, holding, and managing a DOM that corresponds to a document. Also, the tool kit 201 provides an IOManager (input/output management unit) which is another tool for managing the input to/output from the system. Also, a StreamHandler (stream handler) is a tool for handling uploading a document in the form of a bit stream. The tool kit 201 includes such tools in the form of components, which are not shown in the drawings in particular, and are not denoted by reference numerals.

With the system represented using the MVC paradigm, the model (M) includes a DOM tree model 202 of a document. As described above, each of all the documents is represented by the document processing system in the form of a DOM tree. Also, the document forms a part of the DocumentContainer 203.

1. DOM Model and Zone

The DOM tree which represents a document has a tree structure having Nodes (nodes) 2021. A Zone (zone) 209, which is a subset of the DOM tree, includes a region that corresponds to one or more Nodes within the DOM tree. For example, a part of a document can be displayed on a screen. In this case, the part of the document that is visually output is displayed using the Zone 209. The Zone is created, handled, and processed using a plug-in which is so-called ZoneFactory (Zone Factory=Zone creating unit) 205. While the Zone represents a part of the DOM, the Zone can use one or more "namespaces". It is well known that a namespace is a set that consists of unique names, each of which differs from every other name in the namespace. In other words, the namespace does not include the same names repeated.

2. Facets and the Relation Between Facets and Zones

A Facet 2022 is another component included in the model (M) component of the MVC paradigm. The Facet is used for editing the Node in the Zone. The Facet 2022 allows the user to access the DOM using a procedure that can be executed without affecting the content of the Zone. As described below, such a procedure executes an important and useful operation with respect to the Node.

Each node has a corresponding Facet. With such an arrangement, the facet is used for executing the operation instead of directly operating the Node in the DOM, thereby maintaining the integrity of the DOM. On the other hand, let us consider an arrangement in which an operation is performed directly on the Node. With such an arrangement, multiple plug-ins can change the DOM at the same time, leading to a problem that the integrity of the DOM cannot be maintained.

The DOM standard stipulated by the World Wide Web Consortium (W3C) defines a standard interface for operating a Node. In practice, unique operations particular to each vocabulary or each Node are required. Accordingly, such unique operations are preferably provided in the form of an API. The document processing system provides such an API particular to each Node in the form of a Facet which is attached to the Node. Such an arrangement allows a useful API to be attached to the DOM according to the DOM standard. Furthermore, with such an arrangement, after a standard DOM has been installed, unique APIs are attached to the DOM, instead of installing a unique DOM for each vocabulary. This allows various kinds of vocabularies to be uniformly handled. Furthermore, such an arrangement allows the user to properly process a document described using a desired combination of multiple vocabularies.

Each vocabulary is a set of tags (e.g., XML tags), which belong to a corresponding namespace. As described above, each namespace has a set of unique names (in this case, tags). Each vocabulary is handled as a sub-tree of the DOM tree which represents an XML document. The sub-tree includes the Zone. In particular cases, the boundary between the tag sets is defined by the Zone. The Zone 209 is created using a Service which is called a ZoneFactory 205. As described above, the Zone 209 is an internal representation of a part of the DOM tree which represents a document. In order to provide a method that allows the user to access a part of such a document, the system requires a logical representation of the DOM tree. The logical representation of the DOM allows the computer to be informed of how the document is logically represented on a screen. A Canvas (canvas) 210 is a Service that operate so as to provide a logical layout that corresponds to the Zone.

On the other hand, a Pane 211 is a physical screen layout that corresponds to a logical layout provided by the Canvas 210. In practice, the user views only a rendering of the document, through text or images displayed on a screen. Accordingly, there is a need to use a process for drawing text and images on a screen to display the document on a screen. With such an arrangement, the document is displayed on a screen by the Canvas 210 based upon the physical layout provided from the Pane 211.

The Canvas 210 that corresponds to the Zone 209 is created using an Editlet 206. The DOM of the document is edited using the Editlet 206 and the Canvas 210. In order to maintain the integrity of the original document, the Editlet 206 and the Canvas 210 use the Facet that corresponds to one or more Nodes included in the Zone 209. The Facet is operated using a Command 207.

In general, the user communicates with a screen by moving a cursor on a screen or typing a command. The Canvas 210, which provides a logical layout on a screen, allows the user to input such cursor operations. The Canvas 210 instructs the Facet to execute a corresponding action. With such a relation, the cursor sub-system 204 serves as a controller (C) according to the MVC paradigm with respect to the DocumentManager 1081. The Canvas 210 also provides a task for handling an event. Examples of such events handled by the canvas 210 include: a mouse click event; a focus movement event; and a similar action event occurring in response to the user operation.

3. Outline of the Relation Between Zone, Facet, Canvas, and Pane.

The document in the document processing system can be described from at least four points of view. That is to say, it can be seen as: 1) a data structure for maintaining the content and structure of a document in the document processing system, 2) means by which the user can edit the content of the document while maintaining the integrity of the document, 3) a logical layout of the document on a screen, and 4) a physical layout of the document on the screen. The components of the document processing system that correspond to the aforementioned four points of view are the Zone, Facet, Canvas, and Pane, respectively.

4. Undo Sub-System

As described above, all modifications made to the document (e.g., document editing procedures) are preferably undoable. For example, let us consider a case in which the user executes an editing operation, and then determines that the modification thus made to the document should be undone. Referring to FIG. 12, the undo subsystem 212 provides an undo component of a document management unit. With such an arrangement, an UndoManager (undo manager=undo management unit) 2121 holds all the undoable operations for the document which the user can select to be undone.

Let us consider a case in which the user executes a command for replacing a word in a document by another word, following which the user determines that, on reflection, the replacement of the word thus effected should be undone. The undo sub-system supports such an operation. The UndoManager 2121 holds such an operation of an UndoableEdit (undoable edit) 2122.

5. Cursor Sub-System

As described above, the controller unit of the MVC may include the cursor sub-system 204. The cursor sub-system 204 receives the input from the user. In general, such an input provides command input and/or edit operation. Accordingly, with respect to the DocumentManager 1081, the cursor sub-system 204 serves as the controller (C) component according to the MVC paradigm.

6. View

As described above, the Canvas 210 represents the logical layout of a document to be displayed on a screen. In a case that the document is an XHTML document, the Canvas 210 may include a box tree 208 that provides a logical representation of a document, which indicates how the document is displayed on a screen. With respect to the DocumentManager 1081, the box tree 208 may be included in the view (V) component according to the MVC paradigm.

D. Vocabulary Connection

The important feature of the document processing system is that the document processing system provides an environment which allows the user to handle an XML document via other representations to which the document has been mapped. With such an environment, upon the user editing a representation to which the source XML document has been mapped, the source XML document is modified according to the edit operation while maintaining the integrity of the XML document.

A document described in a markup language, e.g., an XML document is created based upon a vocabulary defined by a document type definition. The vocabulary is a set of tags. The vocabulary can be defined as desired. This allows a limitless number of vocabularies to be created. It does not serve any practical purpose to provide dedicated viewer/editor environments for such a limitless number of vocabularies. The vocabulary connection provides a method for solving this problem.

For example, a document can be described in two or more markup languages. Specific examples of such markup languages used for describing a document include: XHTML (eXtensible HyperText Markup Language), SVG (Scalable Vector Graphics), MathML (Mathematical Markup Language), and other markup languages. In other words, such a markup language can be handled in the same way as is the vocabulary or the tag set in XML.

A vocabulary is processed using a vocabulary plug-in. In a case that the document has been described in a vocabulary for which there is no available plug-in in the document processing system, the document is mapped to a document described in another vocabulary for which a plug-in is available, thereby displaying the document. Such a function enables a document to be properly displayed even if the document has been described in a vocabulary for which there is no available plug-in.

The vocabulary connection has a function of acquiring a definition file, and a function of mapping from one vocabulary to another different vocabulary based upon the definition file thus acquired. With such an arrangement, a document described in one vocabulary can be mapped to a document described in another vocabulary. As described above, the vocabulary connection maps a document described in one vocabulary to another document described in another vocabulary for which there is a corresponding display/editing plug-in, thereby allowing the user to display and edit the document.

As described above, in general, each document is described by the document processing system in the form of a DOM tree having multiple nodes. The "definition file" describes the relations among the different nodes. Furthermore, the definition file specifies whether or not the element values and the attribute values can be edited for each node. Also, the definition file may specify an expression using the element values and the attribute values of the nodes.

Using the mapping function by applying the definition file, a destination DOM tree can be created. As described above, the relation between the source DOM tree and the destination DOM tree is created and held. The vocabulary connection monitors the relation between the source DOM tree and the destination DOM tree. Upon reception of an editing instruction from the user, the vocabulary connection modifies the corresponding node included in the source DOM tree. Subsequently, a "mutation event" is issued, which gives notice that the source DOM tree has been modified. Then, the destination DOM tree is modified in response to the mutation event.

The use of the vocabulary connection allows a relatively minor vocabulary used by a small number of users to be converted into another major vocabulary. Thus, such an arrangement provides a desirable editing environment, which allows a document to be properly displayed even if the document is described in a minor vocabulary used by a small number of users.

As described above, the vocabulary connection sub-system which is a part of the document processing system provides a function that allows a document to be represented in multiple different ways.

FIG. 13 shows a vocabulary connection (VC) sub-system 300. The VC sub-system 300 provides a method for representing a document in two different ways while maintaining the integrity of the source document. For example, a single document may be represented in two different ways using two different vocabularies. Also, one representation may be a source DOM tree, and the other representation may be a destination DOM tree, as described above.

1. Vocabulary Connection Sub-System

The functions of the vocabulary connection sub-system 300 are provided to the document processing system using a plug-in which is called a VocabularyConnection 301. With such an arrangement, a corresponding plug-in is requested for each Vocabulary 305 used for representing the document. For example, let us consider a case in which a part of the document is described in HTML, and the other part is described in SVG. In this case, the vocabulary plug-in that corresponds to HTML and the vocabulary plug-in that corresponds to SVG are requested.

The VocabularyConnection plug-in 301 creates a proper VCCanvas (vocabulary connection canvas) 310 that corresponds to a document described in a proper Vocabulary 305 for the Zone 209 or the Pane 211. Using the VocabularyConnection 301, a modification made to the Zone 209 within the source DOM tree is transmitted to the corresponding Zone within another DOM tree 306 according to a conversion rule. The conversion rule is described in the form of a vocabulary connection descriptor (VCD). Furthermore, a corresponding VCManager (vocabulary connection manager) 302 is created for each VCD file that corresponds to such a conversion between the source DOM and the destination DOM.

2. Connector

A Connector 304 connects the source node included within the source DOM tree and the destination node included within the destination DOM tree. The Connector 304 operates so as to monitor modifications (changes) made to the source node included within the source DOM tree and the source document that corresponds to the source node. Then, the Connector 304 modifies the corresponding node of the destination DOM tree. With such an arrangement, the Connector 304 is the only object which is capable of modifying the destination DOM tree. Specifically, the user can modify only the source document and the corresponding source DOM tree. With such an arrangement, the Connector 304 modifies the destination DOM tree according to the modification thus made by the user.

The Connectors 304 are logically linked to each other so as to form a tree structure. The tree structure formed of the Connectors 304 is referred to as a ConnectorTree (connector tree). The connector 304 is created using a Service which is called a ConnectorFactory (connector factory=connector generating unit) 303. The ConnectorFactory 303 creates the Connectors 304 based upon a source document, and links the Connectors 304 to each other so as to create a ConnectorTree. The VocabularyConnectionManager 302 holds the ConnectorFactory 303.

As described above, a vocabulary is a set of tags for a namespace. As shown in the drawing, the VocabularyConnection 301 creates the Vocabulary 305 for a document. Specifically, the Vocabulary 305 is created by analyzing the document file, and then creating a proper VocabularyConnectionManager 302 for mapping between the source DOM and the destination DOM. Furthermore, a proper relation is created between the ConnectorFactory 303 for creating the Connectors, the ZoneFactory 205 for creating the Zones 209, and the Editlet 206 for creating the Canvases. In a case that the user has discarded or deleted a document stored in the system, the corresponding VocabularyConnectionManager 302 is deleted.

The Vocabulary 305 creates the VCCanvas 310. Furthermore, the connectors 304 and the destination DOM tree 306 are created corresponding to the creation of the VCCanvas 310.

The source DOM and the Canvas correspond to the Model (M) and the View (V), respectively. However, such a representation is useful only in a case that the target vocabulary allows a document to be displayed on a screen. With such an arrangement, the display is performed by the vocabulary plug-in. Such a vocabulary plug-in is provided for each of the principal vocabularies, e.g., XHTML, SVG, and MathML. Such a vocabulary plug-in is used for the target vocabulary. Such an arrangement provides a method for mapping a vocabulary to another vocabulary using a vocabulary connection descriptor.

Such mapping is useful only in a case that the target vocabulary can be mapped, and a method has been defined beforehand for displaying such a document thus mapped on a screen. Such a rendering method is defined in the form of a standard defined by an authority such as the W3C.

In a case that the processing requires vocabulary connection, the VCCanvas is used. In this case, the view for the source cannot be directly created, and accordingly, the Canvas for the source is not created. In this case, the VCCanvas is created using the ConnectorTree. The VCCanvas handles only the conversion of the event, but does not support display of the document on a screen.

3. DestinationZone, Pane, and Canvas

As described above, the purpose of the vocabulary connection sub-system is to create and hold two representations of a single document at the same time. With such an arrangement, the second representation is provided in the form of a DOM tree, which has been described as the destination DOM tree. The display of the document in the form of the second representation requires the DestinationZone, Canvas, and Pane.

When the VCCanvas is created, a corresponding DestinationPane 307 is also created. Furthermore, a corresponding DestinationCanvas 308 and a corresponding BoxTree 309 are created. Also, the VCCanvas 310 is associated with the Pane 211 and the Zone 209 for the source document.

The DestinationCanvas 308 provides a logical layout of a document in the form of the second representation. Specifically, the DestinationCanvas 308 provides user interface functions such as a cursor function and a selection function, for displaying a document in the form of a destination representation of the document. The event occurring at the DestinationCanvas 308 is supplied to the Connector. The DestinationCanvas 308 notifies the Connector 304 of the occurrence of a mouse event, a keyboard event, a drag-and-drop event, and events particular to the destination representation (second representation).

4. Vocabulary Connection Command Sub-System

The vocabulary connection (VC) sub-system 300 includes a vocabulary connection (VC) command sub-system 313 in the form of a component. The vocabulary connection command sub-system 313 creates a VCCommand (vocabulary connection command) 315 used for executing a command with respect to the vocabulary connection sub-system 300. The VCCommand can be created using a built-in CommandTemplate (command template) and/or created from scratch using a script language supported by a script sub-system 314.

Examples of such command templates include an "If" command template, "When" command template, "Insert" command template, etc. These templates are used for creating a VCCommand.

5. XPath Sub-System

An XPath sub-system 316 is an important component of the document processing system, and supports the vocabulary connection. In general, the Connector 304 includes XPath information. As described above, one of the tasks of the vocabulary connection is to modify the destination DOM tree according to the change in the source DOM tree. The XPath information includes one or more XPath representations used for determining a subset of the source DOM tree which is to be monitored to detect changes and/or modifications.

6. Outline of Source DOM Tree, Destination DOM Tree, and ConnectorTree

The source DOM tree is a DOM tree or a Zone of a document described in a vocabulary before vocabulary conversion. The source DOM tree node is referred to as the source node.

On the other hand, the destination DOM tree is a DOM tree or a Zone of the same document as that of the source DOM tree, and which is described in another vocabulary after having been converted by mapping, as described above in connection with the vocabulary connection. Here, the destination DOM tree node is referred to as the destination node.

The ConnectorTree is a hierarchical representation which is formed based upon the Connectors that represent the relation between the source nodes and the destination nodes. The Connectors monitor the source node and the modifications applied to the source document, and modify the destination DOM tree. The Connector is the only object that is permitted to modify the destination DOM tree.

E. Event Flow in the Document Processing System

In practice, the program needs to respond to the commands input from the user. The "event" concept provides a method for describing and executing the user action executed on a program. Many high-level languages, e.g., Java (trademark) require events, each of which describes a corresponding user action. On the other hand, conventional programs need to actively collect information for analyzing the user's actions, and for execution of the user's actions by the program itself. This means that, after initialization of the program, the program enters loop processing for monitoring the user's actions, which enables appropriate processing to be performed in response to any user action input by the user via the screen, keyboard, mouse, or the like. However, such a process is difficult to manage. Furthermore, such an arrangement requires a program which performs loop processing in order to wait for the user's actions, leading to a waste of CPU cycles.

Many languages employ distinctive paradigms in order to solve such problems. One of these paradigms is event-driven programming, which is employed as the basis of all current window-based systems. In this paradigm, all user actions belong to sets of abstract phenomena which are called "events". An event provides a sufficiently detailed description of a corresponding user action. With such an arrangement, in a case that an event to be monitored has occurred, the system notifies the program to that effect, instead of an arrangement in which the program actively collects events occurring according to the user's actions. A program that communicates with the user using such a method is referred to as an "event-driven" program.

In many cases, such an arrangement handles an event using a "Event" class that acquires the basic properties of all the events which can occur according to the user's actions.

Before the use of the document processing system, the events for the document processing system itself and a method for handling such events are defined. With such an arrangement, several types of events are used. For example, a mouse event is an event that occurs according to the action performed by the user via a mouse. The user action involving the mouse is transmitted to the mouse event by the Canvas 210. As described above, it can be said that the Canvas is the foremost level of interaction between the user and the system. As necessary, this foremost Canvas level hands over the event content to the child levels.

On the other hand, a keystroke event is issued from the Canvas 210. The keystroke event acquires a real-time focus. That is to say, a keystroke event always involves an operation. The keystroke event input to the Canvas 210 is also transmitted to the parent of the Canvas 210. Key input actions are processed via other events that allows the user to insert a character string. The event for handling the insertion of a character string occurs according to the user action in which a character is input via the keyboard. Examples of "other events" include other events which are handled in the same way as a drag event, a drop event, and a mouse event.

1. Handling of an Event Outside of the Vocabulary Connection

An event is transmitted using an event thread. The state of the Canvas 210 is modified upon reception of an event. As necessary, the Canvas 210 posts the Command 1052 to the CommandQueue 1053.

2. Handling of an Event within the Vocabulary Connection

An XHTMLCanvas 1106, which is an example of the DestinationCanvas, receives events that occur, e.g., a mouse event, a keyboard event, a drag-and-drop event, and events particular to the vocabulary, using the VocabularyConnection plug-in 301. The connector 1104 is notified of these events. More specifically, the event passes through a SourcePane 1103, a VCCanvas 1104, a DestinationPane 1105, a DestinationCanvas 1106 which is an example of the DestinationCanvas, a destination DOM tree, and a ConnectorTree, within the VocabularyConnection plug-in, as shown in FIG. 21(b).

F. ProgramInvoker and the Relation Between ProgramInvoker and Other Components

FIG. 14(a) shows the ProgramInvoker 103 and the relation between the ProgramInvoker 103 and other components in more detail. The ProgramInvoker 103 is a basic program executed under the execution environment, which starts up the document processing system. As shown in FIG. 11(b) and FIG. 11(c), the UserApplication 106, the ServiceBroker 1041, the CommandInvoker 1051, and the Resource 109 are each connected to the ProgramInvoker 103. As described above, the application 102 is a component executed under the execution environment. Also, the ServiceBroker 1041 manages the plug-ins, which provide various functions to the system. On the other hand, the CommandInvoker 1051 executes a command provided from the user, and holds the classes and functions for executing the command.

1. Plug-in and Service

A more detailed description will be made regarding the ServiceBroker 1041 with reference to FIG. 14(b). As described above, the CommandInvoker 1041 manages the plug-ins (and corresponding services), which allows various functions to be added to the system. The Service 1042 is the lowermost layer, having a function of adding the features to the document processing system, and a function of modifying the features of the document processing system. A "Service" consists of two parts, i.e., a part formed of ServiceCategories 401 and another part formed of ServiceProviders 402. As shown in FIG. 14(c), one ServiceCategory 401 may include multiple corresponding ServiceProviders 402. Each ServiceProvider operates a part of, or the entire functions of, the corresponding ServiceCategory. Also, the ServiceCategory 401 defines the type of Service.

The Services can be classified into three types, i.e., a "feature service" which provides predetermined features to the document processing system, an "application service" which is an application executed by the document processing system, and an "environment" service that provides the features necessary throughout the document processing system.

FIG. 14(d) shows an example of a Service. In this example, with respect to the Category of the application Service, the system utility corresponds to the ServiceProvider. In the same way, the Editlet 206 is the Category, and an HTMLEditlet and the SVGEditlet are the corresponding ServiceProviders. Also, the ZoneFactory 205 is another Service Category, and has a corresponding ServiceProvider (not shown).

As described above, a plug-in adds functions to the document processing system. Also, a plug-in can be handled as a unit that comprises several ServiceProviders 402 and the classes that correspond to the ServiceProviders 402. Each plug-in has dependency specified in the definition file and a ServiceCategory 401.

2. Relation Between the ProgramInvoker and the Application

FIG. 14(e) shows the relation between the ProgramInvoker 103 and the UserApplication 106 in more detail. The required documents and data are loaded from the storage. All the required plug-ins are loaded in the ServiceBroker 1041. The ServiceBroker 1041 holds and manages all the plug-ins. Each plug-in is physically added to the system. Also, the functions of the plug-in can be loaded from the storage. When the content of a plug-in is loaded, the ServiceBroker 1041 defines the corresponding plug-in. Subsequently, a corresponding UserApplication 106 is created, and the UserApplication 106 thus created is loaded in the execution environment 101, thereby attaching the plug-in to the ProgramInvoker 103.

G. The Relation Between the Application Service and the Environment

FIG. 15(a) shows the configuration of the application service loaded in the ProgramInvoker 103 in more detail. The CommandInvoker 1051, which is a component of the command sub-system 105, starts up or executes the Command 1052 in the ProgramInvoker 103. With such a document processing system, the Command 1052 is a command used for processing a document such as an XML document, and editing the corresponding XML DOM tree. The CommandInvoker 1051 holds the classes and functions required to execute the Command 1052.

Also, the ServiceBroker 1041 is executed within the ProgramInvoker 103. The UserApplication 106 is connected to the user interface 107 and the CoreComponent 110. The CoreComponent 110 provides a method which allows all the Panes to share a document. Furthermore, the CoreComponent 110 provides a font, and serves as a tool kit for the Pane.

FIG. 15(b) shows the relation between the Frame 1071, the MenuBar 1072, and the StatusBar 1073.

H. Application Core

FIG. 16(a) provides a more detailed description of the application core 108, which holds the whole document, and a part of the document, and the data of the document. The CoreComponent 110 is attached to the DocumentManager 1081 for managing the documents 1082. The DocumentManager 1081 is the owner of all the documents 1082 stored in memory in association with the document processing system.

In order to display a document on a screen in a simple manner, the DocumentManager 1081 is also connected to the RootPane 1084. Also, the functions of the Clipboard 1087, a Drag&Drop 601, and an Overlay 602 are attached to the CoreComponent 110.

The SnapShot 1088 is used for restoring the application to a given state. Upon the user executing the SnapShot 1088, the current state of the application is detected and stored. Subsequently, when the application state changes, the content of the application state thus stored is maintained. FIG. 16(b) shows the operation of the SnapShot 1088. With such an arrangement, upon the application switching from one URL to another, the SnapShot 1088 stores the previous state. Such an arrangement allows operations to be performed forward and backward in a seamless manner.

I. Document Structure within the DocumentManager

FIG. 17(a) provides a more detailed description of the DocumentManager 1081, and shows the DocumentManager holding documents according to a predetermined structure. As shown in FIG. 11(b), the DocumentManager 1081 manages the documents 1082. With an example shown in FIG. 17(a), one of the multiple documents is a RootDocument (root document) 701, and the other documents are SubDocuments (sub-documents) 702. The DocumentManager 1081 is connected to the RootDocument 701. Furthermore, the RootDocument 701 is connected to all the SubDocuments 702.

As shown in FIG. 12 and FIG. 17(a), the DocumentManager 1081 is connected to the DocumentContainer 203, which is an object for managing all the documents 1082. The tools that form a part of the tool kit 201 (e.g., XML tool kit) including a DOMService 703 and an IOManager 704 are supplied to the DocumentManager 1081. Referring to FIG. 17(a) again, the DOM service 703 creates a DOM tree based upon a document managed by the DocumentManager 1081. Each document 705, whether it is a RootDocument 701 or a SubDocument 702, is managed by a corresponding DocumentContainer 203.

FIG. 17(b) shows the documents A through E managed in a hierarchical manner. The document A is a RootDocument. On the other hand, the documents B through D are the SubDocuments of the document A. The document E is the SubDocument of the document D. The left side in FIG. 17(b) shows an example of the documents displayed on a screen according to the aforementioned hierarchical management structure. In this example, the document A, which is the RootDocument, is displayed in the form of a base frame. On the other hand, the documents B through D, which are the SubDocuments of the document A, are displayed in the form of sub-frames included in the base frame A. On the other hand, the document E, which is the SubDocument of the document D, is displayed on a screen in the form of a sub-frame of the sub-frame D.

Referring to FIG. 17(a) again, an UndoManager (undo manager=undo management unit) 706 and an UndoWrapper (undo wrapper) 707 are created for each DocumentContainer 203. The UndoManager 706 and the UndoWrapper 707 are used for executing an undoable command. Such a feature allows the user to reverse a modification which has been applied to the document according to an editing operation. Here, the modification of the SubDocument significantly affects the RootDocument. The undo operation performed under such an arrangement gives consideration to the modification that affects other hierarchically managed documents, thereby preserving the document integrity over all the documents managed in a particular hierarchical chain, as shown in FIG. 17(b), for example.

The UndoWrapper 707 wraps undo objects with respect to the SubDocuments stored in the DocumentContainer 203. Then, the UndoWrapper 707 connects the undo objects thus wrapped to the undo object with respect to the RootDocument. With such an arrangement, the UndoWrapper 707 acquires available undo objects for an UndoableEditAcceptor (undoable edit acceptor=undoable edit reception unit) 709.

The UndoManager 706 and the UndoWrapper 707 are connected to the UndoableEditAcceptor 709 and an UndoableEditSource (undoable edit source) 708. Note that the Document 705 may be the UndoableEditSource 708 or a source of an undoable edit object, as can be readily understood by those skilled in this art.

J. Undo Command and Undo Framework

FIG. 18(a) and FIG. 18(b) provide a more detailed description with respect to an undo framework and an undo command. As shown in FIG. 18(a), an UndoCommand 801, RedoCommand 802, and an UndoableEditCommand 803 are commands that can be loaded in the CommandInvoker 1051, and which are serially executed. The UndoableEditCommand 803 is further attached to the UndoableEditSource 708 and the UndoableEditAcceptor 709. Examples of such undoable-EditCommands include a "foo" EditCommand 804 and a "bar" EditCommand 805.

1. Execution of UndoableEditCommand

FIG. 18(b) shows execution of the UndoableEditCommand. First, let us consider a case in which the user edits the Document 705 using an edit command. In the first step S1, the UndoableEditAcceptor 709 is attached to the UndoableEditSource 708 which is a DOM tree of the Document 705. In the second step S2, the Document 705 is edited using an API for the DOM according to a command issued by the user. In the third step S3, a listener of the mutation event is notified of the modification. That is to say, in this step, the listener that monitors all modifications made to the DOM tree detects such an edit operation. In the fourth step S4, the UndoableEdit is stored as an object of the UndoManager 706. In the fifth step S5, the UndoableEditAcceptor 709 is detached from the UndoableEditSource 708. Here, the UndoableEditSource 708 may be the Document 705 itself.

K. Procedure for Loading a Document to the System

Description has been made in the aforementioned subsections regarding various components and sub-components of the system. Description will be made below regarding methods for using such components. FIG. 19(a) shows the outline of the operation for loading a document to the document processing system. Detailed description will be made regarding each step with reference to examples shown in FIGS. 24 through 28.

In brief, the document processing system creates a DOM based upon the document data which is provided in the form of a binary data stream. First, an ApexNode (apex node=top node) is created for the targeted part of the document, which is a part of the document that belongs to the Zone. Subsequently, the corresponding Pane is identified. The Pane thus identified generates the Zone and Canvas from the ApexNode and the physical screen. Then, the Zone creates a Facet for each node, and provides the necessary information to the Facets. On the other hand, the Canvas creates a data structure for rendering the nodes based upon the DOM tree.

More specifically, the document is loaded from a storage 901. Then, a DOM tree 902 of the document is created. Subsequently, a corresponding DocumentContainer 903 is created for holding the document. The DocumentContainer 903 is attached to the DocumentManager 904. The DOM tree includes the root node, and in some cases includes multiple secondary nodes.

Such a document generally includes both text data and graphics data. Accordingly, the DOM tree may include an SVG sub-tree, in addition to an XHTML sub-tree. The XHTML sub-tree includes an ApexNode 905 for XHTML. In the same way, the SVG sub-tree includes an ApexNode 906 for SVG.

In Step 1, the ApexNode 906 is attached to a Pane 907 which is a logical layout of the screen. In Step 2, the Pane 907 issues a request for the CoreComponent which is the PaneOwner (pane owner=owner of the pane) 908 to provide a ZoneFactory for the ApexNode 906. In Step 3, in the form of a response, the PaneOwner 908 provides the ZoneFactory and the Editlet which is a CanvasFactory for the ApexNode 906.

In Step 4, the Pane 907 creates a Zone 909. The Zone 909 is attached to the Pane 907. In Step 5, the Zone 909 creates a Facet for each node, and attaches the Facets thus created to the respective nodes. In Step 6, the Pane 907 creates a Canvas 910. The Canvas 910 is attached to the Pane 907. The Canvas 910 includes various Commands. In Step 7, the Canvas 910 creates a data structure for rendering the document on a screen. In a case of XHTML, the data structure includes a box tree structure.

1. MVC of the Zone

FIG. 19(b) shows the outline of a structure of the Zone using the MVC paradigm. In this case, with respect to a document, the Zone and the Facets are the input, and accordingly the model (M) includes the Zone and the Facets. On the other hand, the Canvas and the data structure for rendering a document on a screen are the output, in the form of an image displayed on a screen for the user. Accordingly, the view (V) corresponds to the Canvas and the data structure. The Command executes control operations for the document and the various components that correspond to the document. Accordingly, the control (C) includes the Commands included in the Canvas.

L. Representation of a Document

Description will be made below regarding an example of a document and various representations thereof. The document used in this example includes both text data and image data. The text data is represented using XHTML, and the image data is represented using SVG. FIG. 20 shows in detail the relation between the components of the document and the corresponding objects represented in the MVC. In this example, a Document 1001 is attached to a DocumentContainer 1002 for holding the Document 1001. The document is represented in the form of a DOM tree 1003. The DOM tree includes an ApexNode 1004.

The ApexNode is indicated by a solid circle. Each of the nodes other than the ApexNode is indicated by an empty circle. Each Facet used for editing the node is indicated by a triangle, and is attached to the corresponding node. Here, the document includes text data and image data. Accordingly, the DOM tree of the document includes an XHTML component and an SVG component. The ApexNode 1004 is the top node of the XHTML sub-tree. The ApexNode 1004 is attached to an XHTMLPane 1005 which is the top pane for physically representing the XHTML component of the document. Furthermore, the ApexNode 1004 is attached to an XHTMLZone 1006 which is a part of the DOM tree of the document.

Also, the Facet that corresponds to the Node 1004 is attached to the XHTMLZone 1006. The XHTMLZone 1006 is attached to the XHTMLPane 1005. The XHTMLEditlet creates a XHTMLCanvas 1007 which is a logical representation of the document. The XHTMLCanvas 1007 is attached to the XHTMLPane 1005. The XHTMLCanvas 1007 creates a BoxTree 1009 for the XHTML component of the Document 1001. Various commands 1008 necessary for holding and displaying the XHTML component of the document are added to the XHTMLCanvas 1007.

In the same way, an ApexNode 1010 of the SVG sub-tree of the document is attached to an SVGZone 1011 which is a part of the DOM tree of the document 1001, and which represents the SVG component of the document. The ApexNode 1010 is attached to an SVGPane 1013 which is the top Pane for physically representing the SVG part of the document. An SVGCanvas 1012 for logically representing the SVG component of the document is created by the SVGEditlet, and is attached to an SVGPane 1013. The data structure and the commands for rendering the SVG component of the document on a screen are attached to the SVGCanvas. For example, this data structure may include circles, lines, and rectangles, and so forth, as shown in the drawing.

While description has been made regarding the representation of a document with reference to FIG. 20, further description will be made regarding a part of such examples of the representations of the document using the above-described MVC paradigm with reference to FIG. 21(a). FIG. 21(a) shows a simplified relation between M and V (MV) with respect to the XHTML components of the document 1001. In this case, the model is the XHTMLZone 1101 for the XHTML component of the Document 1001. The tree structure of the XHTMLZone includes several Nodes and the corresponding Facets. With such an arrangement, the corresponding XHTMLZone and the Pane are a part of the model (M) component of the MVC paradigm. On the other hand, the view (V) component of the MVC paradigm corresponds to the XHTMLCanvas 1102 and the BoxTree that correspond to the XHTML component of the Document 1001. With such an arrangement, the XHTML component of the document is displayed on a screen using the Canvas and the Commands included in the Canvas. Note that the events occurring due to the keyboard action and the mouse input proceed in the opposite direction to that of the output.

The SourcePane provides an additional function, i.e., serves as a DOM owner. FIG. 21(b) shows the operation in which the vocabulary connection is provided for the components of the Document 1001 shown in FIG. 21(a). The SourcePane 1103 that serves as a DOM holder includes a source DOM tree of the document. The ConnectorTree 1104 is created by the ConnectorFactory, and creates the DestinationPane 1105 which also serves as an owner of the destination DOM. The DestinationPane 1105 is provided in the form of the XHTMLDestinationCanvas 1106 having a box tree layout.

M. The Relation Between Plug-In Sub-System, Vocabulary Connection, and Connector FIGS. 22(a) through 22(c) provide further detailed description with respect to the plug-in sub-system, the vocabulary connection, and the Connector, respectively. The Plug-in sub-system is used for adding a function to the document processing system or for replacing a function of the document processing system. The plug-in sub-system includes the ServiceBroker 1041. A ZoneFactoryService 1201 attached to the ServiceBroker 1041 creates a Zone that corresponds to a part of the document. Also, an EditletService 1202 is attached to the ServiceBroker 1041. The EditletService 1202 creates a Canvas that corresponds to the Nodes included in the Zone.

Examples of the ZoneFactories include an XHTMLZoneFactory 1211 and an SVGZoneFactory 1212, which create an XHTMLZone and an SVGZone, respectively. As described above with reference to an example of the document, the text components of the document may be represented by creating an XHTMLZone. On the other hand, the image data may be represented using an SVGZone. Examples of the EditletService includes an XHTMLEditlet 1221 and an SVGEditlet 1222.

FIG. 22(b) shows the vocabulary connection in more detail. The vocabulary connection is an important feature of the document processing system, which allows a document to be represented and displayed in two different manners while maintaining the integrity of the document. The VCManager 302 that holds the ConnectorFactory 303 is a part of the vocabulary connection sub-system. The ConnectorFactory 303 creates the Connector 304 for the document. As described above, the Connector monitors the node included in the source DOM, and modifies the node included in the destination DOM so as to maintain the integrity of the connection between the two representations.

A Template 317 represents several node conversion rules. The vocabulary connection descriptor (VCD) file is a template list which represents several rules for converting a particular path, an element, or a set of elements that satisfies a predetermined rule into another element. All the Templates 317 and CommandTemplates 318 are attached to the VCManager 302. The VCManager is an object for managing all the sections included in the VCD file. A VCManager object is created for each VCD file.

FIG. 22(c) provides further detailed description with respect to the Connector. The ConnectorFactory 303 creates a Connector based upon the source document. The ConnectorFactory 303 is attached to the Vocabulary, the Template, and the ElementTemplate, thereby creating a VocabularyConnector, a TemplateConnector, and an ElementConnector, respectively.

The VCManager 302 holds the ConnectorFactory 303. In order to create a Vocabulary, the corresponding VCD file is read out. As described above, the ConnectorFactory 303 is created. The ConnectorFactory 303 corresponds to the ZoneFactory for creating a Zone, and the Editlet for creating a Canvas.

Subsequently, the EditletService for the target vocabulary creates a VCCanvas. The VCCanvas also creates the Connector for the ApexNode included in the source DOM tree or the Zone. As necessary, a Connector is created recursively for each child. The ConnectorTree is created using a set of the templates stored in the VCD file.

The template is a set of rules for converting elements of a markup language to other elements. For example, each template is matched to a source DOM tree or a Zone. In a case of a suitable match, an apex Connector is created. For example, a template "A/*/D" matches all the branches starting from the node A and ending with the node D. In the same way, a template "//B" matches all the "B" nodes from the root.

N. Example of VCD File with Respect to ConnectorTree

Further description will be made regarding an example of the processing with respect to a predetermined document. In this example, a document entitled "MySampleXML" is loaded in the document processing system. FIG. 23 shows an example of the VCD script for the "MySampleXML" file, which uses the VCManager and the ConnectorFactoryTree. In this example, the script file includes a vocabulary section, a template section, and a component that corresponds to the VCManager. With regard to the tag "vcd:vocabulary", the attribute "match" is set to "sample:root", the attribute "label" is set to "MySampleXML", and the attribute "call-template" is set to "sample template".

In this example, with regard to the VCManager for the document "MySampleXML", the Vocabulary includes the apex element "sample:root". The corresponding UI label is "MySampleXML". In the template section, the tag is "vcd:template", and the name is set to "sample:template".

O. Detailed Description of an Example of a Method for Loading a File to the System FIGS. 24 through 28 provide a detailed description regarding loading the document "MySampleXML" in the system. In Step 1 shown in FIG. 24(a), the document is loaded from a storage 1405. The DOMService creates a DOM tree and a DocumentContainer 1401 that corresponds to the DocumentManager 1406. The DocumentContainer 1401 is attached to the DocumentManager 1406. The document includes an XHTML sub-tree and a MySampleXML sub-tree. With such a document, the ApexNode 1403 in the XHTML sub-tree is the top node of the XHTML sub-tree, to which the tag "xhtml:html" is assigned. On the other hand, the ApexNode 1404 in the "MySampleXML" sub-tree is the top node of the "MySampleXML" sub-tree, to which the tag "sample:root" is assigned.

In Step S2 shown in FIG. 24(b), the RootPane creates an XHTMLZone, Facets, and a Canvas. Specifically, a Pane 1407, an XHTMLZone 1408, an XHTMLCanvas 1409, and a BoxTree 1410 are created corresponding to the ApexNode 1403.

In Step S3 shown in FIG. 24(c), the tag "sample:root" that is not understood under the XHTMLZone sub-tree is detected, and a SubPane is created in the XHTMLCanvas region.

In Step 4 shown in FIG. 25, the SubPane can handle the "sample:root", thereby providing a ZoneFactory having a function of creating an appropriate zone. The ZoneFactory is included in the vocabulary, and the vocabulary can execute the ZoneFactory. The vocabulary includes the content of the VocabularySection specified in "MySampleXML".

In Step 5 shown in FIG. 26, the Vocabulary that corresponds to "MySampleXML" creates a DefaultZone 1601. In order to create a corresponding Editlet for creating a corresponding Canvas, a SubPane 1501 is provided. The Editlet creates a VCCanvas. The VCCanvas calls the TemplateSection including a ConnectorFactoryTree. The ConnectorFactoryTree creates all the connectors that form the ConnectorTree.

In Step S6 shown in FIG. 27, each Connector creates a corresponding destination DOM object. Some of the connectors include XPath information. Here, the XPath information includes one or more XPath representations used for determining a partial set of the source DOM tree which is to be monitored for changes and modifications.

In Step S7 shown in FIG. 28, the vocabulary creates a DestinationPane for the destination DOM tree based upon the pane for the source DOM. Specifically, the DestinationPane is created based upon the SourcePane. The ApexNode of the destination tree is attached to the DestinationPane and the corresponding Zone. The DestinationPane creates a DestinationCanvas. Furthermore, the DestinationPane is provided with a data structure for rendering the document in a destination format and an Editlet for the DestinationPane itself.

FIG. 29(a) shows a flow in a case in which an event has occurred at a node in the destination tree that has no corresponding source node. In this case, the event acquired by the Canvas is transmitted to an ElementTemplateConnector via the destination tree. The ElementTemplateConnector has no corresponding source node, and accordingly, the event thus transmitted does not involve an edit operation for the source node. In a case that the event thus transmitted matches any of the commands described in the CommandTemplate, the ElementTemplateConnector executes the Action that corresponds to the command. On the other hand, in a case that there is no corresponding command, the ElementTemplateConnector ignores the event thus transmitted.

FIG. 29(b) shows a flow in a case in which an event has occurred at a node in the destination tree that has been associated with a source node via a TextOfConnector. The TextOfConnector acquires the text node from the node in the source DOM tree specified by the XPath, and maps the text node to the corresponding node in the destination DOM tree. The event acquired by the Canvas, such as a mouse event, a keyboard event, or the like, is transmitted to the TextOfConnector via the destination tree. The TextOfConnector maps the event thus transmitted to a corresponding edit command for the corresponding source node, and the edit command thus mapped is loaded in the CommandQueue 1053. The edit commands are provided in the form of an API call set for the DOM executed via the Facet. When the command loaded in the queue is executed, the source node is edited. When the source node is edited, a mutation event is issued, thereby notifying the TextOfConnector, which has been registered as a listener, of the modification of the source node. Then, the TextOfConnector rebuilds the destination tree such that the destination node is modified according to the modification of the source node. In this stage, in a case that the template including the TextOfConnector includes a control statement such as "for each", "for loop", or the like, the ConnectorFactory reanalyzes the control statement. Furthermore, the TextOfConnector is rebuilt, following which the destination tree is rebuilt.

EMBODIMENT

Detailed description will be made below regarding an embodiment based upon the above-described background technique. The present embodiment proposes a technique for storing a document in the form of multiple separate files. With such an arrangement, upon the document processing apparatus opening the document, the separate files are properly combined, thereby providing the document to the user. For example, let us consider a case of creating a document including data to be kept secret from a part of the users. In this case, the data to be kept secret is stored in the form of a separate file. In a case of providing such a document to a user who has permission to browse the secret data, the secret data is combined with the other data sets, and the document thus combined is displayed for the user. On the other hand, in a case of providing the document to a user who has no permission to browse the secret data, the document is displayed for the user with the secret data kept secret.

FIG. 30 shows a configuration of a document management system 21 according to the present embodiment. The document management system 21 includes: the document processing apparatus 100 which performs operations such as editing operation, display operation, etc., for the document; and a document management server 23 which manages the division and combining of the document. The document processing apparatus 100 and the document management server 23 are connected via the LAN 25 which is an example of a network. The document processing apparatus 100 transmits an XML document thus created to the document management server 23, and instructs the document management server 23 to store the document. The document management server 23 stores the XML document received from the document processing apparatus 100. In this stage, in a case that the XML document includes secret data, the secret data is stored in the form of a separate file. Upon reception of a request from the document processing apparatus 100 to acquire an XML document stored in the document management server 23, the document management server 23 certifies the user of the requesting document processing apparatus 100. Then, the document management server 23 combines the secret data with the XML document in an appropriate manner according to the certification level, and transmits the XML document thus combined to the document processing apparatus 100.

FIG. 31 shows an internal configuration of the document processing apparatus 100 according to the present embodiment. The document processing apparatus 100 according to the present embodiment includes a communication unit 26, in addition to the configuration of the document processing apparatus 20 according to the background technique shown in FIG. 1. The communication unit 26 transmits the document created by the document processing apparatus 100 to the document management server 23 via the LAN 25. Furthermore, the communication unit 26 receives the document stored in the document management server 23 via the LAN 25. The other components and operations are the same as those of the background technique.

FIG. 32 shows an internal configuration of the document management server 23. The document management server 23 principally includes a communication unit 3010, a document storage request reception unit 3020, a document file reception unit 3022, a secret data extracting unit 3024, an ID issuing unit 3026, a document file dividing unit 3028, a document acquisition request reception unit 3030, a user certification unit 3032, a document file combining unit 3034, a document file transmission unit 3036, a document file management table 3040, a document file storage unit 3050, and a user database 3060. Such a configuration can be realized in a variety of forms by hardware only, software only, or a combination thereof.

Upon the document storage request reception unit 3020 receiving a request from the document processing apparatus 100 to store a document file, the document file reception unit 3022 receives the document file from the document processing apparatus 100 via the communication unit 3010. The secret data extracting unit 3024 extracts the secret data such as proper nouns and so forth stored in the document file received by the document file reception unit 3022. Here, the secret data may be marked up using a predetermined tag in the document. Also, the secret data extracting unit 3024 may provide, to the user's document processing apparatus 100, an interface screen which allows the user to specify the secret data. With the former arrangement, the component such as the editing unit 54, 64, or the like, which sets a tag for indicating the secret data in the document, and the tag thus set in the document file serve as a notifying unit which notifies the document management server 23 of the secret data included in the document file. On the other hand, with the latter arrangement, the interface screen provides a function as the notifying unit. Also, the secret data extracting unit 3024 may hold a list of the data sets to be kept secret. With such an arrangement, the secret data extracting unit 3024 may extract the data listed in the list held by the secret data extracting unit 3024 itself as the secret data sets without receiving a notification from the document processing apparatus 100. The ID issuing unit 3026 issues an ID for each of the secret data sets thus extracted by the secret data extracting unit 3024. It is sufficient for the IDs to enable the secret data sets included in a document to be uniquely identified. Accordingly, the same secret data ID can be used in other documents.

The document file dividing unit 3028 provides a function as a replacing unit. Specifically, first, the document file dividing unit 3028 replaces each secret data set included in the document file (which will be referred to as "original file" hereafter) received by the document file reception unit 3022 with the corresponding ID issued by the ID issuing unit 3026, and stored the file in the document file storage unit 3050. The document file thus created will be referred to as "public file" hereafter. Furthermore, the document file dividing unit 3028 creates a file that specifies the correspondence between the secret data and the ID, and stores the file thus created in the document file storage unit 3050. The document file thus created will be referred to as "secret file" hereafter. That is to say, the document file dividing unit 3028 divides an original file into a public file and a secret file, which are stored in the document file storage unit 3050. Here, the document storage unit 3050 may store the public file in a region that permits the document processing apparatus 100 to directly access the file. On the other hand, the secret file is stored in a manner that does not permit the document processing apparatus 100 to directly access the file. As described above, upon reception of a request from the document processing apparatus 100 to store the original file, the document management server 23 stores the secret data included in the original file in the form of a protective secret file that protects the secret data from being directly accessed from the document processing apparatus 100. The document file dividing unit 3028 registers in the document file management table 3040 the information necessary for management of the correspondence between the public file and the secret file.

Upon reception of a request from the document processing apparatus 100 to acquire a document stored in the document file storage unit 3050, the document management server 23 performs combining processing for the document in an appropriate manner according to the certification level or the access permission of the user, and provides the document file thus combined. For example, let us consider a case in which the document file is provided to a user having low-level access permission. In this case, the public file is provided to such a user with the secret data to be kept secret. On the other hand, let us consider a case in which the document file is provided to a user with high-level access permission. In this case, the document management server 23 combines the public file with the secret file such that each ID included in the public file is replaced by the corresponding secret data included in the secret file, and provides the document file thus combined to such a user. With such an arrangement, multiple secret files may be prepared according to the access permission levels of the users who can acquire the document. For example, for the user having the highest access permission level, a secret file that specifies the correspondence between the secret data and the ID for all the secret data sets is prepared, thereby disclosing all the secret data sets for such a user. On the other hand, for a user having a mid-level access permission level, a secret file that specifies the correspondence between the secret data and the ID for a part of the secret data sets is prepared, thereby disclosing a part of the secret data sets for such a user. Also, for a user having the lowest access permission level, the secret file is not created, thereby disclosing no secret data for such a user. Also, the access permission level may be set to each secret data set specified in the secret file. With such an arrangement, the secret data sets may be selectively combined with the public file according to the user's access permission level.

Upon the document acquisition request reception unit 3030 receiving a request from the document processing apparatus 100 to acquire a document file, the user certification unit 3032 certificates the user of the document processing apparatus 100. The user certification unit 3032 may request the document processing apparatus 100 to input the user ID, the password, and so forth. Then, the user certification unit 3032 may certify the combination of the user ID and the password thus received, with reference to the user database 3036. In a case that the user certification unit 3032 has succeeded in certifying the user, the document file combining unit 3034 combines the secret file with the public file in an appropriate manner according to the user's certification level. In this step, the document file combining unit 3034 acquires the correspondence between the public file and the secret file with respect to the document thus requested, with reference to the document file management table 3040. Then, the document file combining unit 3034 reads out the necessary files from the document file storage unit 3050, and combines these files thus read out. The document file transmission unit 3036 transmits the document file, thus combined by the document file combining unit 3034, to the document processing apparatus 100 via the communication unit 3010.

FIG. 33 shows an example of internal data of the document file management table 3040. The document file management table 3040 is provided with document file name fields 3042, and correspondence information fields 3044 each of which stores the information with respect to the secret file to be combined with the corresponding document file. Here, the filename of the original file may be used as the filename of the document file used for receiving a request from the user to acquire a document. Also, the filename of the public file may be used in the same way. Also, the filename of the original file may differ from the filename of the public file. Description is made here regarding an arrangement in which the filename of the original file and the filename of the public file are the same. That is to say, with the present embodiment, the public file created based upon the original file is stored in the document file storage unit 3050 with the same filename. Such an arrangement allows the public file to be accessed using the same filename as that of the original file. With such an arrangement, the number of the correspondence information fields 3044 thus provided is the same as that of the secret files each of which is prepared for a given public file. Each correspondence information field 3044 includes a certification level field 3046 and a secret file field 3048. With such an arrangement, let us consider a case in which the secret data sets are selectively disclosed according to the user's certification level. In this case, the document file dividing unit 3028 creates and stores multiple secret files, and registers the correspondence between the secret file and the certification level with the correspondence information field 3044 for each secret file. The document file combining unit 3034 acquires the filename of the secret file to be combined, from the document file management table 3040 according to the user's certification level thus certified by the user certification unit 3032. Then, the document file combining unit 3034 reads out the secret file from the document file storage unit 3050, and combines the secret file with the public file.

FIG. 34 shows an example of internal data of the user database 3060. The user database 3060 is provided with user ID fields 3062, password fields 3064, and certification level fields 3066. The user certification unit 3032 certifies whether or not the combination of the user ID and the password received from the user matches that registered with the user database 3060. In a case that the match has been certified, the user certification unit 3032 acquires the certification level registered with the certification level field 3066.

Further description will be made in detail regarding the operation flow with reference to a specific example of an XML document processed by the document management system 21 according to the present embodiment.

FIG. 35 shows an example of an XML document which is to be processed by the document management system 21 according to the present embodiment. An XML document "sample.xml" is described in the vocabulary "xmail" used for describing a mail. A root node "xmail" has a "title" element and a "comment" element in the form of child elements. The text node of the "title" element stores the title of the mail. On the other hand, the text node of the "comment" element stores the main body of the mail. Furthermore, the "comment" element has a "list" element in the form of a child element, which stores a name list. The list "element" has an "lt" element and a "person" element in the form of child elements. The text node of the "lt" element stores the title of the list. With such an arrangement, multiple "person" elements are provided, each of which stores private information. Here, each "person" element has a "name" element that stores the name and an "address" element that stores the address, in the form of child elements.

FIG. 36 shows an example of a definition file "sample.vcd" for mapping the XML document shown in FIG. 35 to XHTML, thereby allowing the XML document to be displayed and edited. A template 4000 that corresponds to the root node "xmail" is described using the basic elements of XHTML, such as the "html" tag, the "head" tag, and the "body" tag". With such an arrangement, the element value of the "xmail:title" element is substituted for the "html/head/title" element that stores the title of the XHTML document. Furthermore, the element value of the "xmail:title" element is displayed in the form of the headline "h1" at the top of the main body of the XHTML document enclosed by the "body" tag. A template 4002 that corresponds to the "comment" element specifies that the element value of the "comment" element is displayed in the form of a paragraph according to the "p" tag. On the other hand, a template 4004 that corresponds to the "list" element specifies that the title of the list stored in the "xmail:lt" element is displayed in the first row of the table "table", the character string "name" is displayed in the second row and the first column thereof, and the character string "address" is displayed in the second row and the second column thereof. A template 4006 that corresponds to the "person" element specifies that the template that corresponds to the "xmail:name" element is applied to the element in each row and the first column of the "table", and the template that corresponds to the "xmail:address" element is applied to the element in each row and the second column. A template 4008 that corresponds to the "name" element specifies that the element value of the "name" element is displayed. On the other hand, a template 410 that corresponds to the "address" element specifies that the element value of the "address" element is displayed.

FIG. 37 shows an example of a screen on which the XML document shown in FIG. 35, to which the definition file shown in FIG. 36 has been applied, is displayed. As described in the background technique, the XML document "sample.xml" is translated into an XHTML document by the mapping unit 82 of the VC unit 80 using the definition file "sample.vcd". The HTML document thus translated is displayed on the display unit 56 of the HTML unit 50.

Let us consider a case in which, after the user has selected the character strings "Tokushima Taro", "Awa Hanako", "Shikoku Taro", and "Vxx, Hiraishiwakamatsu, Kawauchi-machi, Tokushima-shi, Tokushima", each of which is a proper noun, the user sets these data sets to the secret data sets via a user interface such as a pull-down menu, a right-click menu, or the like. In this stage, the system may display another user interface such as a pop-up menu which allows the user to specify the user's certification level that determines the user's permission level, for permission of the disclosure of the document to the user. The information such as the secret data, the certification level, etc., may be transmitted to the document management server 23 in the form of a notification separate from the document file. Unlike such an arrangement, with the present invention, each of the secret data sets is marked up using a predetermined tag in the XML document, thereby notifying the document management server 23 of the secret data sets.

FIG. 38 shows an example of an XML document including the secret data sets thus marked up. In the XML document "sample.xml" shown in FIG. 38, each data set to be set to secret data is marked up using the "secret" tag. Here, each "secret tag" has an attribute value that specifies the user's certification level that determines the user's permission level for permission of the disclosure of the document to the user.

Let us consider a case in which the document processing apparatus 100 transmits the XML document to the document management server 23 via the communication unit 26, and requests the document management server 23 to store the document. In this case, with the document management server 23, the document file reception unit 3022 acquires the XML document, and the secret data extracting unit 3024 extracts the secret data sets. In the XML document shown in FIG. 38, each secret data set is stored in an "xmail:secret" element. Accordingly, the secret data extracting unit 3024 extracts the "xmail:secret" elements. Then, the ID issuing unit 3026 issues IDs, the number of which is the same as the number of the secret data sets thus extracted. In an example shown in FIG. 38, the XML document includes six "xmail: secret" elements. Accordingly, the ID issuing unit 3026 may issue six IDs. However, with the present embodiment, the ID issuing unit 3026 issues four IDs since the three secret data sets stored in the "xmail:address" elements are the same. The document file dividing unit 3028 provides the secret data sets in the form of a separate file, thereby dividing the XML document into multiple files.

FIG. 39 shows an example of a public file thus created by dividing the XML document shown in FIG. 38 by the document file dividing unit 3028. The public file is provided by removing the secret data sets from the original file. More specifically, each secret data set is replaced by an "anonymous" tag which is a tag of the "xmail" vocabulary, and which stores the ID of the secret data set in the form of an attribute value. Let us consider a case in which the user acquires the public file. In this case, such an arrangement permits the user to examine only the IDs of the secret data sets, and does not permit the user to examine the real values of the secret data sets.

FIG. 40 shows an example of a secret file thus created by dividing the XML document shown in FIG. 38 by the document file dividing unit 3028. The secret file "anonymous2.xml" specifies the correspondence between the ID of the secret data set specified in the original file and the real value thereof using the "anonymous" vocabulary. Each "item" element of the "anonymous" vocabulary includes a "serial" element that stores the ID of the secret data set and a "name" element that stores the real value of the secret data set associated with the ID.

FIG. 41 shows another example of a secret file thus created by dividing the XML document shown in FIG. 38 by the document file dividing unit 3028. With such an arrangement, in a case that a user having the certification level "1" has requested to acquire a document, the secret file shown in FIG. 40 is combined with the public file. On the other hand, in a case that a user having the certification level "2" has requested to acquire a document, the secret file shown in FIG. 41 is combined with the public file. The secret file shown in FIG. 40 specifies only the secret data sets to which the certification level "1" has been set in the XML document shown in FIG. 38. On the other hand, the secret file shown in FIG. 41 specifies the secret data sets to which the certification level "1" has been set, and the secret data sets to which the certification level "2" has been set, in the XML document shown in FIG. 38.

FIG. 42 shows an example of a definition file that specifies the definition for combining the secret file shown in FIG. 40 with the public file shown in FIG. 39. The definition file specifies the information to the effect that each portion described in the "anonymous" vocabulary is to be restored using the secret file. The document file combining unit 3034 combines the secret file with the public file with reference to the definition file. Comparing with the definition file shown in FIG. 36, the definition file shown in FIG. 42 includes an additional namespace declaration statement 4012 for declaring the "anonymous" vocabulary used for describing the combining of the secret data. Furthermore, the template for the "name" element is replaced by a template 4014. Also, the template for the "address" element is replaced by a template 4016.

Let us consider a case in which the document processing apparatus 100 requests the document management server 23 to acquire this XML document via the communication unit 26. In this case, upon the document acquisition request reception unit 3030 receiving this request, and the user certification unit 3032 certifies the user with reference to the user database 3060, thereby determining the user's certification level. The document file combining unit 3034 acquires the filename of the secret file, which is to be combined with the public file of the document, from the document file management table 3040 according to the user's certification level, and reads out the corresponding public file and secret file from the document file storage unit 3050. Furthermore, the document file combining unit 3034 reads out the definition file, the filename of which is specified in the public file, from the document file storage unit 3050. The document file combining unit 3034 restores the content that corresponds to each "anonymous" tag with reference to the definition file, thereby creating a composite file. In this example, each "anonymous" tag is replaced by the corresponding secret data set stored in the secret file. In this stage, the document file combining unit 3034 modifies the definition file, which is used for combining the secret file with the public file, thereby creating a definition file used for processing the composite file. The document file transmission unit 3036 transmits the document file thus created to the document processing apparatus 100.

In a case that the user has not been certified, or in a case that the user's certification level is "0", the secret file is not combined with the public file. In this case, the document file combining unit 3034 may output the public file as a composite file. Also, the document file combining unit 3034 may replace each "xmail:anonymous" tag, which represents secret data, with the ID of the corresponding secret data, or a tag for displaying an icon image or the like that represents the secret data, thereby creating a composite file. The document file combining unit 3034 removes the namespace declaration statement 4012 for the "anonymous" vocabulary from the definition file used for combining the secret file with the public file shown in FIG. 42. Furthermore, the document file combining unit 3034 inserts commands into the template 4014 for the "name" element and the template 4016 for the "address" element for displaying the IDs of the secret data sets or icons, thereby creating a definition file for processing the composite file. FIG. 43 and FIG. 44 show display examples of the composite files thus created. FIG. 43 shows an example in which each secret data set is displayed in the form of the corresponding ID. FIG. 44 shows an example in which each secret data set is displayed in the form of an icon.

In a case of the user's certification level of "1", the secret file for the user having the certification level "1" shown in FIG. 40 is combined with the public file shown in FIG. 39. Of the secret data sets included in the public file, the secret data set with the ID of 0001, the secret data set with the ID of 0002, and the secret data set with the ID of 0003, are restored with reference to the secret file, thereby replacing these secret data sets by the real values. However, in this case, the secret data with the ID of 0004 is not restored. FIG. 45 and FIG. 46 show display examples of a composite file thus created. FIG. 45 shows an example in which each secret data set is displayed in the form of the corresponding ID. FIG. 46 shows an example in which each secret data set is displayed in the form of an icon.

In a case of the user's certification level of "2", the secret file shown in FIG. 41 is combined with the public file shown in FIG. 39. In this case, all the secret data sets included in the public file are restored, thereby creating a composite file which is the same as the original file shown in FIG. 35. The definition file shown in FIG. 36 is applied to the composite file thus created, thereby displaying the composite file as shown in FIG. 37.

FIG. 47 shows another example of a public file created by dividing the XML document shown in FIG. 38 by the document file dividing unit 3028. In an example shown in FIG. 47, the "xmail:anonymous" tag, which has been inserted instead of the element value of the "xmail:name" that is a secret data set, has a text node that stores the substitute character string such as "anonymous A" for the secret data.

FIG. 48 shows an example of a definition file which is to be applied to the public file shown in FIG. 47. A template 4018 for the "xmail:name" element specifies a command whereby, in a case that the "xmail:anonymous" element has a text node, the character string stored in the text node is displayed, and a command whereby, in a case that the "xmail:anonymous" element has no text node, the ID specified in the form of an attribute value of the "xmail:anonymous" element is displayed.

FIG. 49 shows an example of a screen that displays the public file shown in FIG. 47, to which the definition file shown in FIG. 48 has been applied. In the "name" fields of the "list of the inventors", the values of the text nodes of the "xmail:anonymous" elements, i.e., "anonymous A", "anonymous B", and "anonymous C" are displayed. On the other hand, in the "address" fields thereof, the ID specified in the form of an attribute value of the "xmail:anonymous" element, i.e., "0004" is displayed.

As described above, with the technique according to the present embodiment, a document is stored in the form of multiple separate files according to the elements included in the document, thereby storing the important information with appropriate security. Also, such an arrangement allows the operation which determines whether or not the disclosure is to be permitted to be properly controlled for each secret data set according to the user's permission level.

Description has been made regarding the present invention with reference to the embodiments. The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention.

Description has been made in the above embodiments regarding an arrangement for processing an XML document. Also, the document processing apparatus 100 has a function of processing other markup languages, e.g., SGML, HTML, etc.

INDUSTRIAL APPLICABILITY

The present invention can be applied to a document management apparatus which handles secret data such as proper nouns.

The invention claimed is:

1. A document management apparatus comprising:
an acquisition unit which acquires a document;
an extracting unit which extracts a proper noun included in the document;
an issuing unit which issues an identifier to the proper noun extracted by said extracting unit;
a replacing unit which replaces the proper noun in the document by the identifier;
a storage unit which stores the proper noun and the identifier in association with each other;
a combining unit having a function whereby, in a case of reception of a request from a user, who has a permission to access the proper noun, to acquire the document, the proper noun is read out from the storage unit, and the proper noun thus read out is combined with the document; and
a user certification unit which determines a permission level of the user, wherein
said combining unit selects the proper noun, of which access is to be permitted, according to the user's permission level determined by said user certification unit, and the proper noun thus selected is combined with the document.

2. The document management apparatus according to claim 1, wherein said storage unit is provided in the form of a separate file that differs from the document file.

3. The document management apparatus according to claim 1, wherein, in a case of reception of a request from a user who does not have a permission to access the proper noun to acquire the document, or in a case that the user has not been certified, said combining unit does not combine the proper noun with the document.

4. The document management apparatus according to claim 1, wherein, in a case of reception of a request from a user who has a permission to access only a part of the proper noun to acquire the document, said combining unit combines only the part of the proper noun with the document.

5. A document management method comprising:
acquiring a document;
extracting a proper noun included in the document;
issuing an identifier to the proper noun extracted by said extracting;
replacing the proper noun in the document by the identifier;
storing the proper noun and the identifier in association with each other into a storage unit;
determining a permission level of a user, in a case of reception of a request from the user, who has a permission to access the proper noun, to acquire the document;
reading out from the storage unit, the proper noun, of which access is to be permitted according to the user's permission level thus determined; and
combining the proper noun thus read out with the document.

6. A computer readable medium storing program code for causing a computer to execute the computer program and perform method steps that implement a document management method comprising:
acquiring a document;
extracting a proper noun included in the document;
issuing an identifier to the proper noun extracted by said extracting;
replacing the proper noun in the document by the identifier;
storing the proper noun and the identifier in association with each other into a storage unit;
determining a permission level of a user, in a case of reception of a request from the user, who has a permission to access the proper noun, to acquire the document;
reading out from the storage unit, the proper noun, of which access is to be permitted according to the user's permission level thus determined; and
combining the proper noun thus read out with the document.

* * * * *